(12) United States Patent
Caneba

(10) Patent No.: US 7,363,755 B1
(45) Date of Patent: Apr. 29, 2008

(54) PICKING RAKE WITH DUAL RAKE HEADS AND DUAL RAKE HANDLES AND METHOD OF USE

(76) Inventor: Mary Ann Caneba, 302 W. Jacker Ave., Houghton, MI (US) 49931

( * ) Notice: Subject to any disclaimer, the term of this patent is extended or adjusted under 35 U.S.C. 154(b) by 0 days.

(21) Appl. No.: 11/202,131

(22) Filed: Aug. 10, 2005

Related U.S. Application Data

(63) Continuation-in-part of application No. 10/002,763, filed on Nov. 27, 2001, now Pat. No. 7,131,255.

(60) Provisional application No. 60/253,552, filed on Nov. 28, 2000.

(51) Int. Cl.
*A01D 7/00* (2006.01)
(52) U.S. Cl. .................................. 56/400.19
(58) Field of Classification Search ............ 56/400.19, 56/400.04, 400.07, 400.11, 400.12, 400.16, 56/DIG. 18; 294/50.8, 58, 118
See application file for complete search history.

(56) References Cited

U.S. PATENT DOCUMENTS

| | | | |
|---|---|---|---|
| 1,424,291 A | 8/1922 | Frank | |
| 2,536,607 A | 1/1951 | Jenkins | |
| 3,164,945 A | 1/1965 | Spencer | |
| 3,601,966 A | 8/1971 | Kerry | |
| 3,688,484 A | 9/1972 | Cox | |
| 3,833,250 A | 9/1974 | Lawrence | |
| 4,018,038 A | 4/1977 | Sipe | |
| 4,037,397 A | 7/1977 | Fiorentino | |
| 4,292,794 A | 10/1981 | Gascon | |
| 4,378,671 A | 4/1983 | Gascon | |
| 4,477,114 A | 10/1984 | Callis | |
| 4,944,541 A | 7/1990 | Waldschmidt | |
| 4,991,386 A | 2/1991 | Dirksen | |
| D336,731 S * | 6/1993 | Nichols, Jr. .................. D8/382 |
| 5,303,536 A | 4/1994 | Tolliver | |
| 5,414,982 A * | 5/1995 | Darnell .................... 56/400.19 |
| 5,467,590 A | 11/1995 | Mencarelli | |
| 5,529,357 A | 6/1996 | Hoffman | |
| 5,564,267 A | 10/1996 | Bricker | |
| 5,687,556 A | 11/1997 | Lintz | |
| 5,890,259 A | 4/1999 | Sarac | |
| 5,901,540 A | 5/1999 | Vella | |
| 5,927,058 A | 7/1999 | Hsu | |
| 6,101,799 A * | 8/2000 | Darnell ........................ 56/342 |
| 6,120,073 A * | 9/2000 | Jones ........................ 294/50.8 |
| 6,134,869 A | 10/2000 | Barrett | |
| 6,199,245 B1 | 3/2001 | Blessing | |

(Continued)

Primary Examiner—Árpád Fábián Kovács

(57) ABSTRACT

A household tool for gathering and picking material comprising two rake head and handle units arranged side by side with both rake heads arranged in substantially the same plane for raking. The units are temporarily held in this position by several possible fasteners along the length of the units. One version is joined at a pivoting joint that allows each of the units to separately pivot about its own longitudinal axis so that their undersides are substantially facing each other and to swing opposite each other for picking. Another version allows both units to be completely disconnected when in the pick-up mode. The handle lengths can be adjustable and can be extended for raking and retracted for picking. Each rake unit may have a fixed or adjustable hand grip or arm grip for less fatigue when picking. The rake heads may overlap to provide more picking-up capacity and more stability to the components.

17 Claims, 52 Drawing Sheets

U.S. PATENT DOCUMENTS

| | | |
|---|---|---|
| 6,272,827 B1 | 8/2001 | Hsu |
| 6,339,919 B1 | 1/2002 | Hsu |
| 6,370,857 B1 | 4/2002 | Mitchell |
| D465,705 S | 11/2002 | Hinden |
| 6,886,319 B2 * | 5/2005 | Nam ........................ 56/400.12 |
| 6,904,743 B2 * | 6/2005 | Vodinh ..................... 56/400.04 |

* cited by examiner

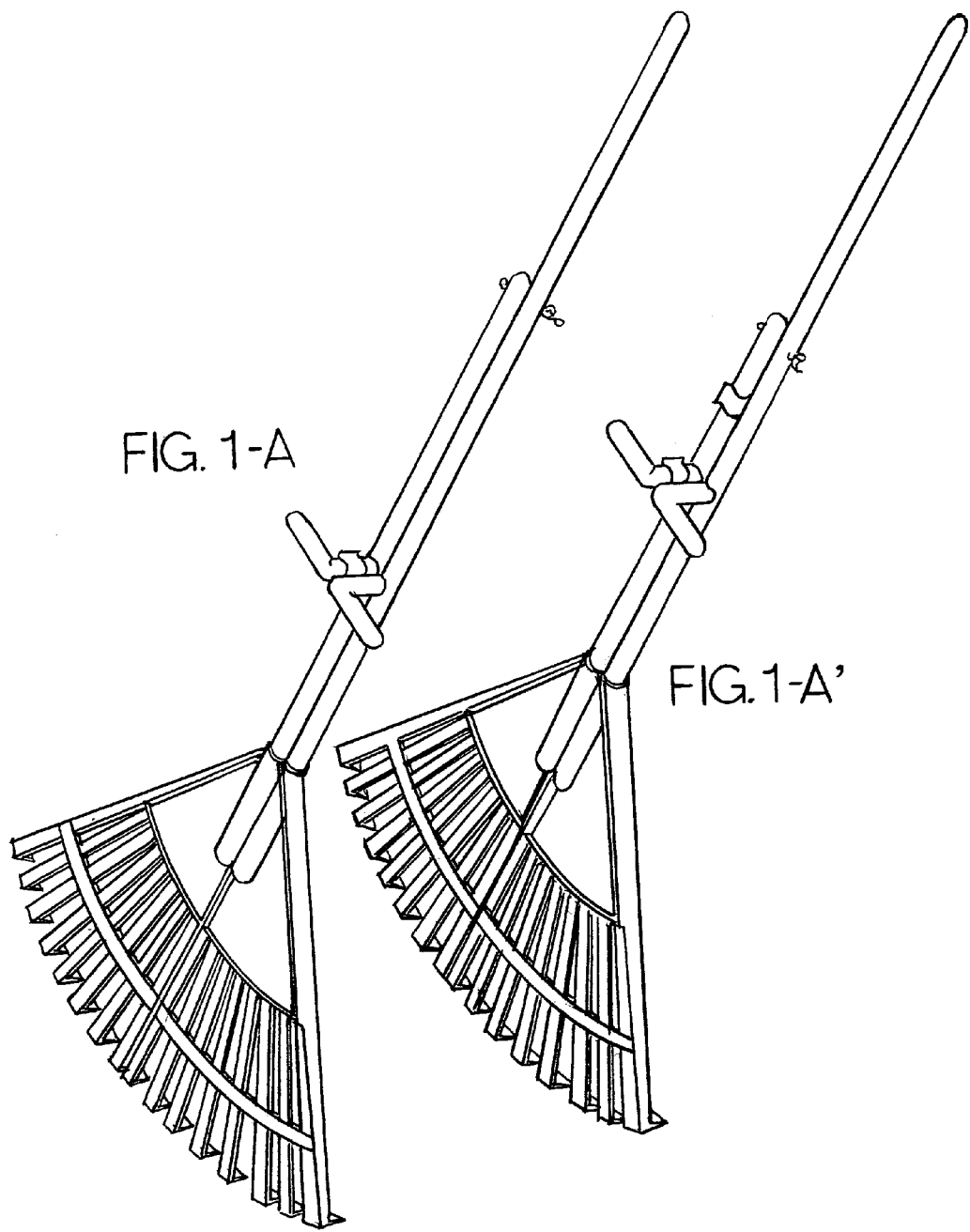

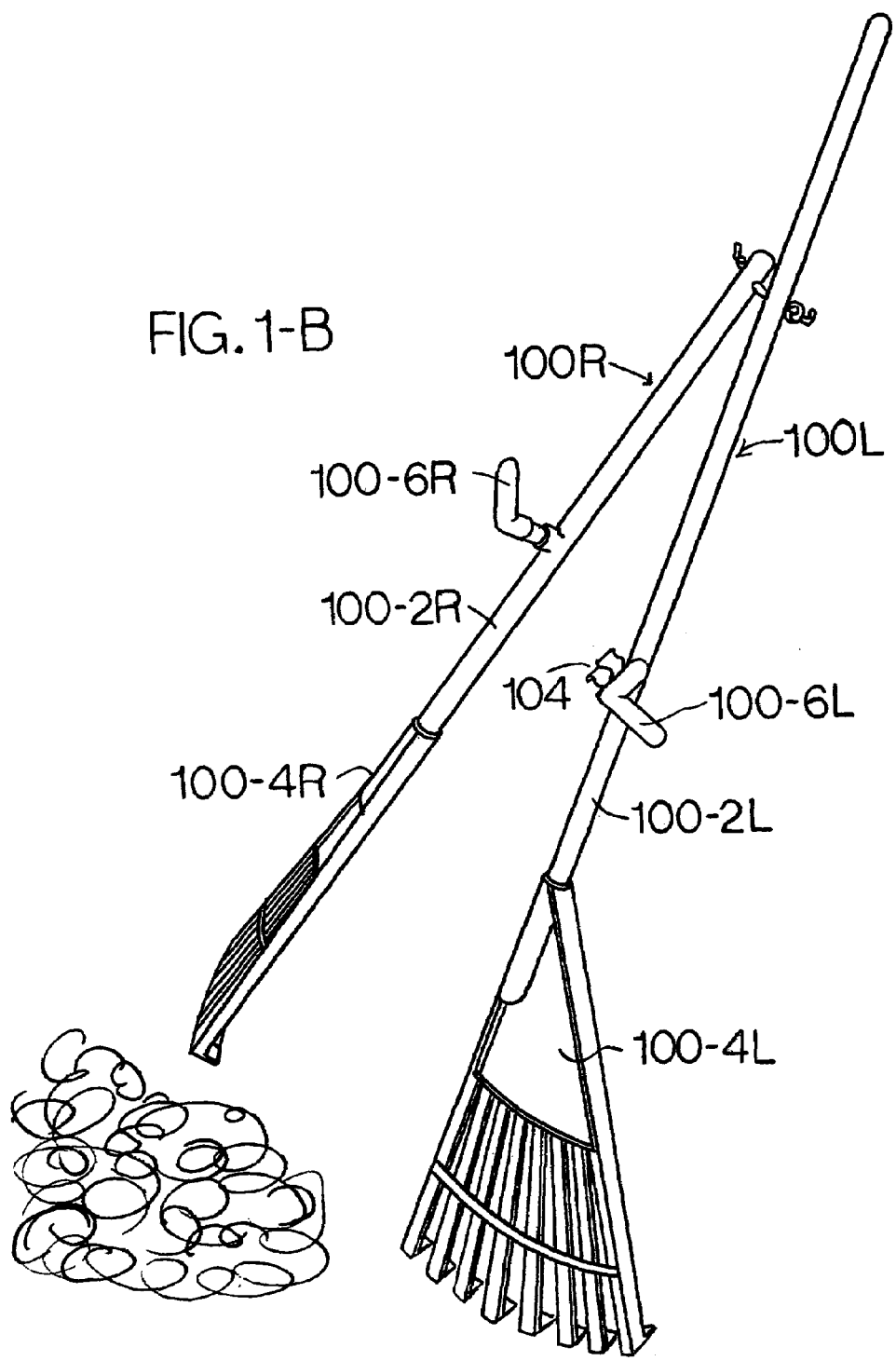

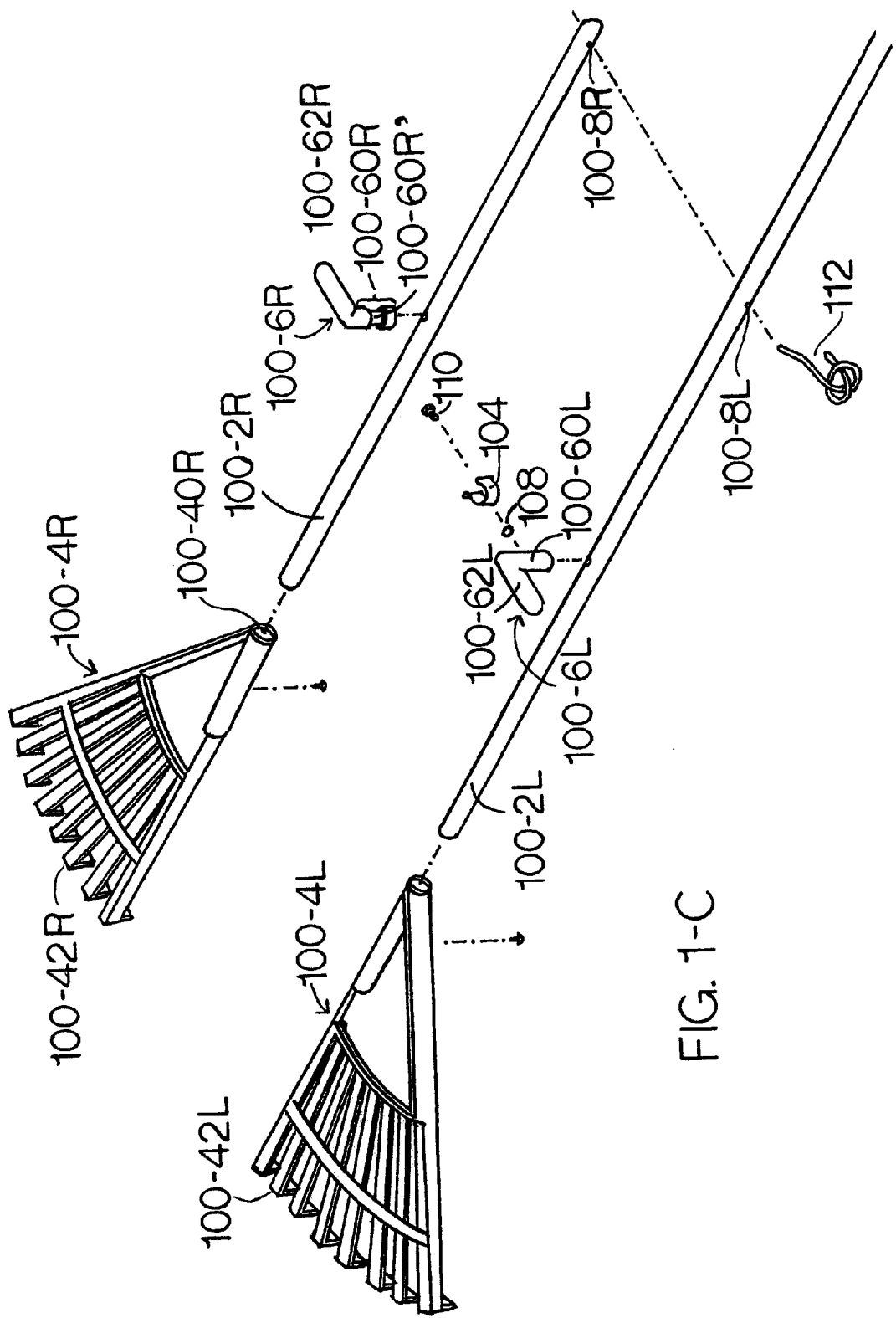
FIG. 1-C

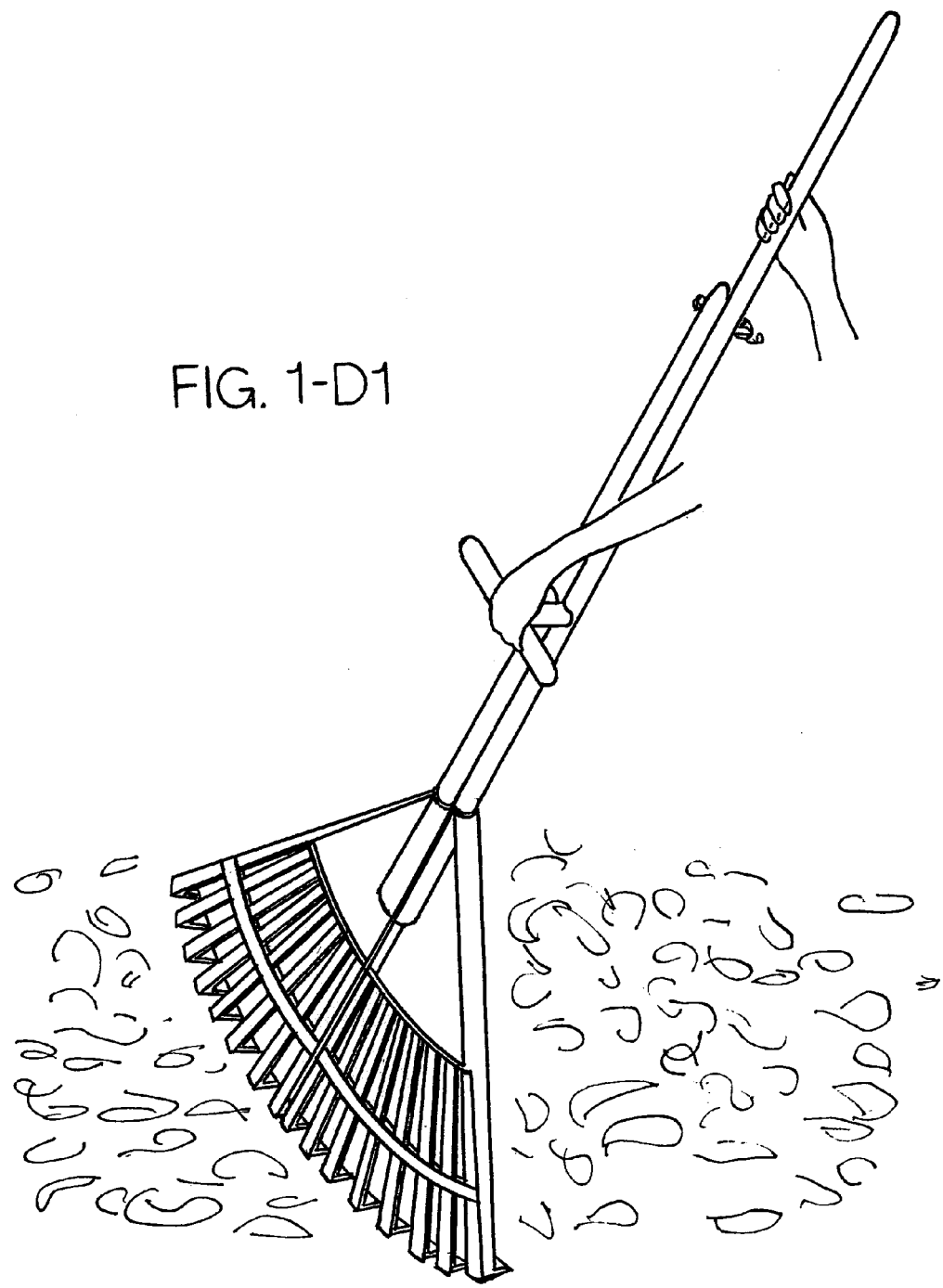
FIG. 1-D1

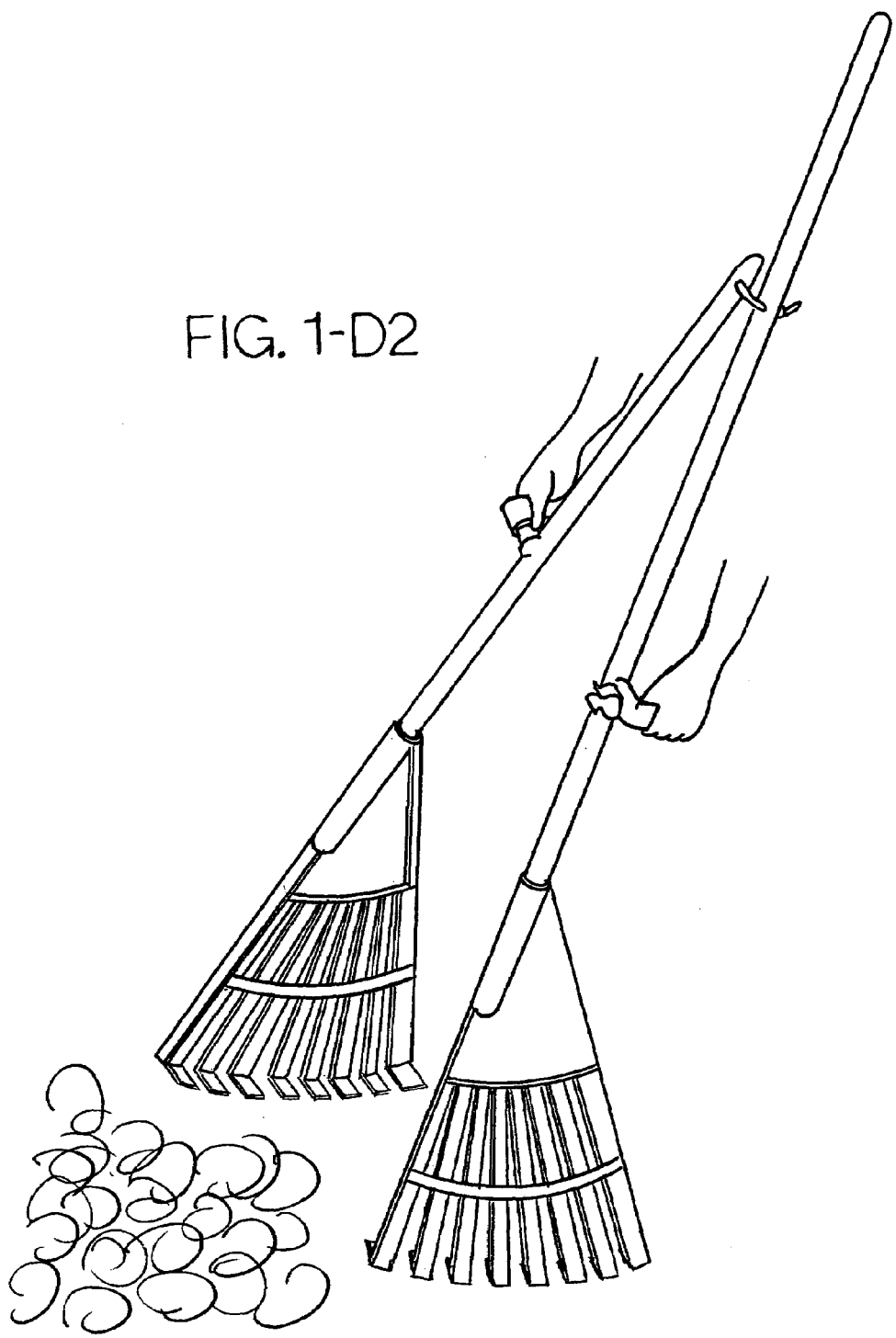
FIG. 1-D2

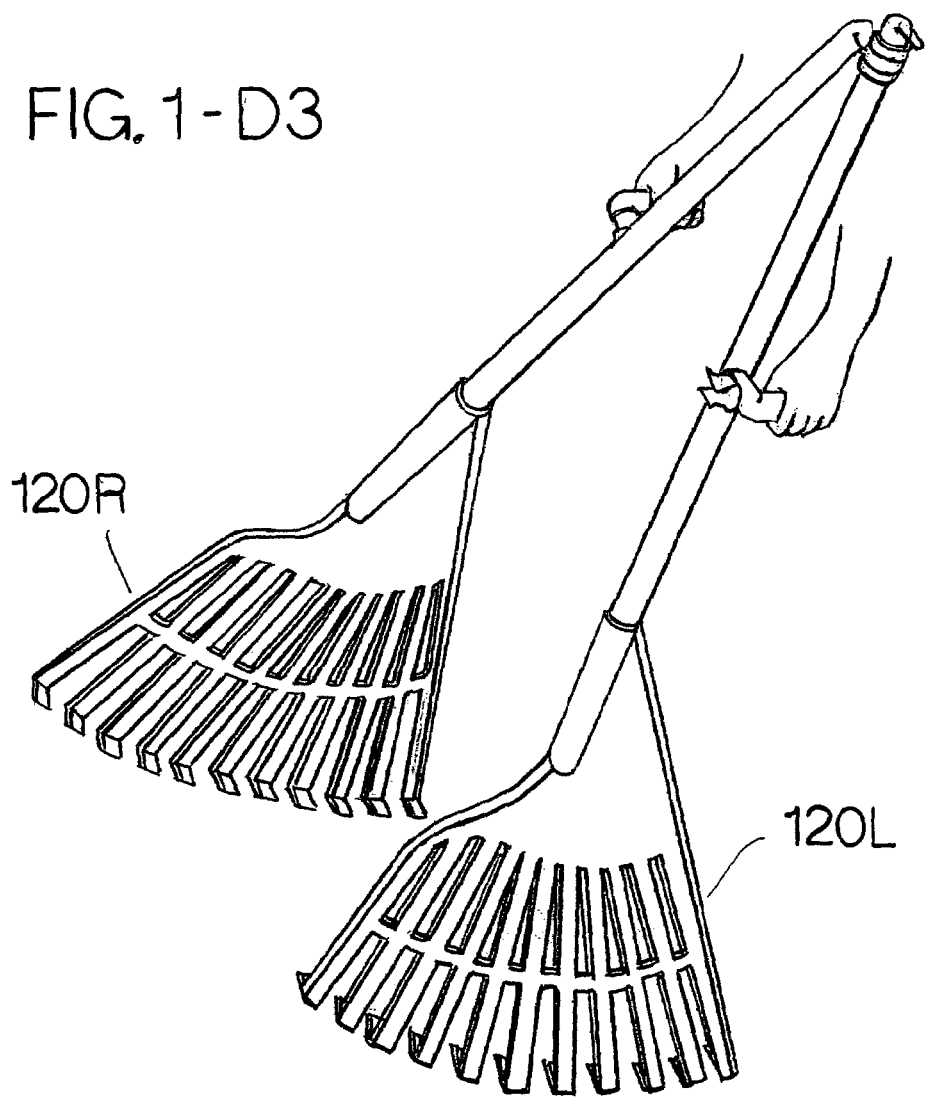

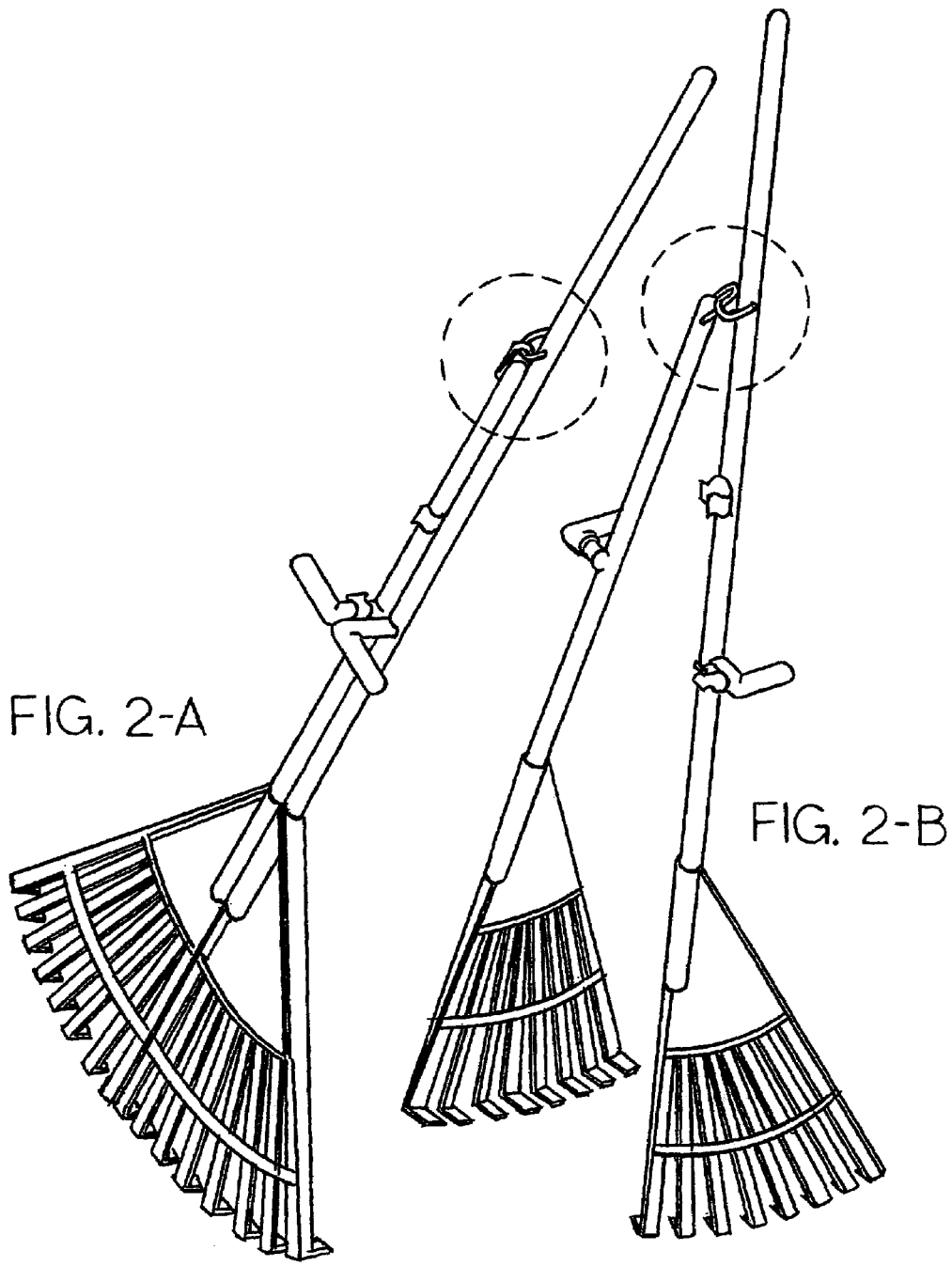
FIG. 2-A
FIG. 2-B

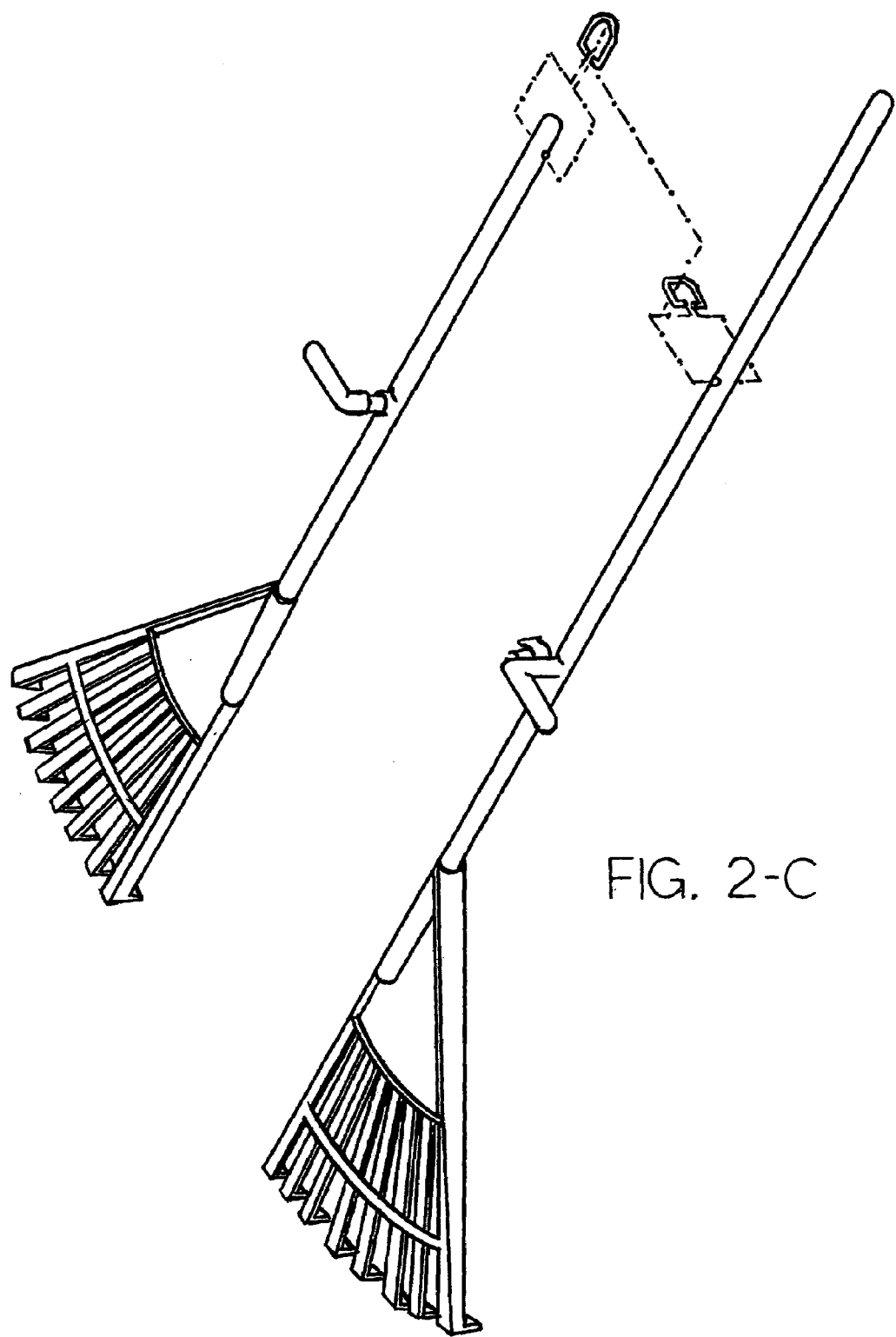
FIG. 2-C

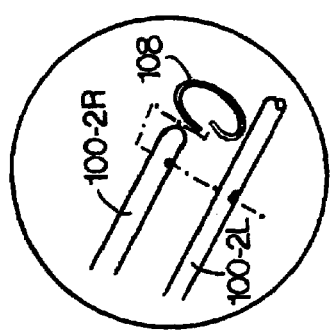
FIG. 5-A
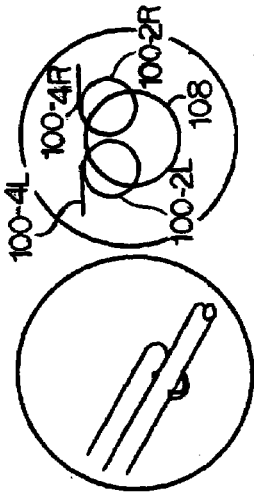
FIG. 5-B
FIG. 5-B'
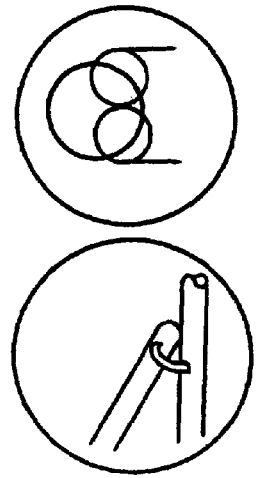
FIG. 5-C
FIG. 5-C
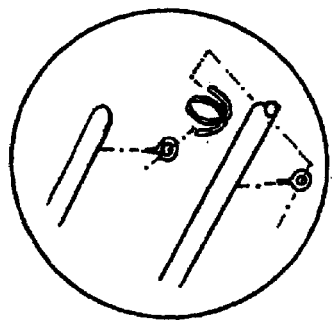
FIG. 4-A
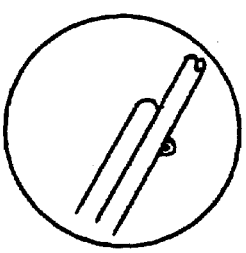
FIG. 4-B
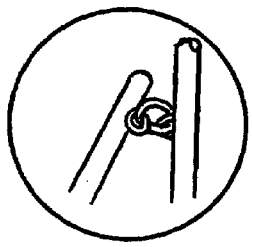
FIG. 4-C
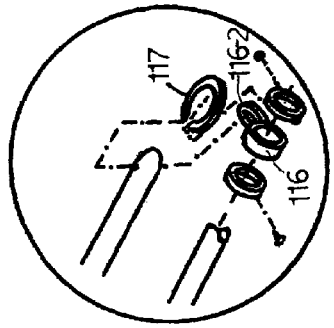
FIG. 3-A
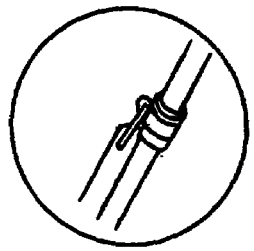
FIG. 3-B
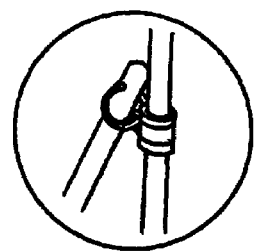
FIG. 3-C

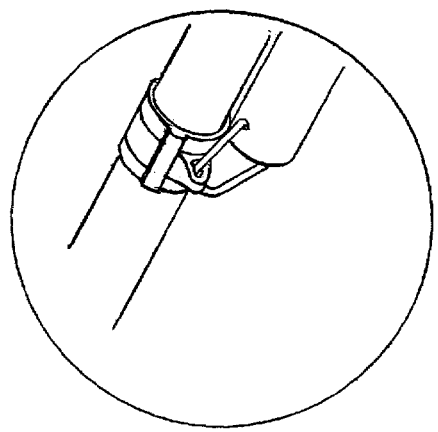
FIG. 6-C
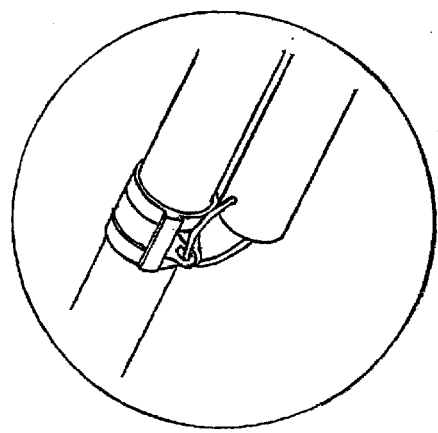
FIG. 6-D
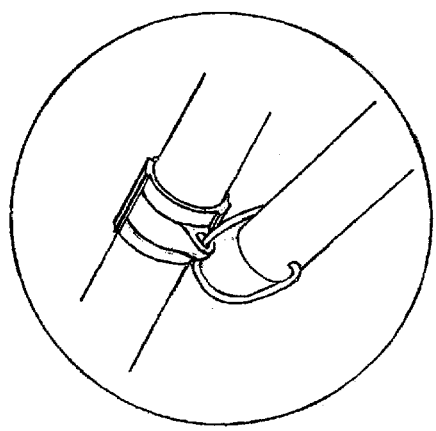
FIG. 6-E
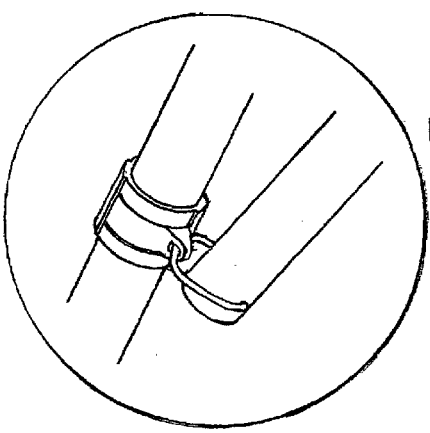
FIG. 6-F
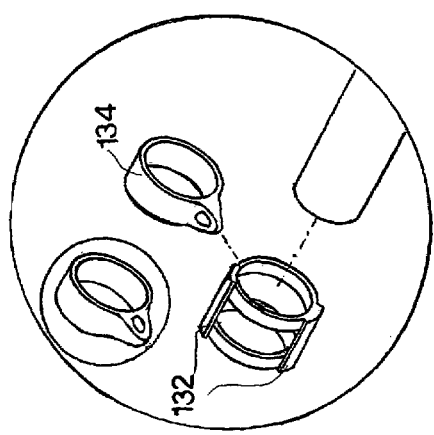
FIG. 6-A
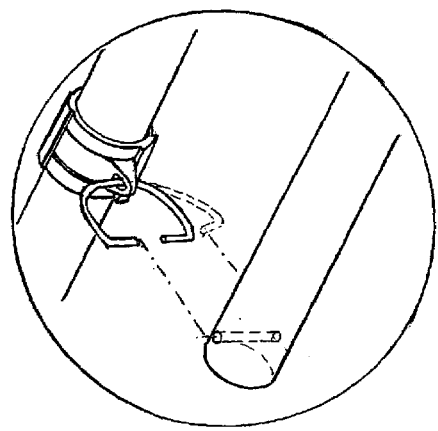
FIG. 6-B

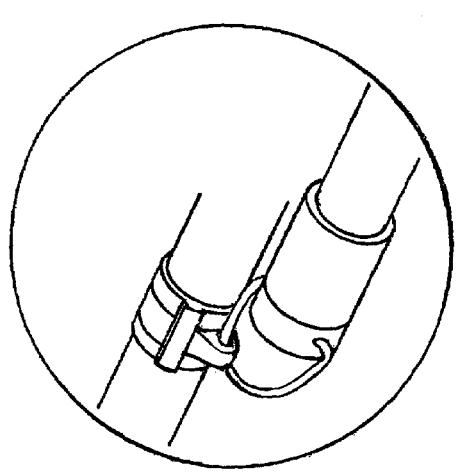
FIG. 6-B'
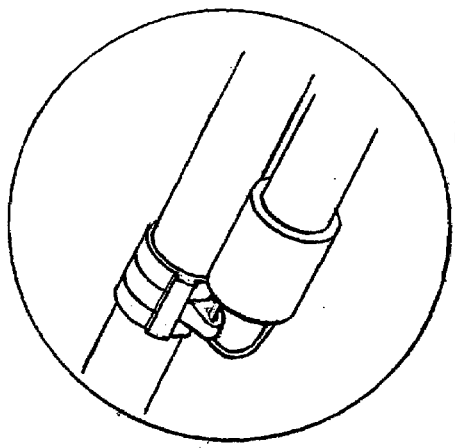
FIG. 6-C'
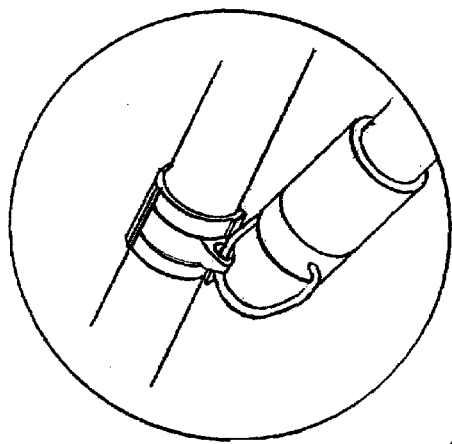
FIG. 6-E'
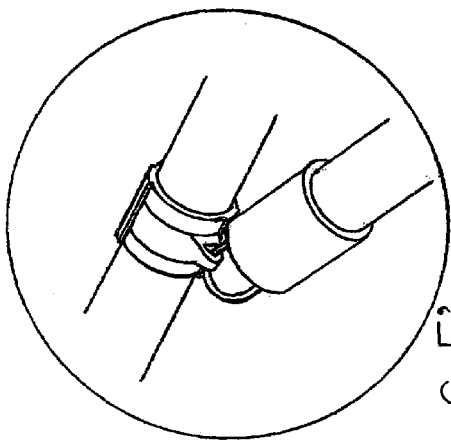
FIG. 6-F'
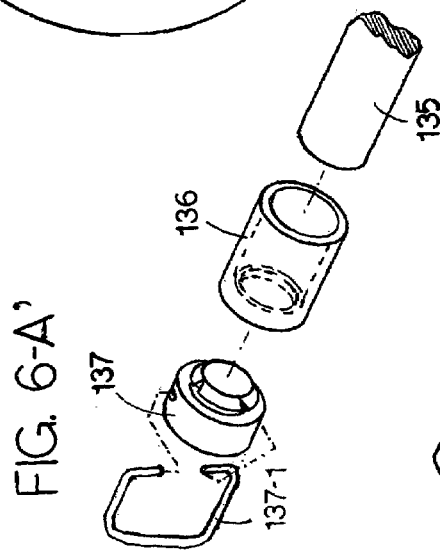
FIG. 6-A'
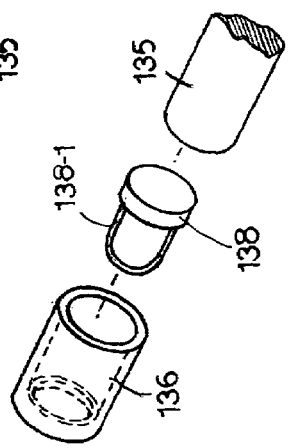
FIG. 6-D'

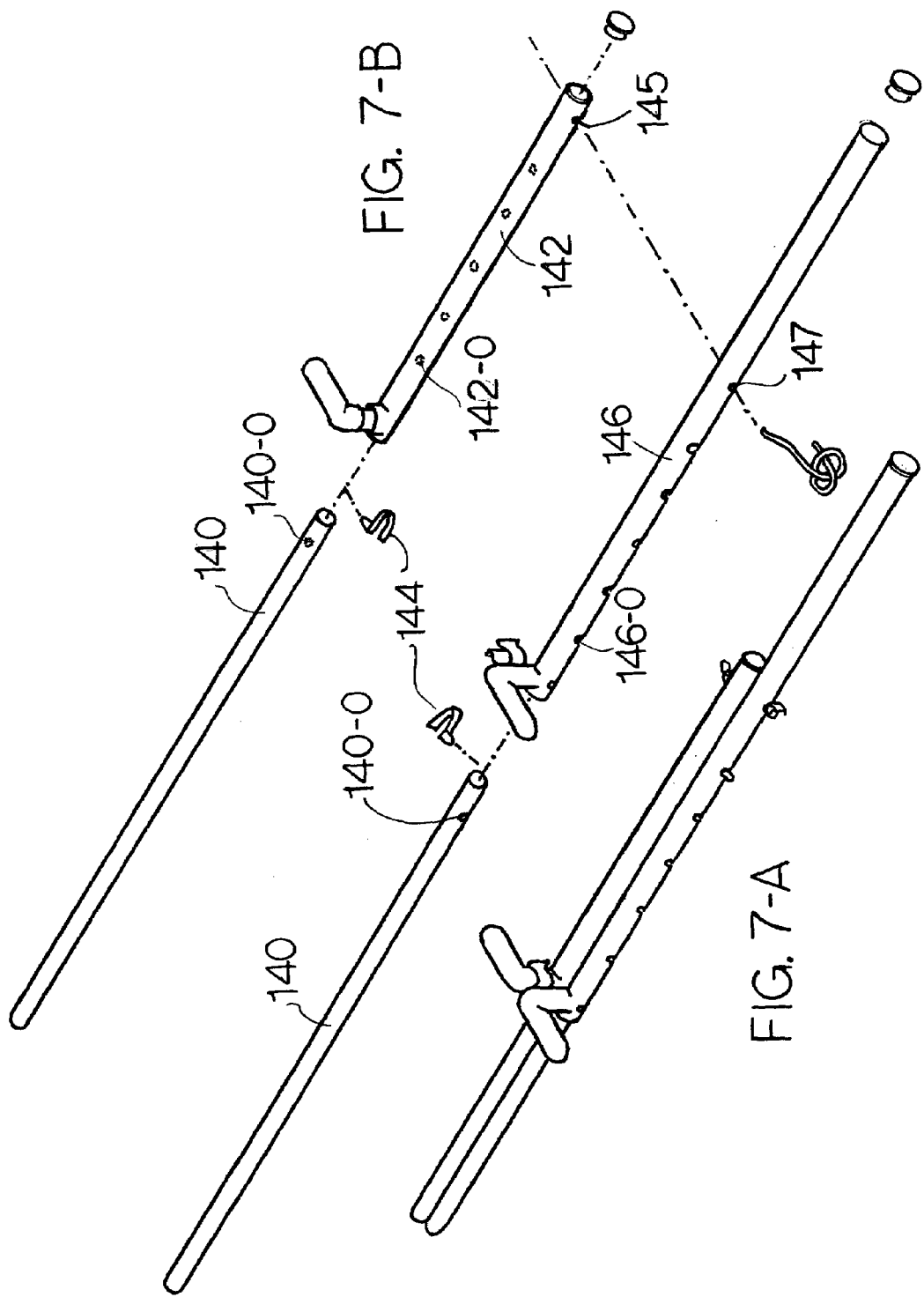

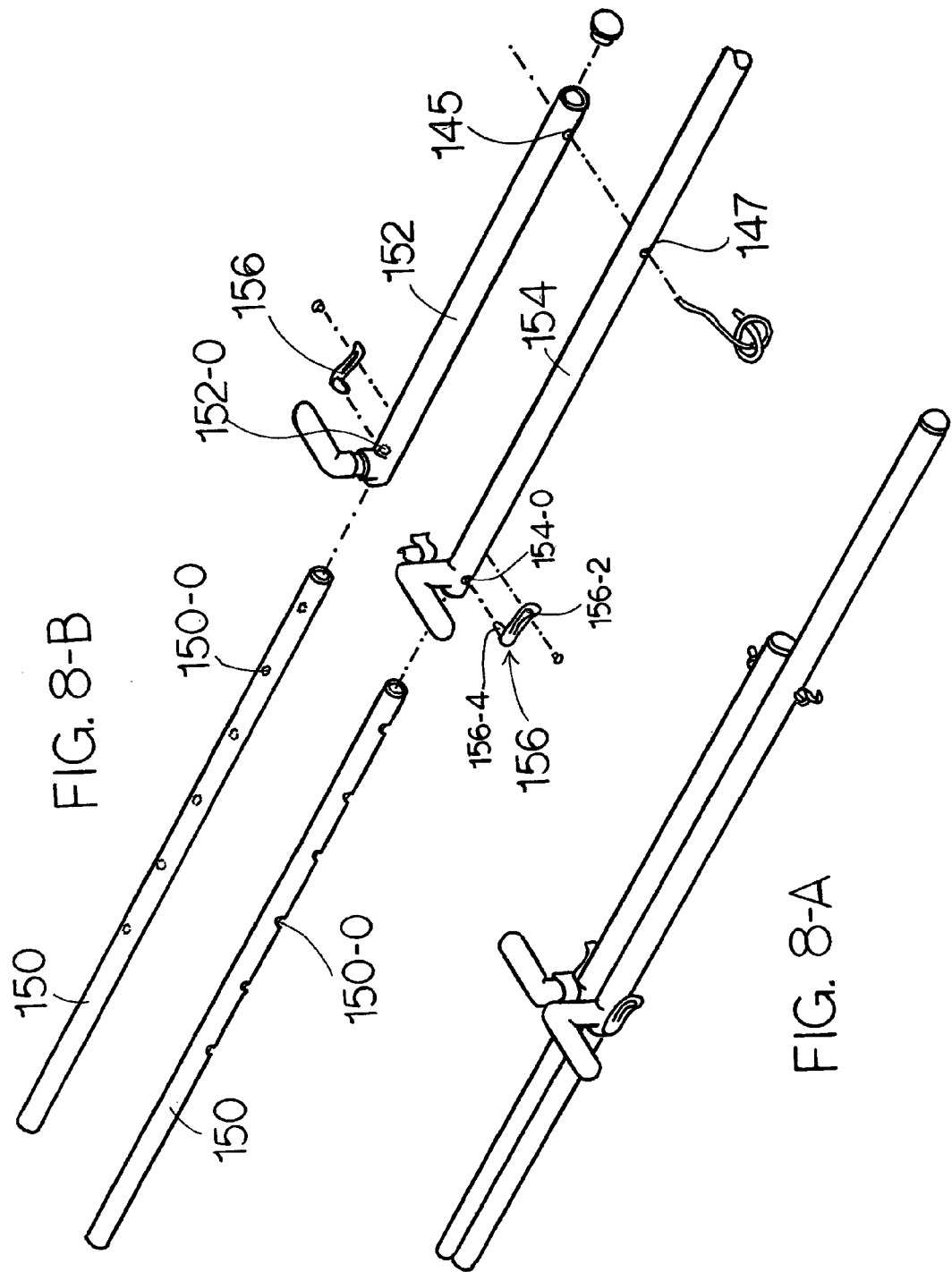

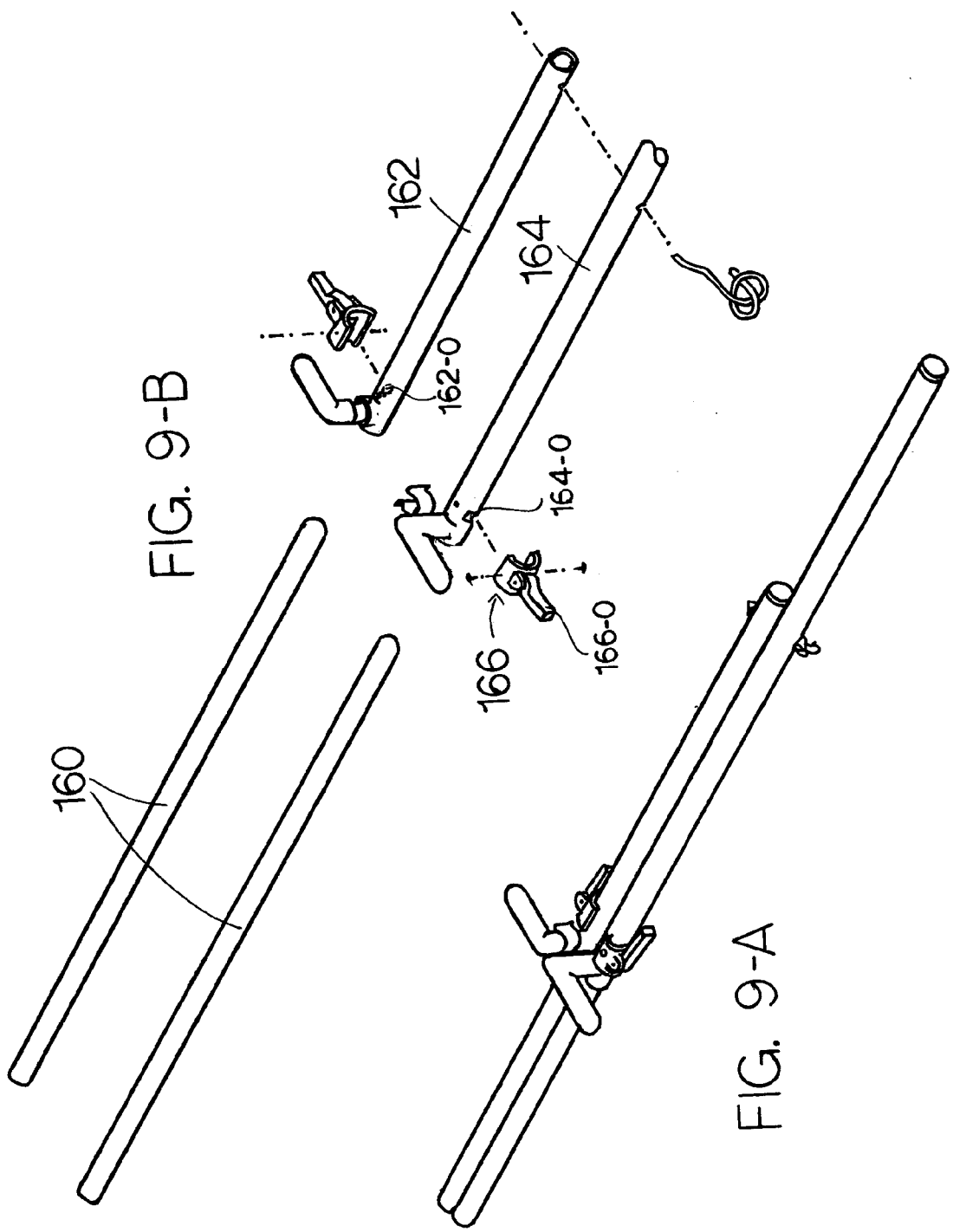

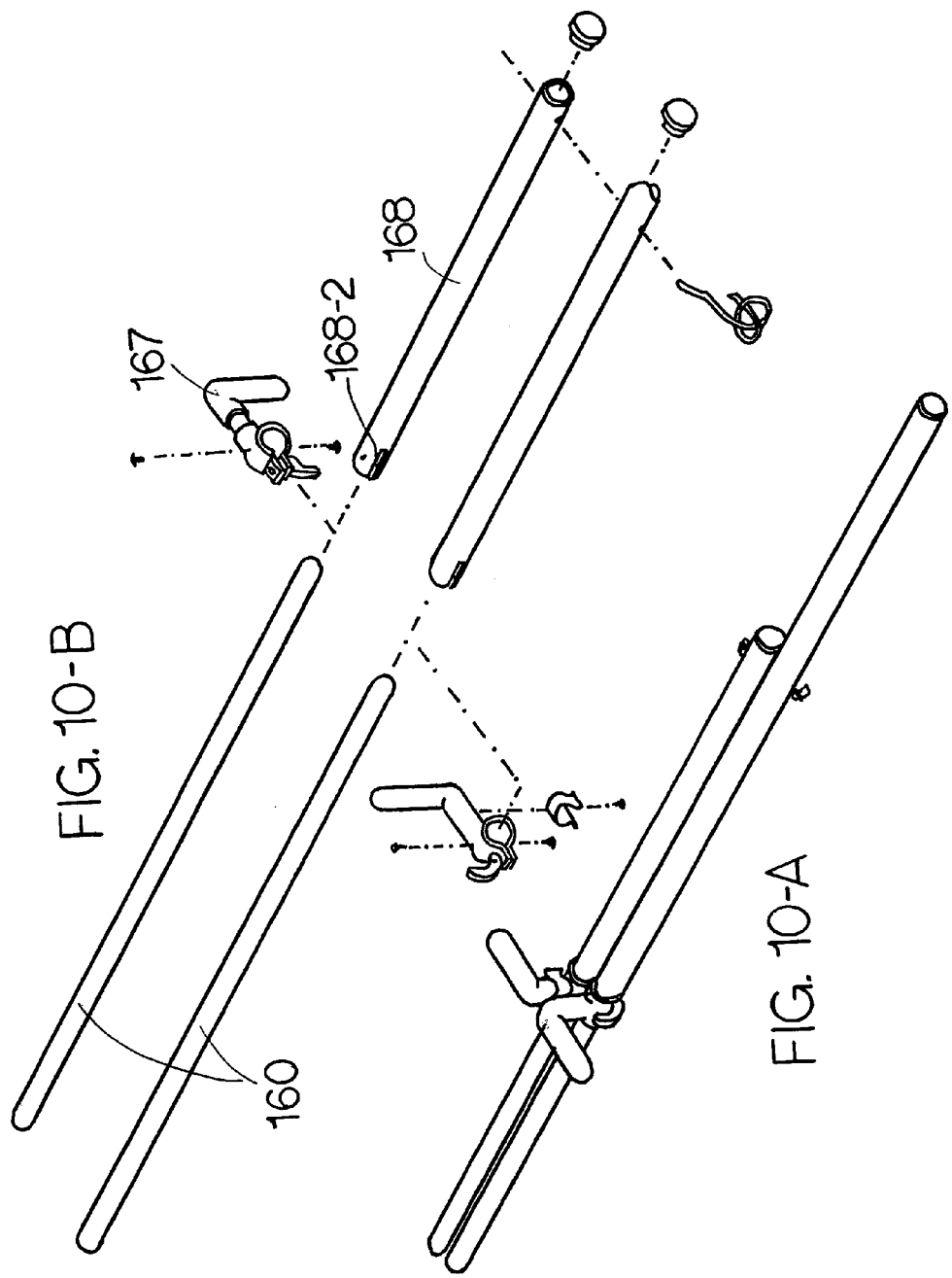

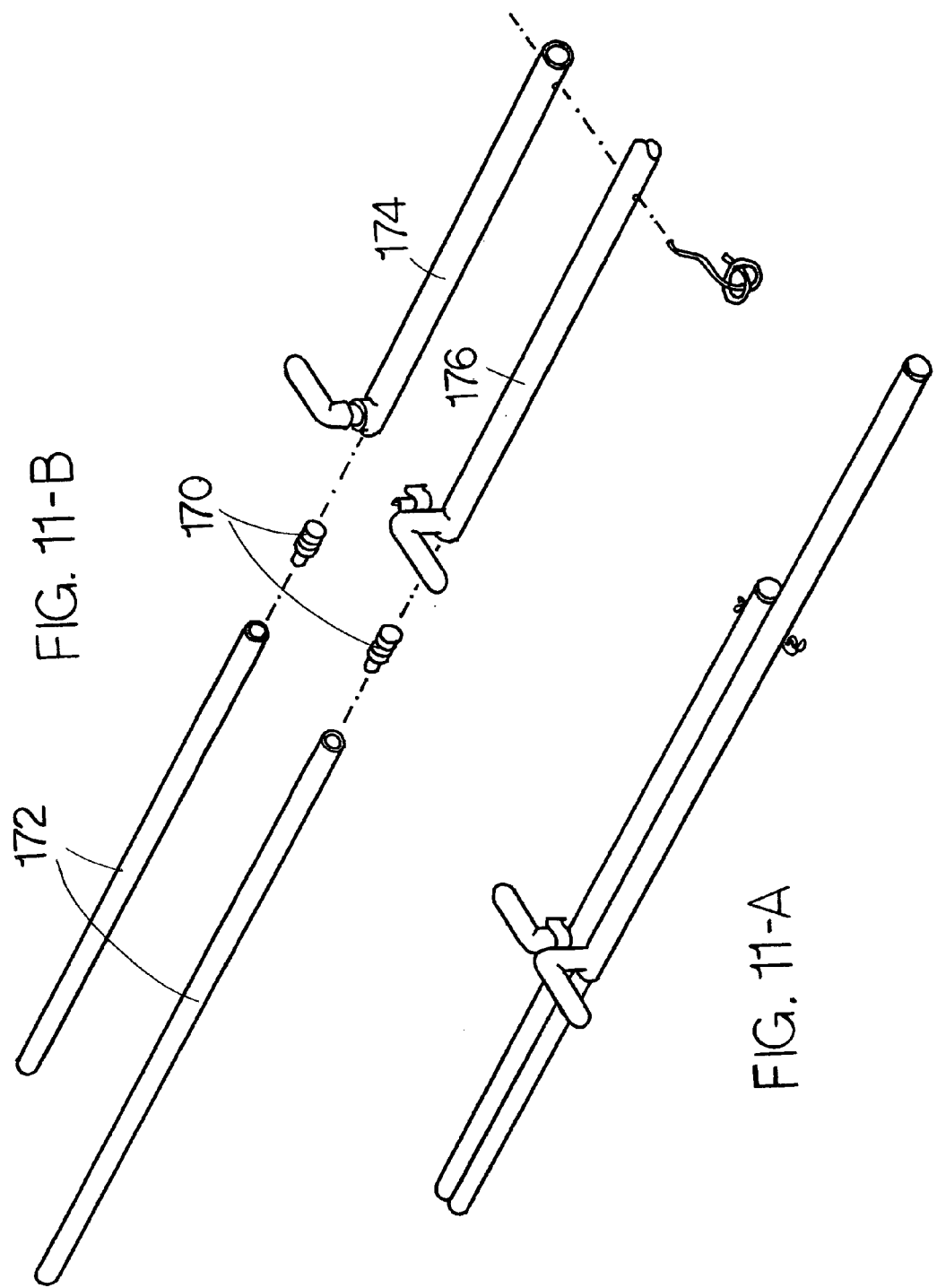

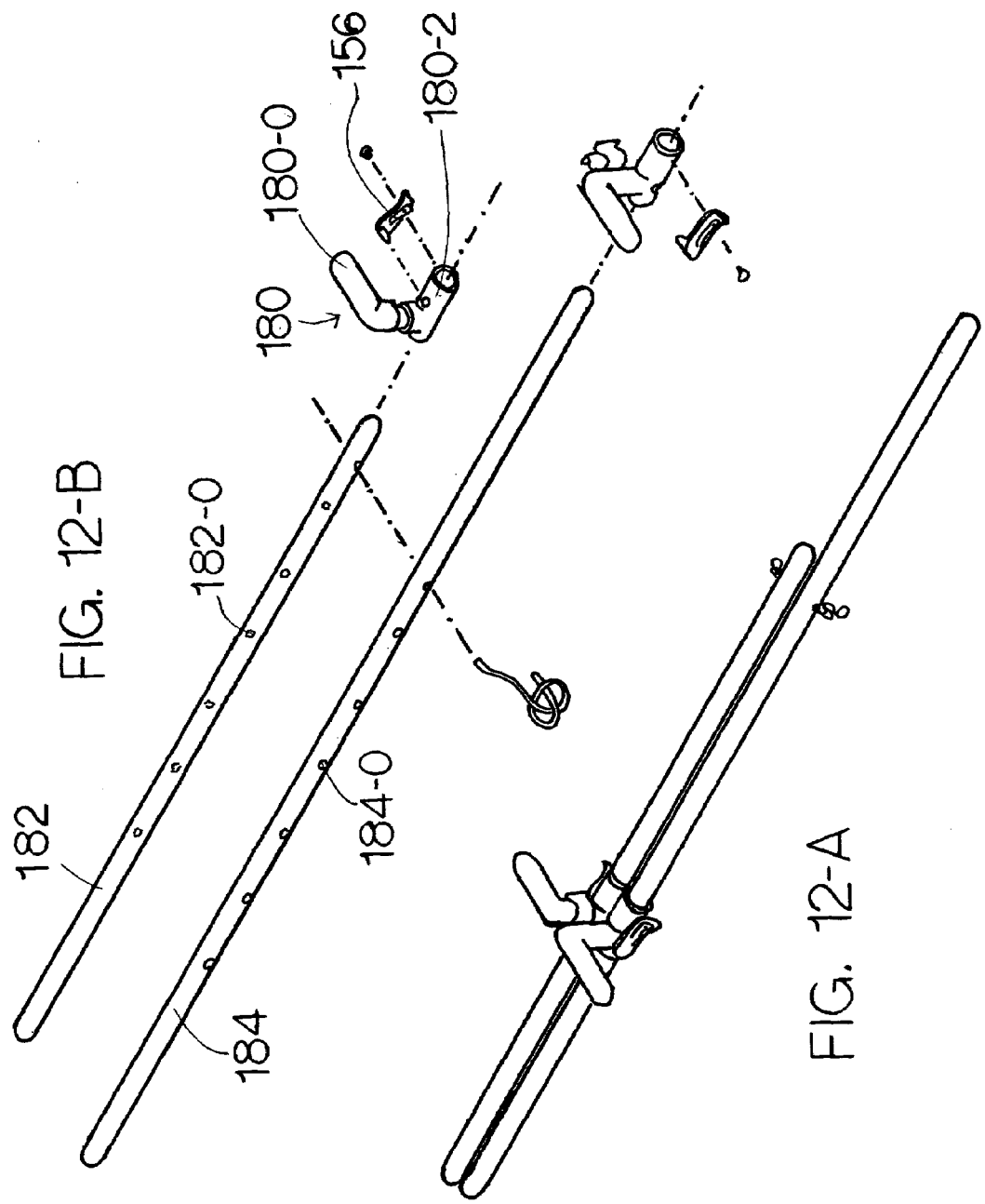

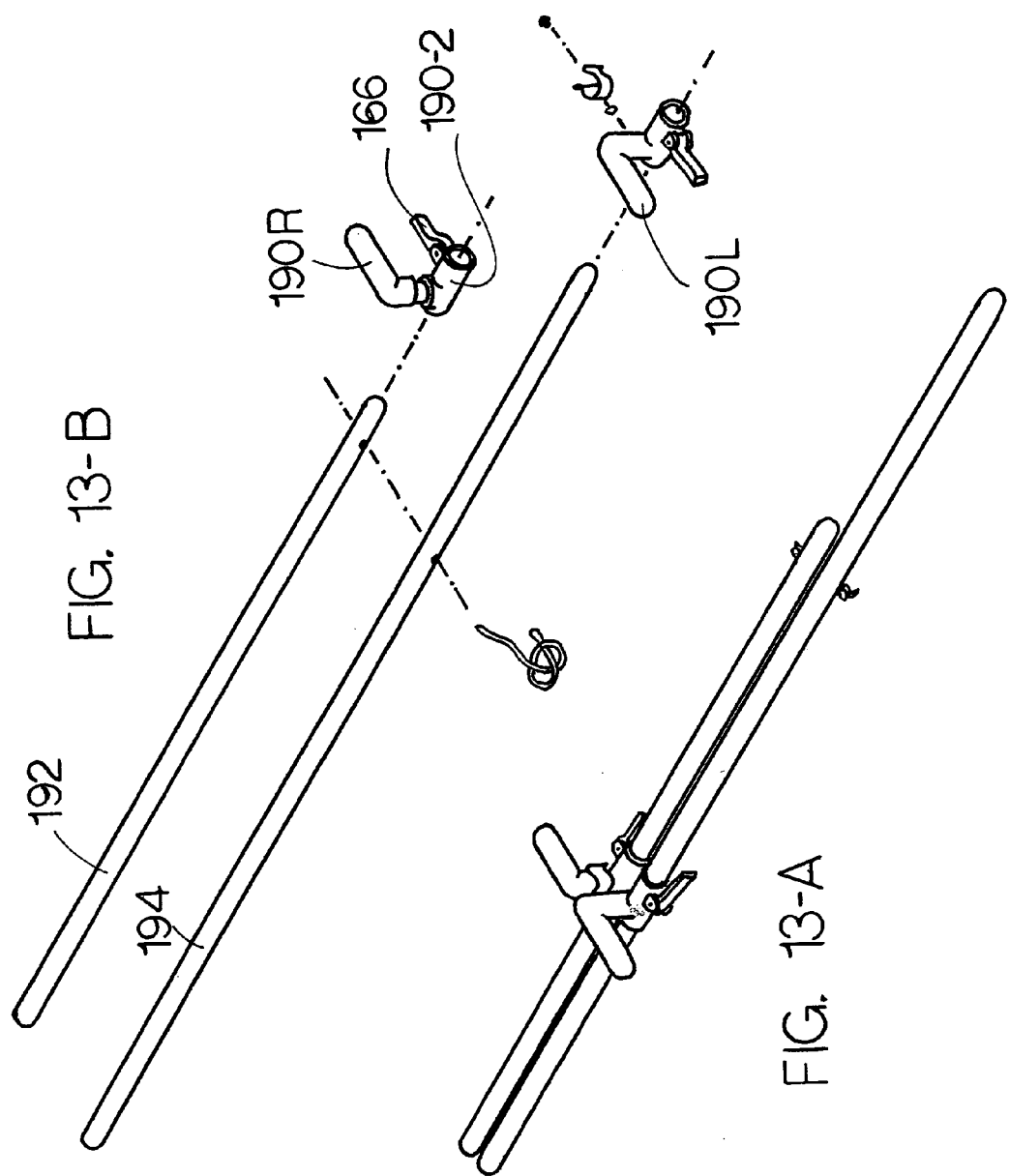

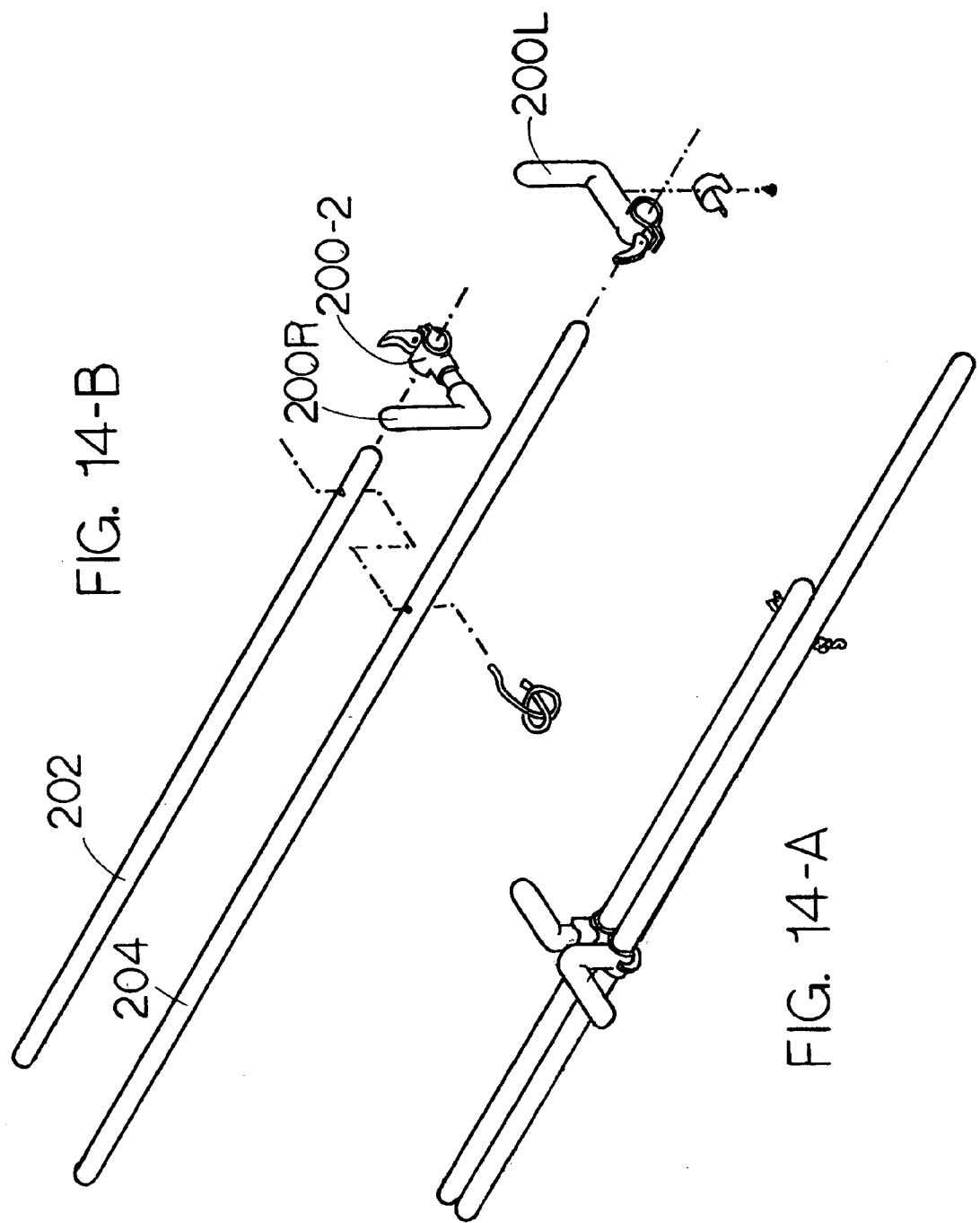

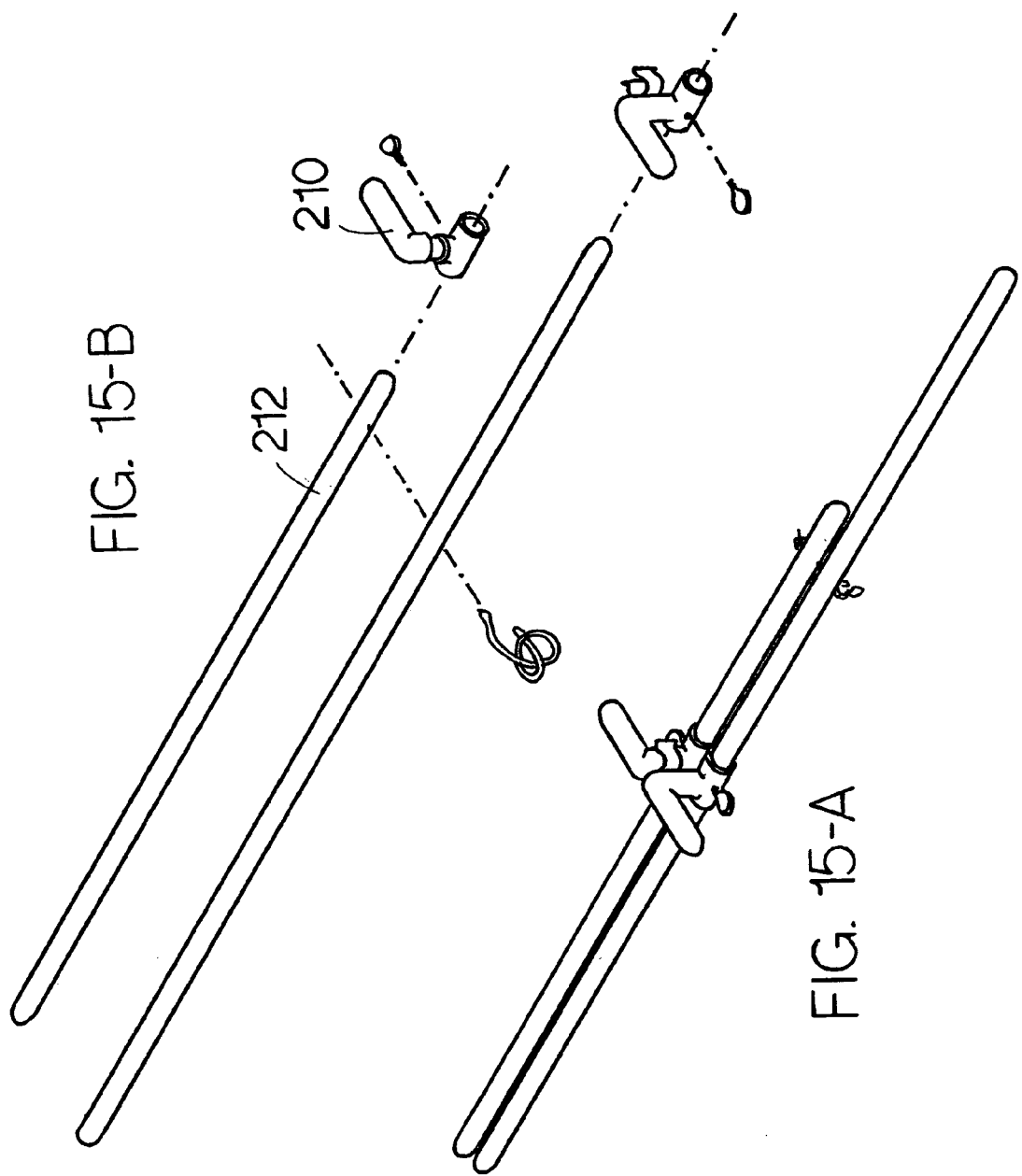

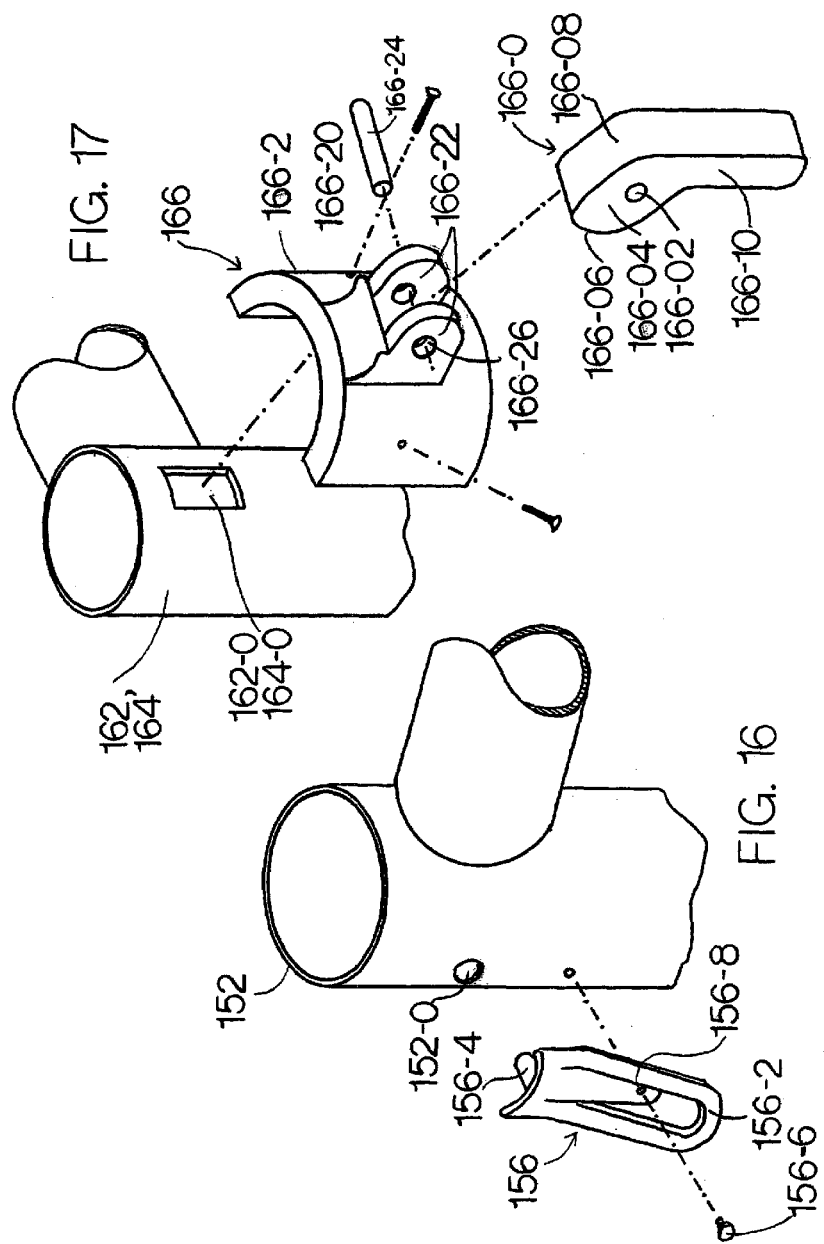

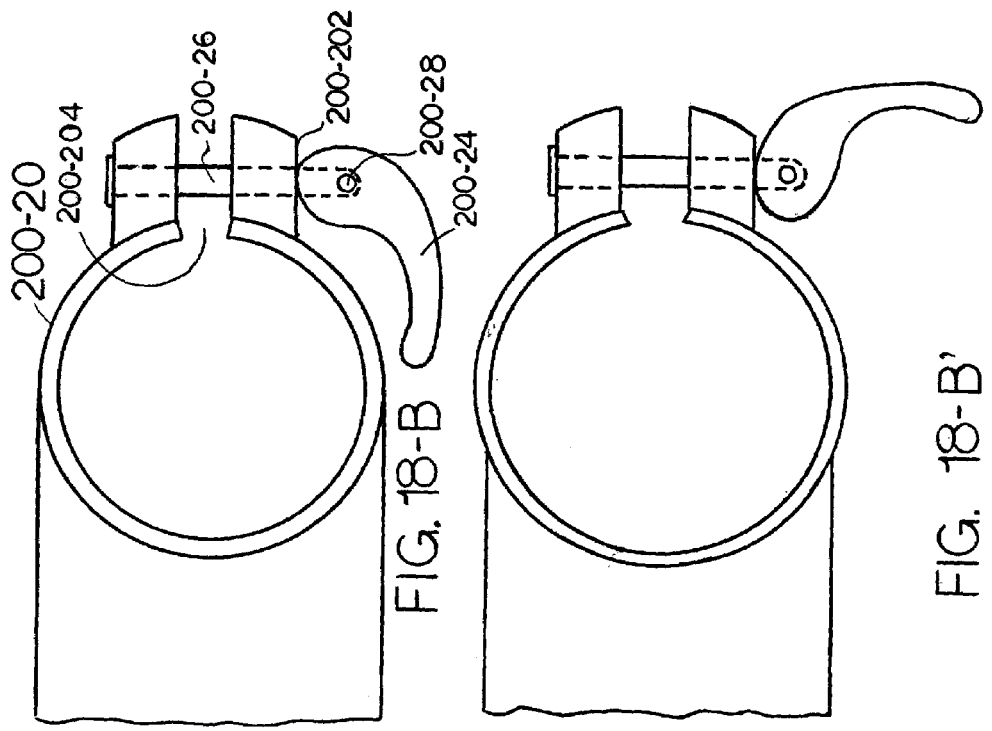
FIG. 18-B  FIG. 18-B'
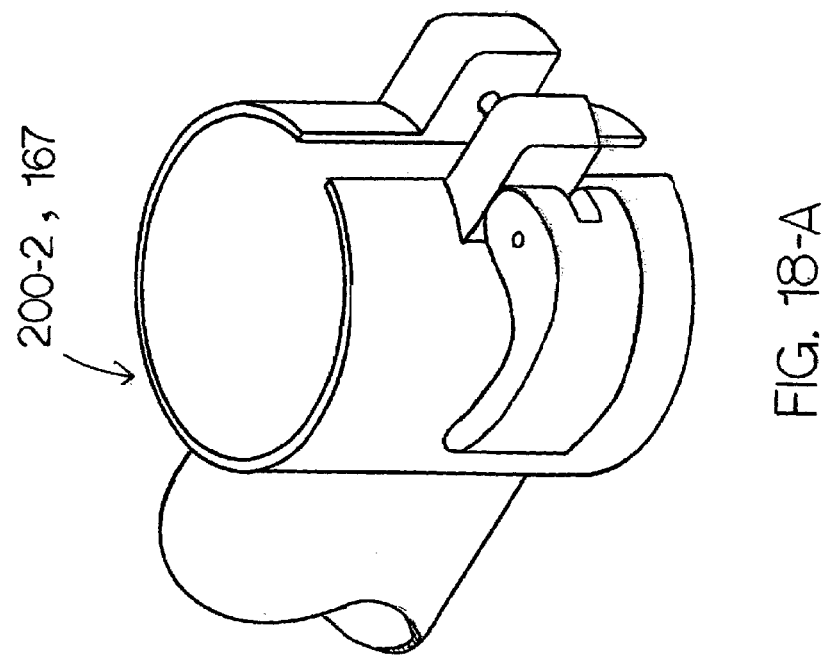
FIG. 18-A

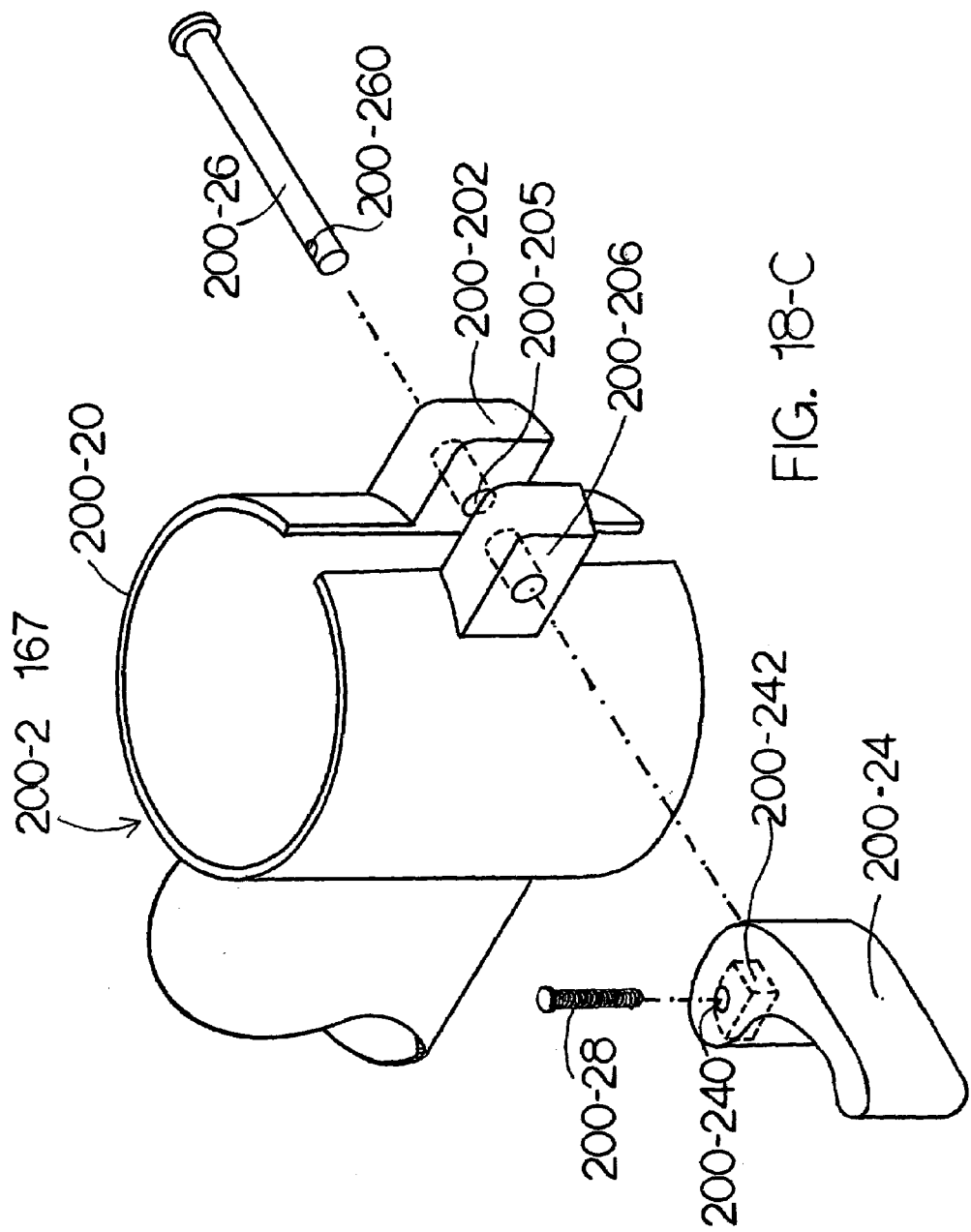
FIG. 18-C

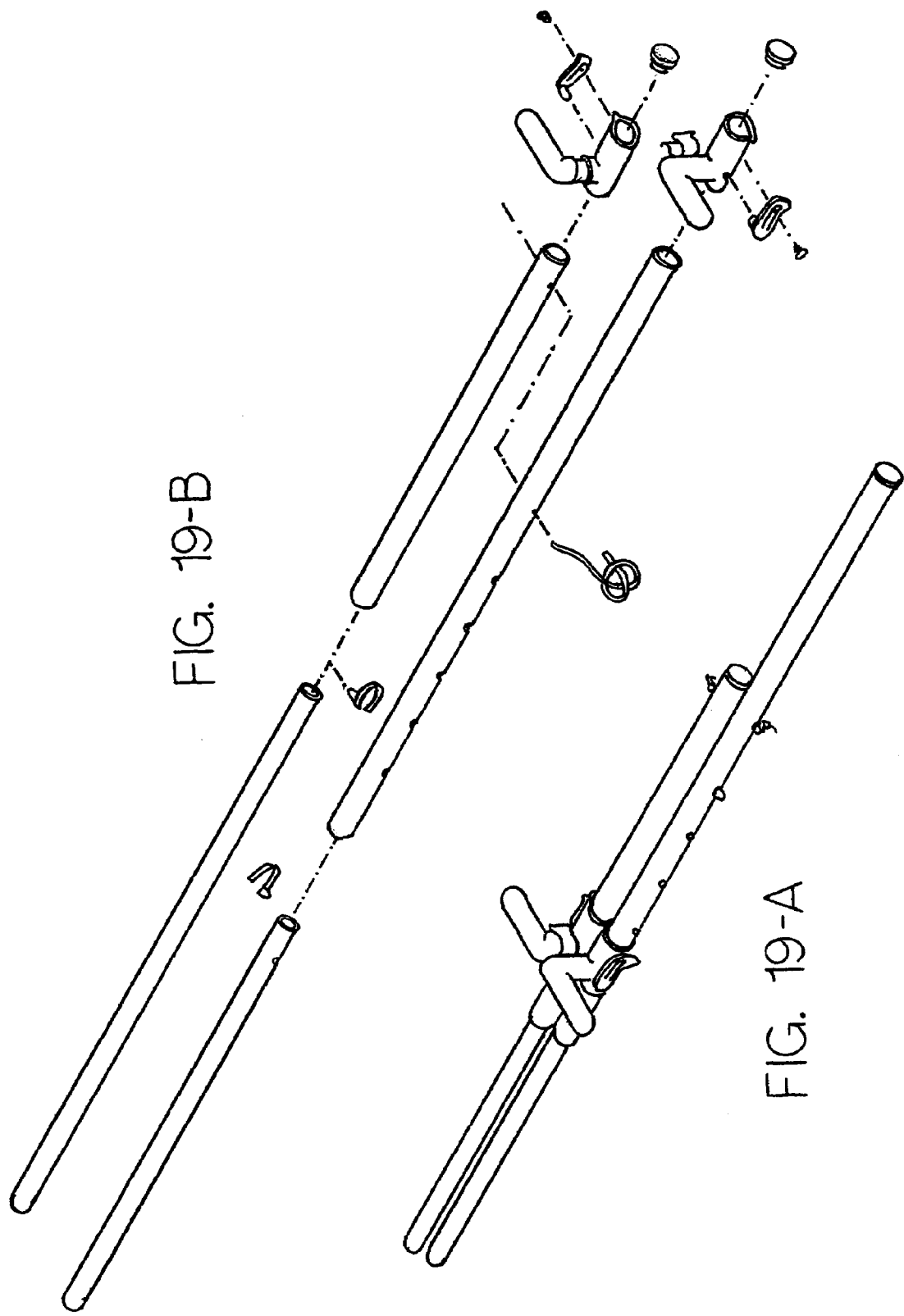
FIG. 19-B
FIG. 19-A

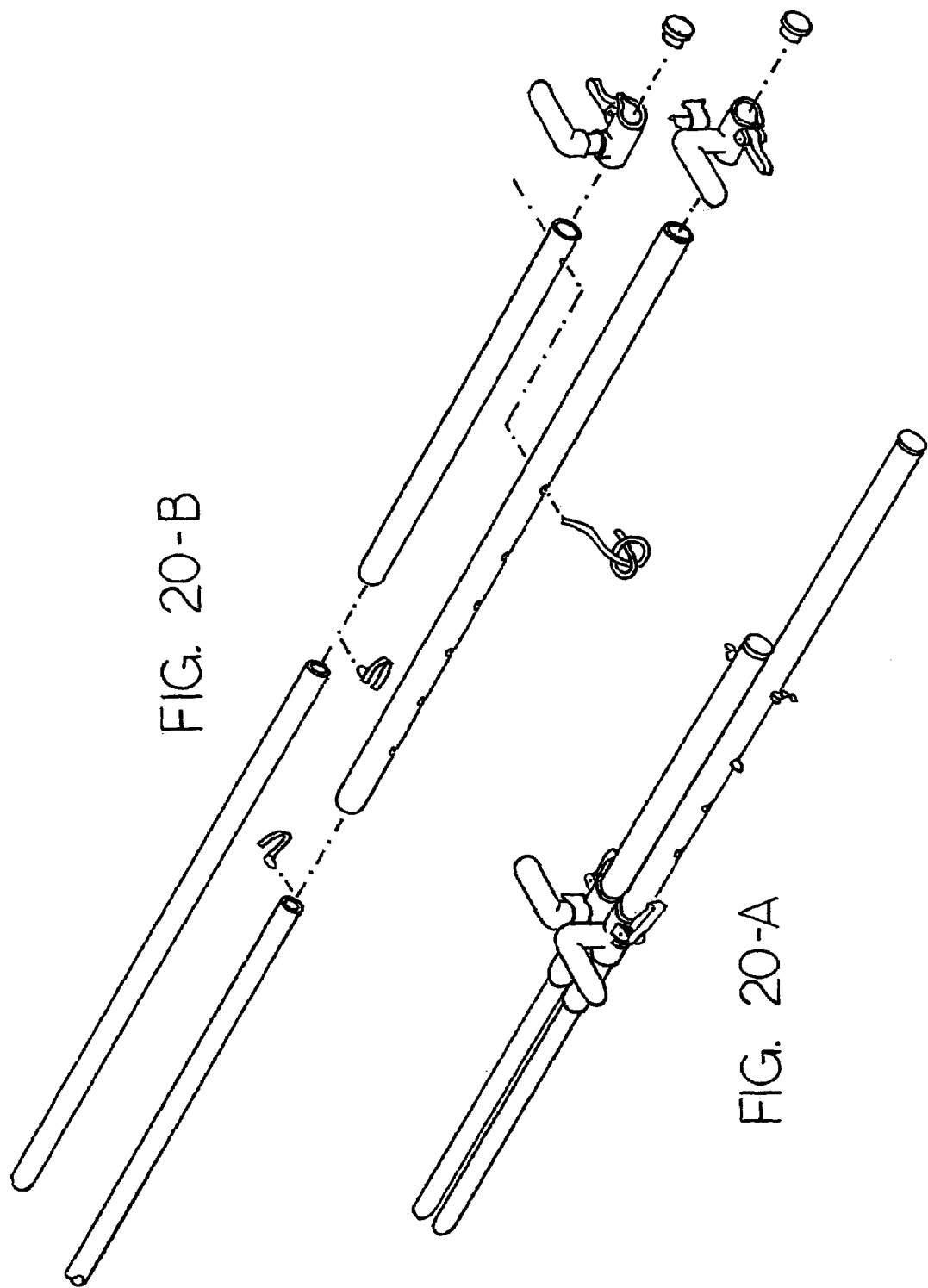

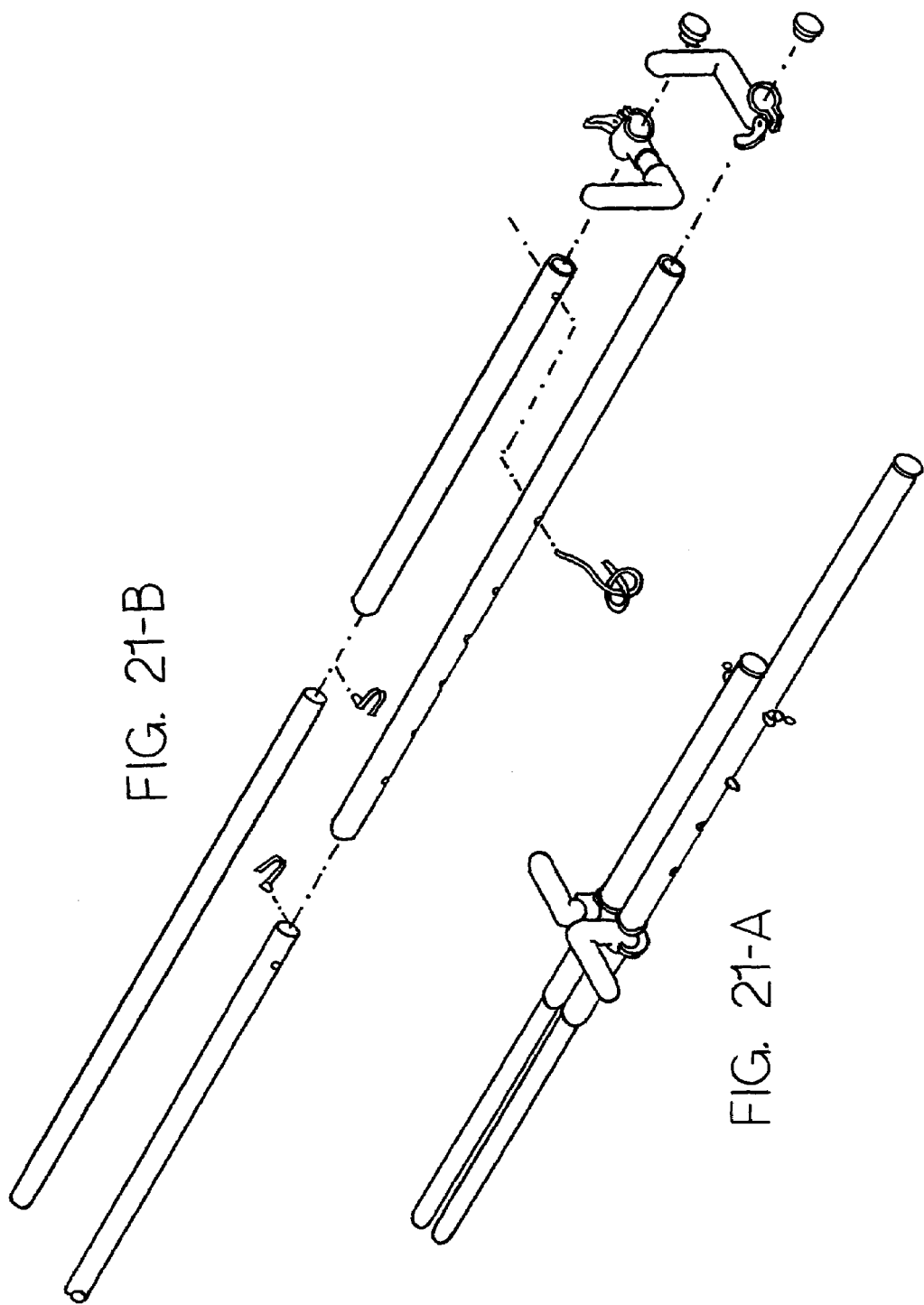

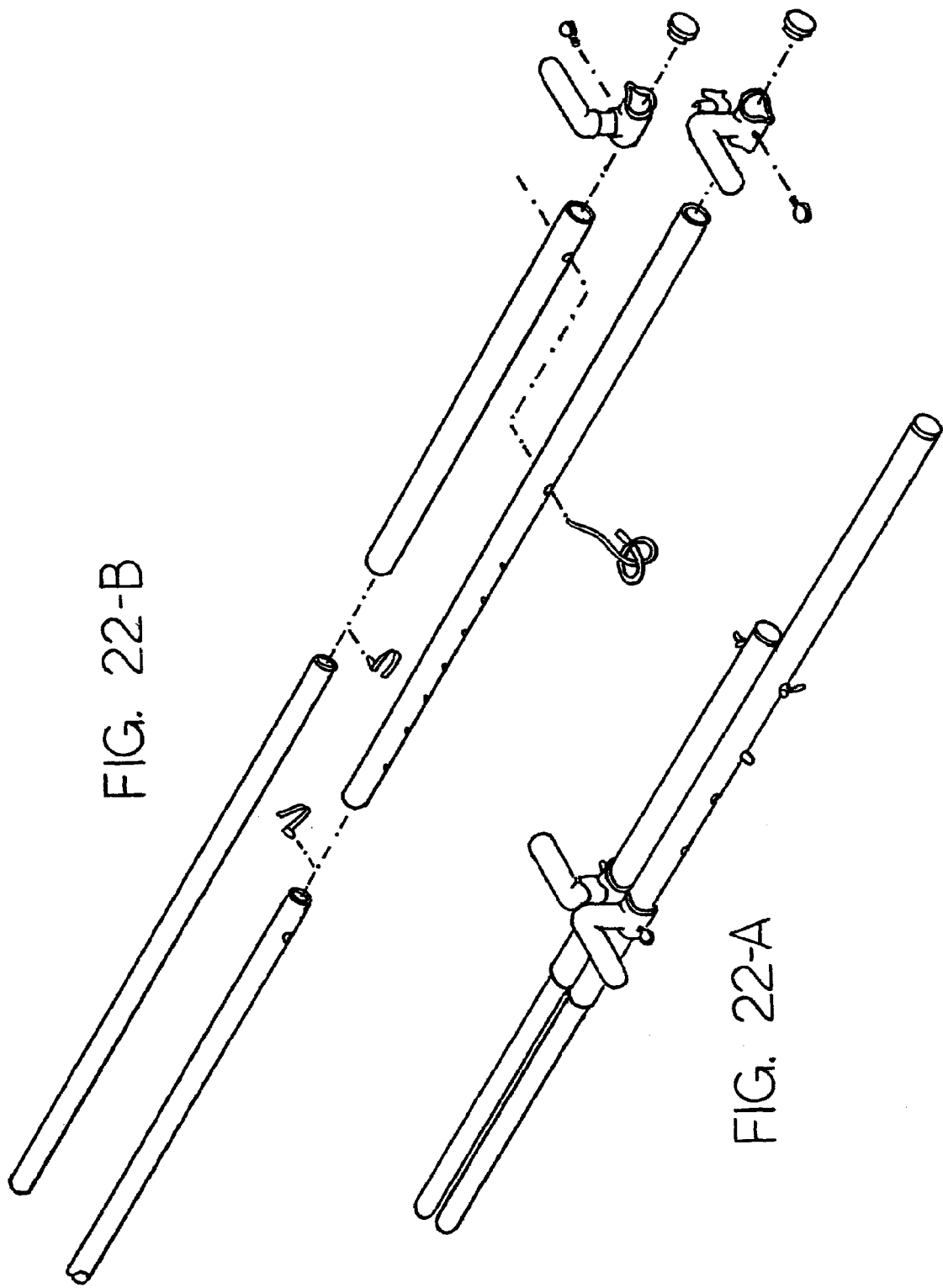
FIG. 22-B
FIG. 22-A

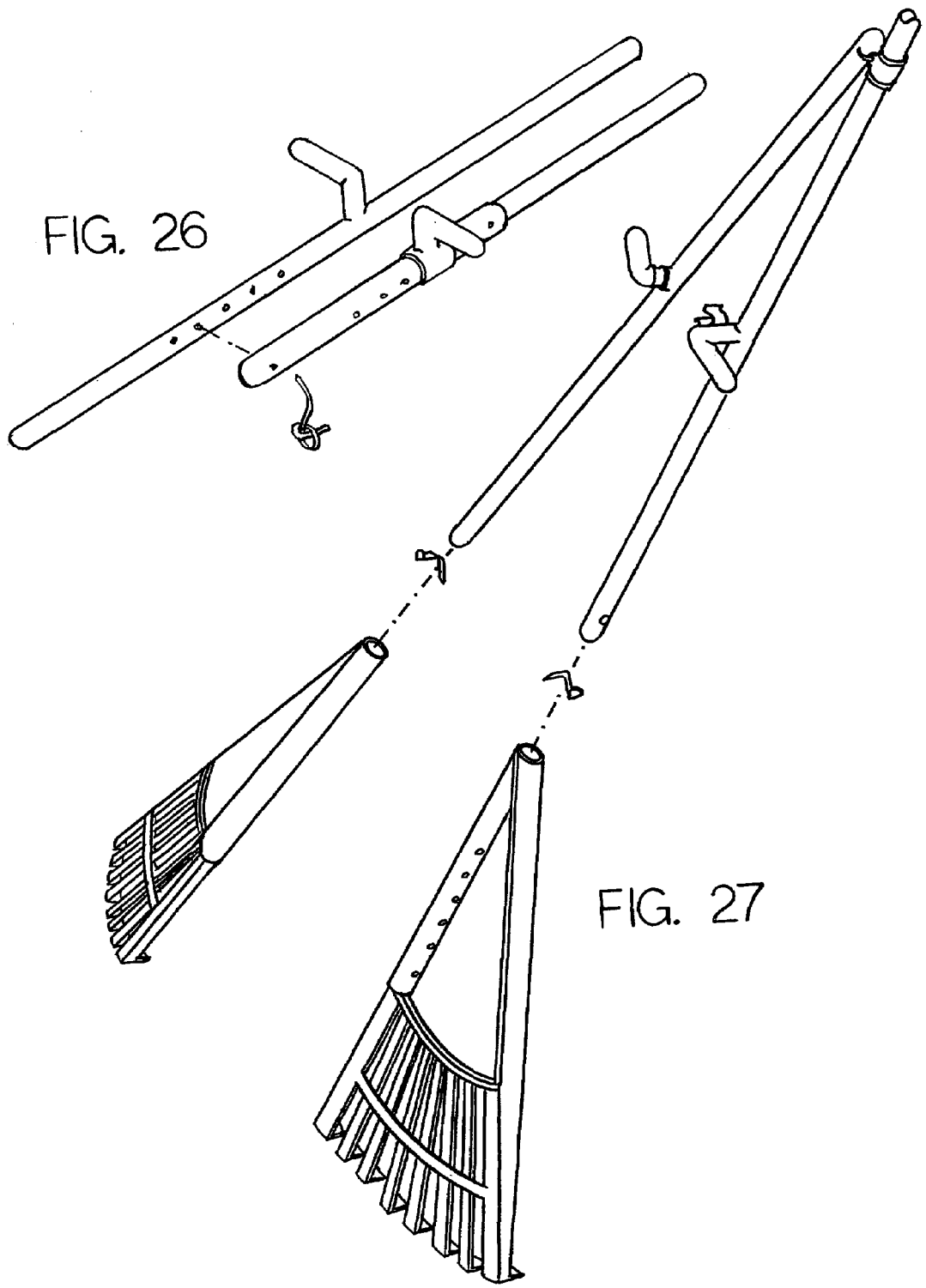

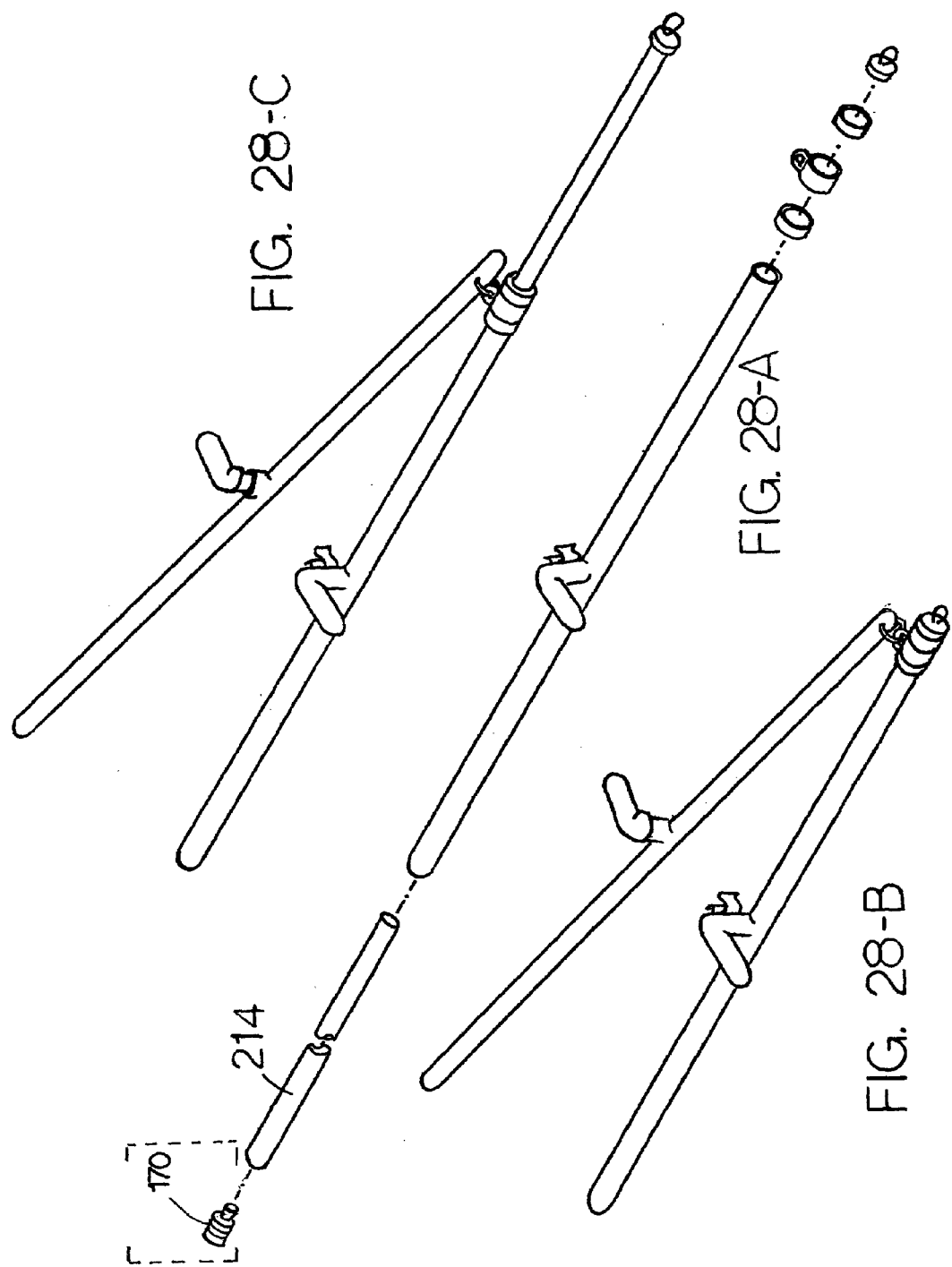

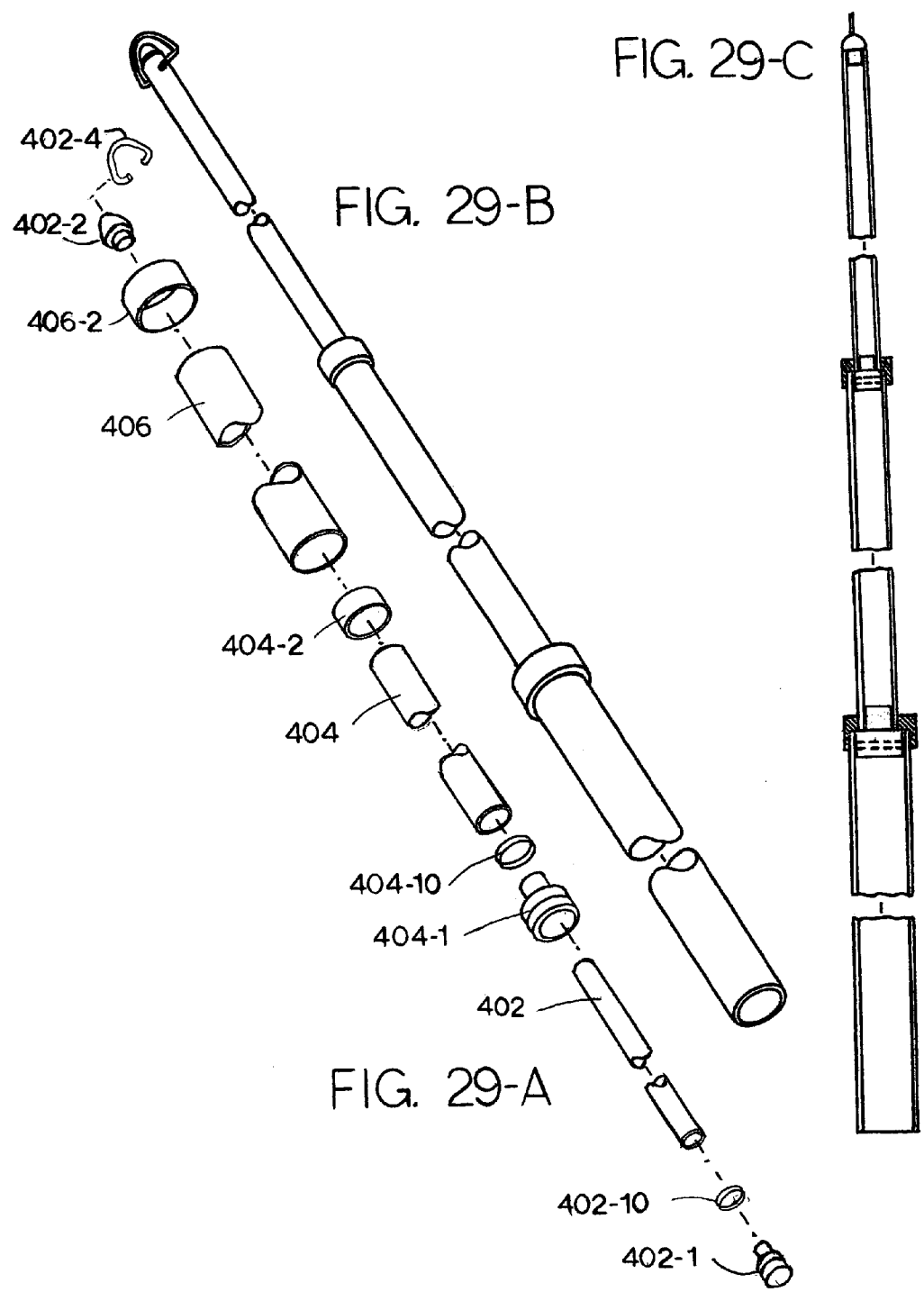

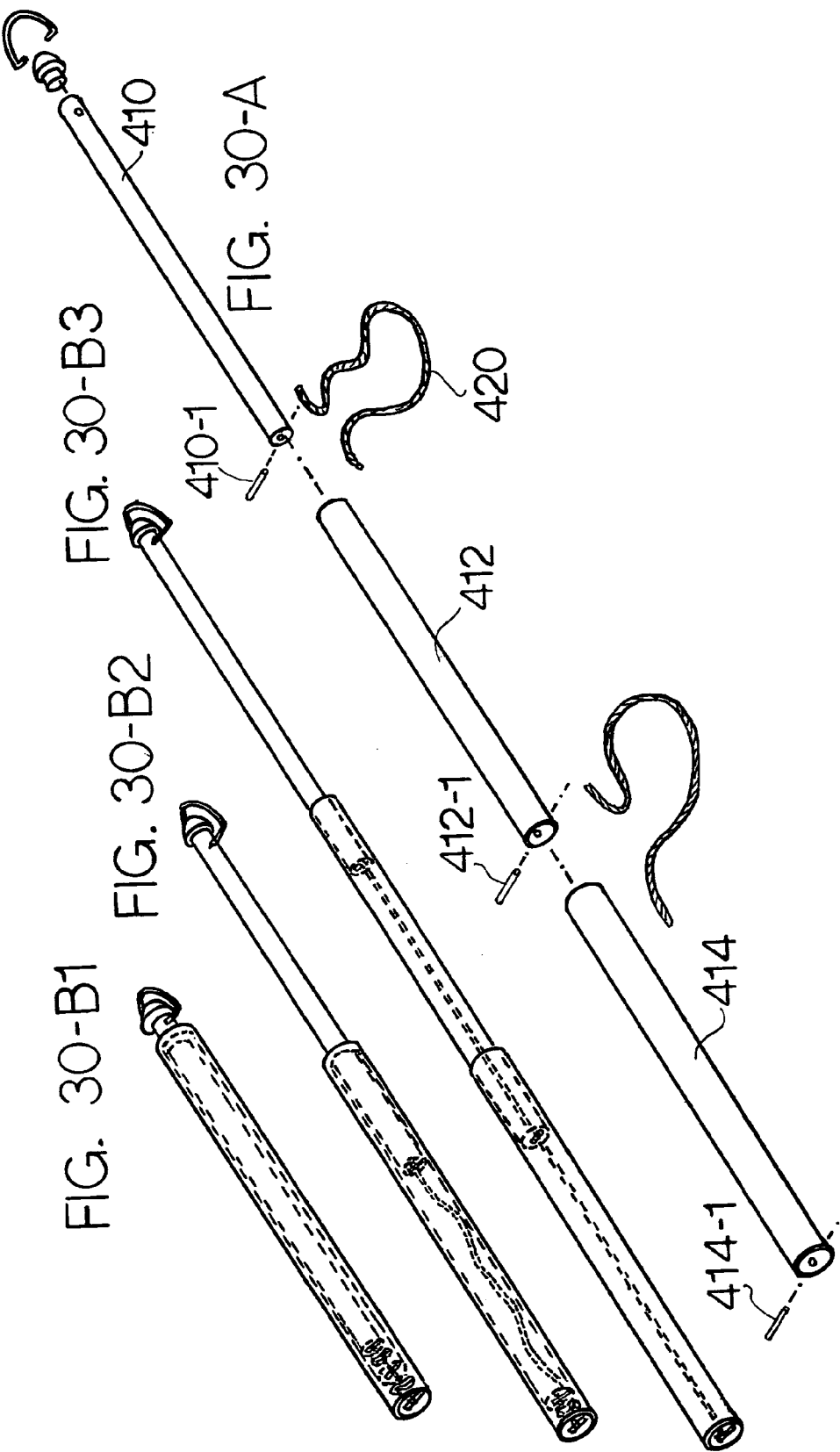

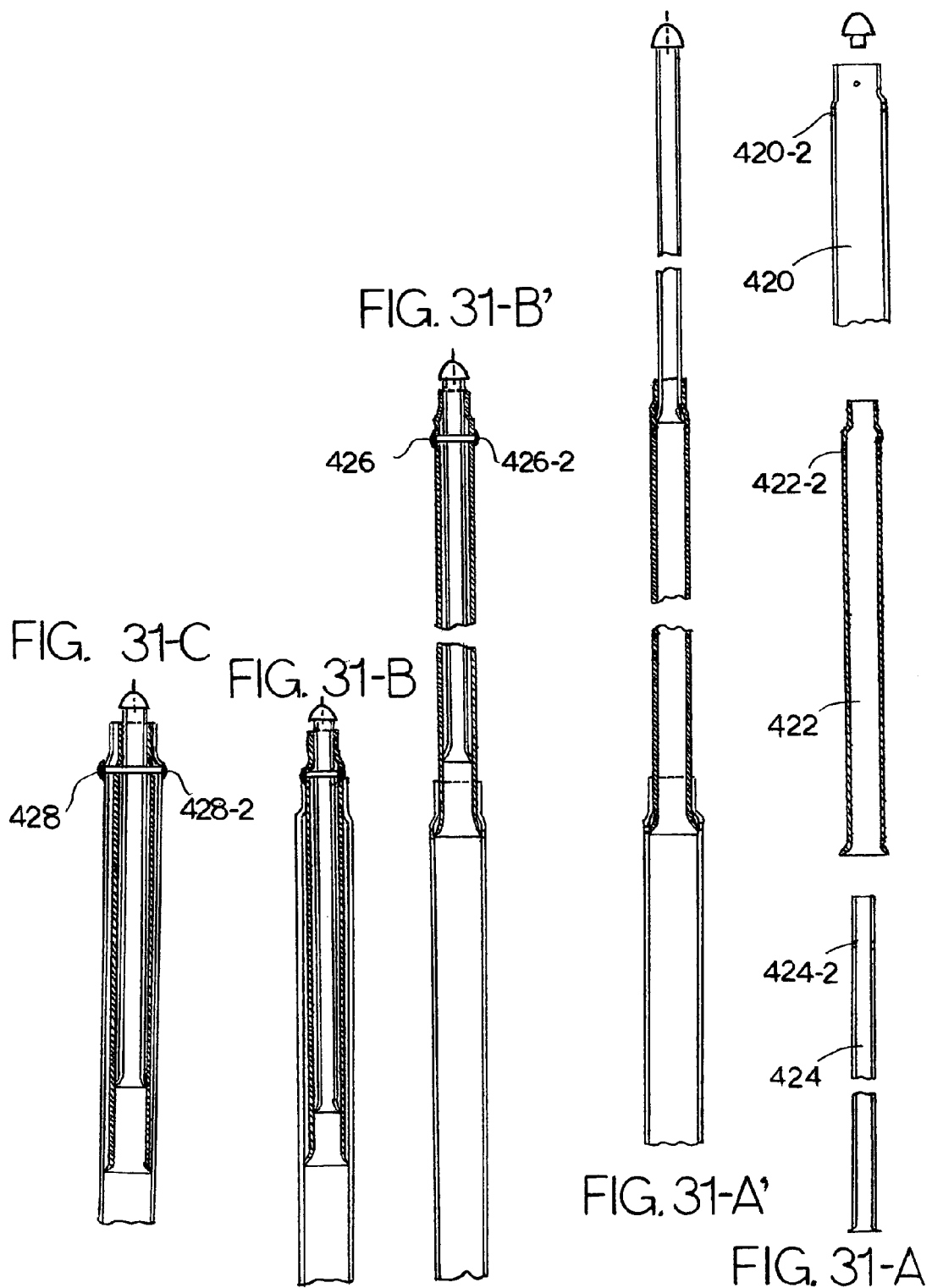

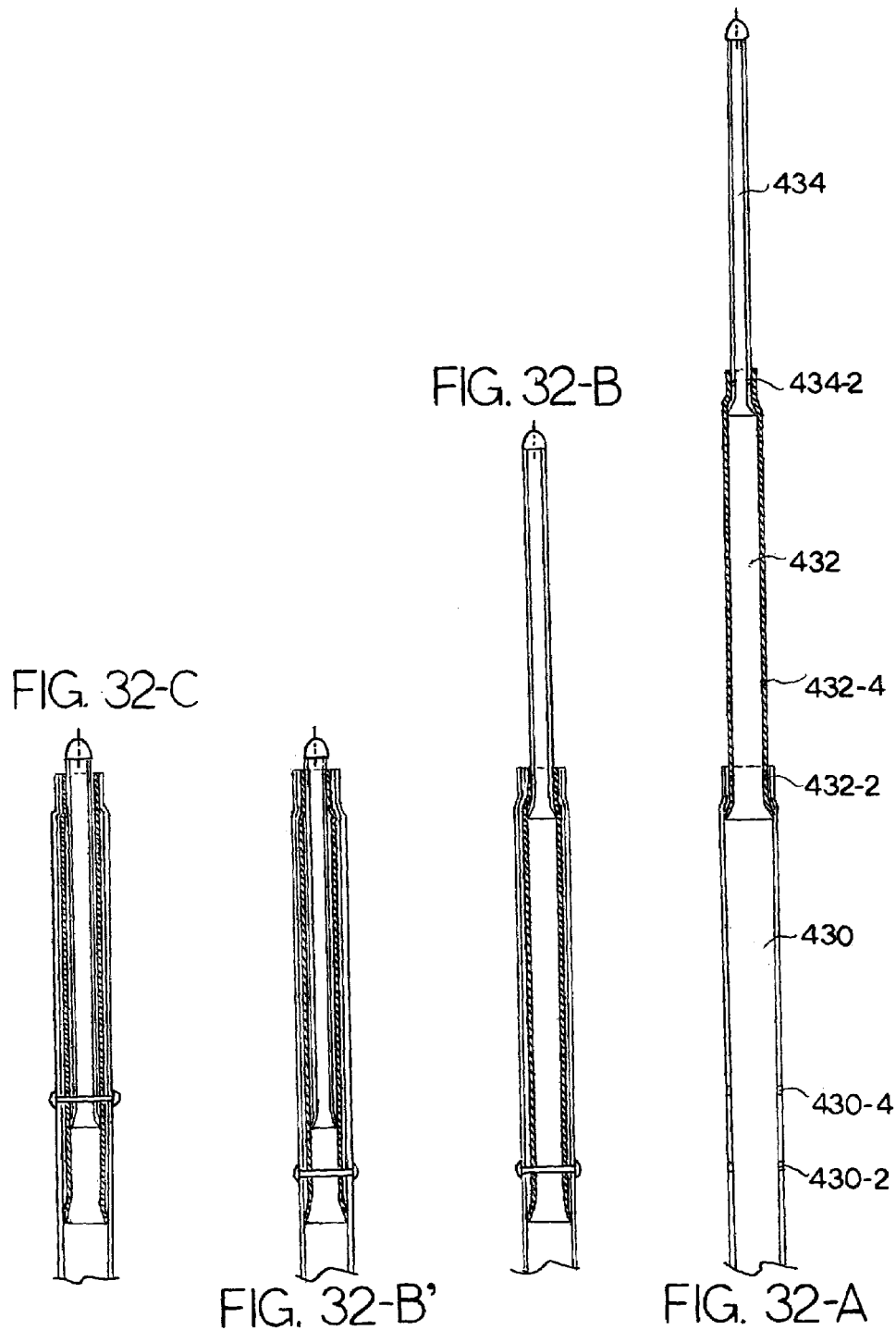

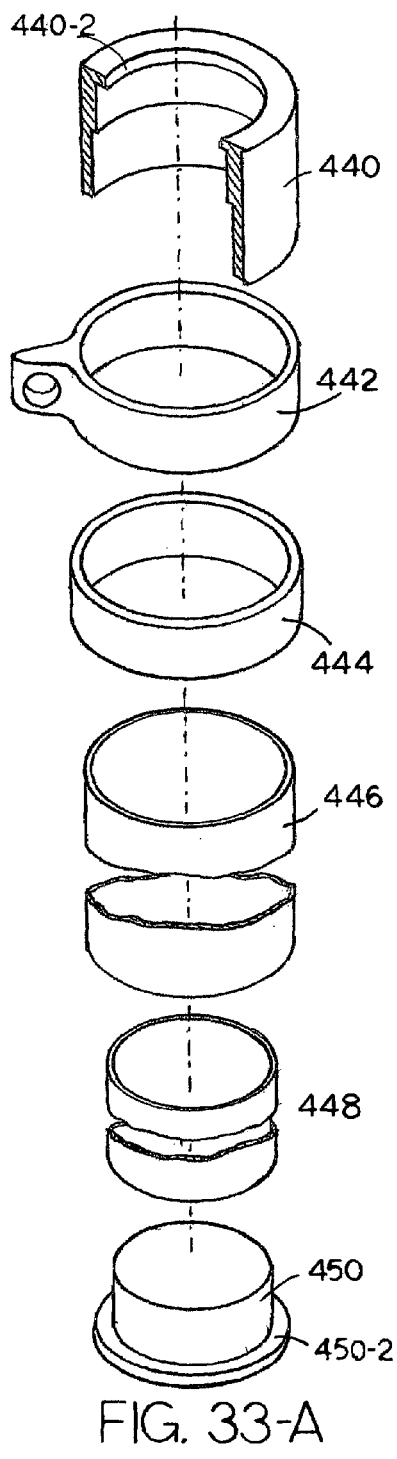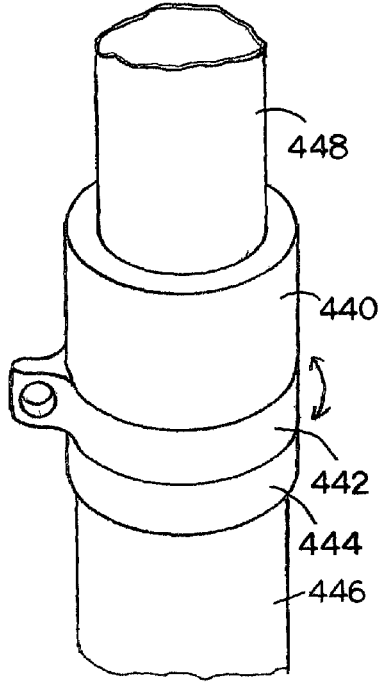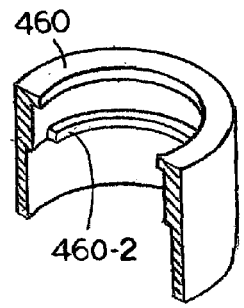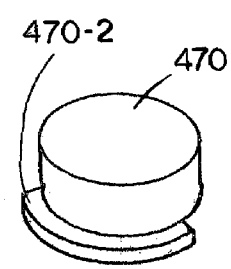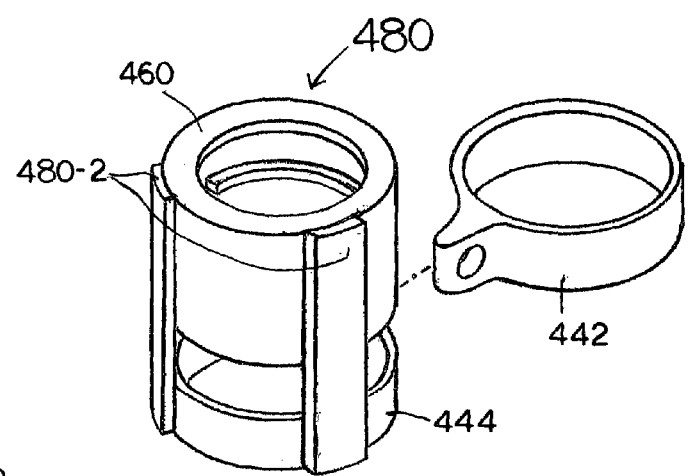
FIG. 33-A
FIG. 33-B
FIG. 33-C
FIG. 33-D
FIG. 33-E

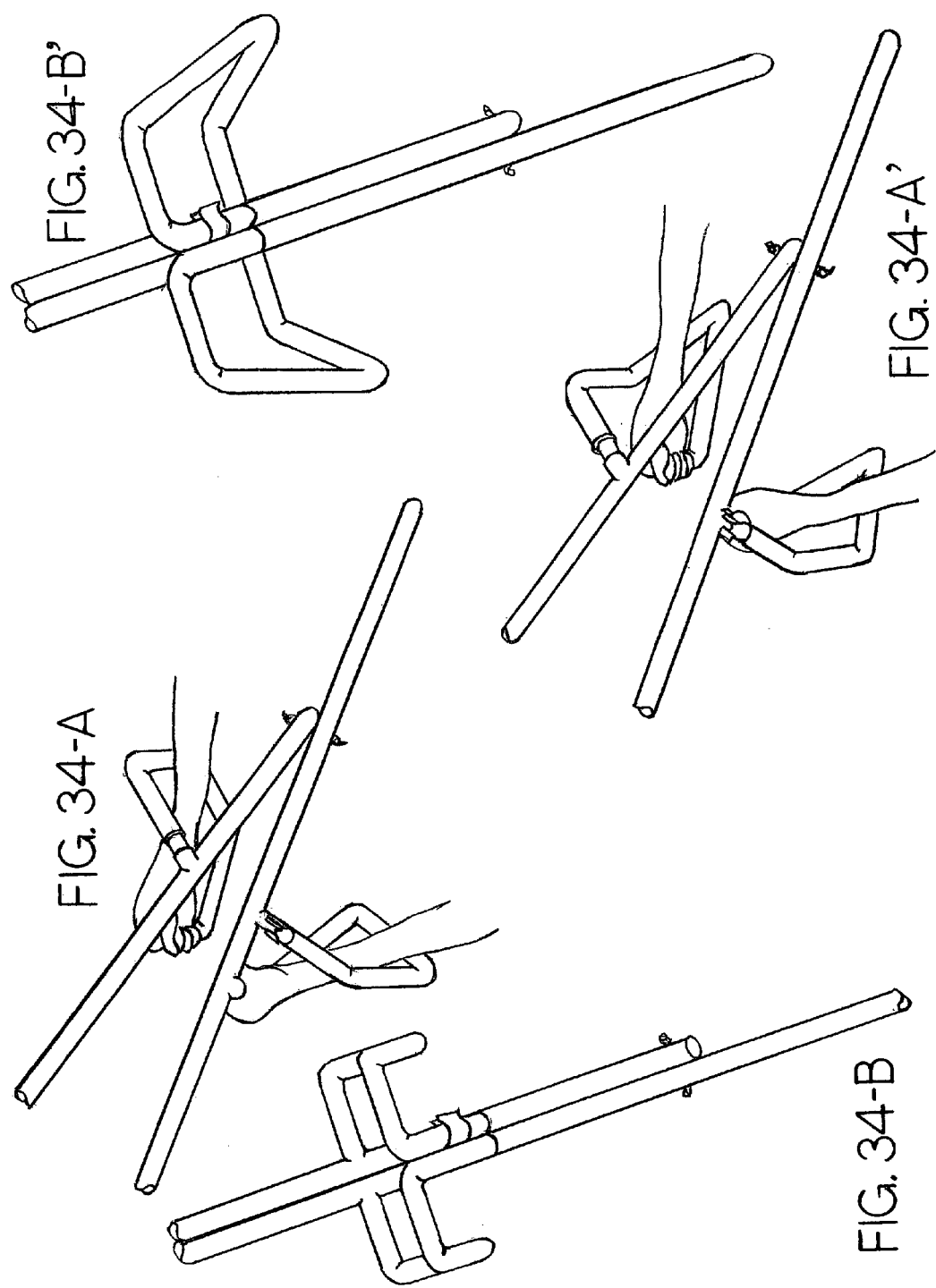

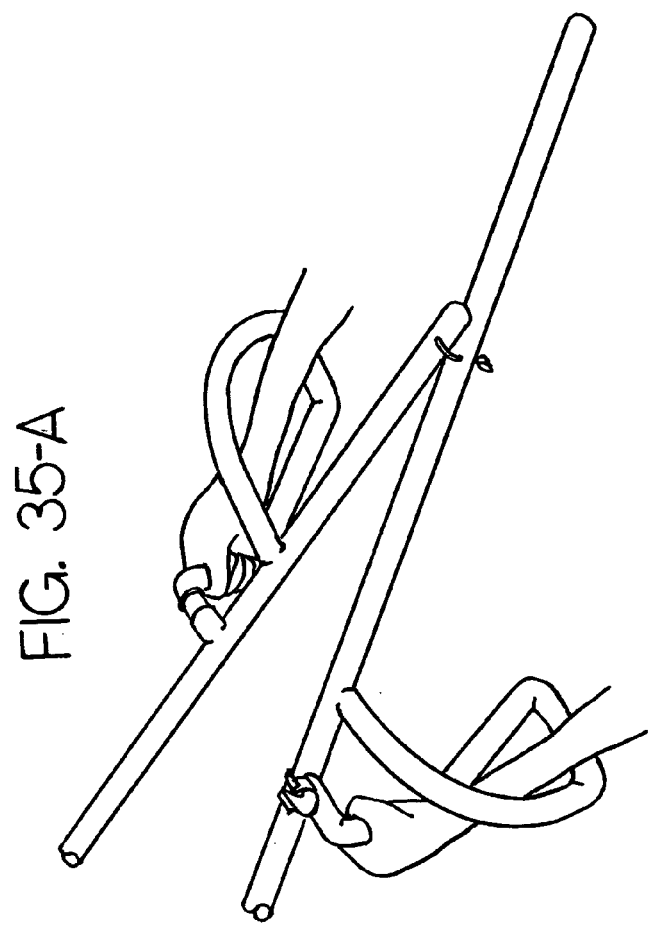
FIG. 35-A
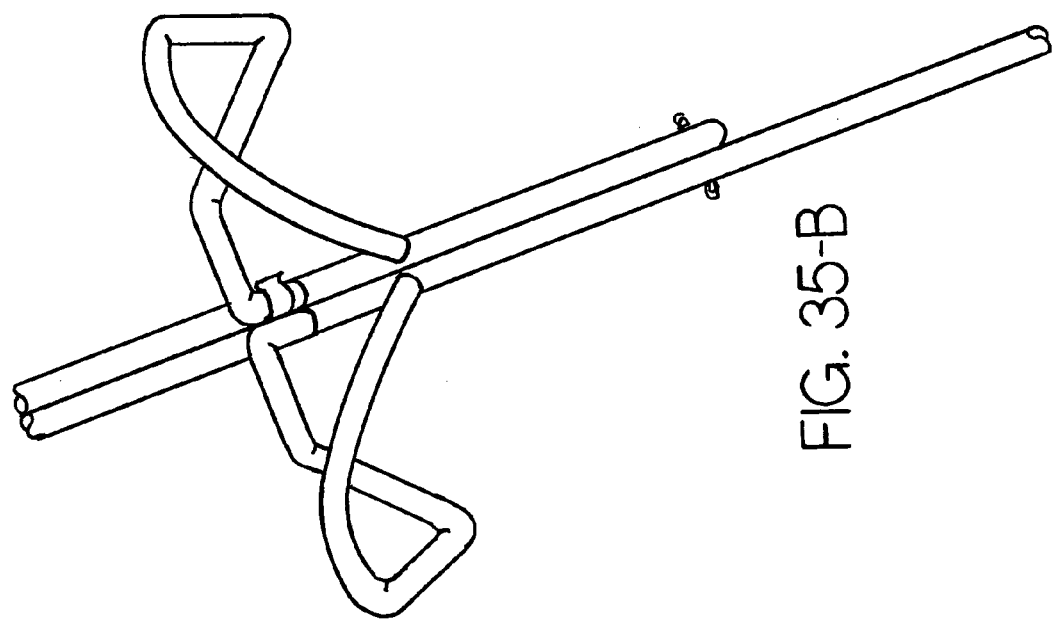
FIG. 35-B

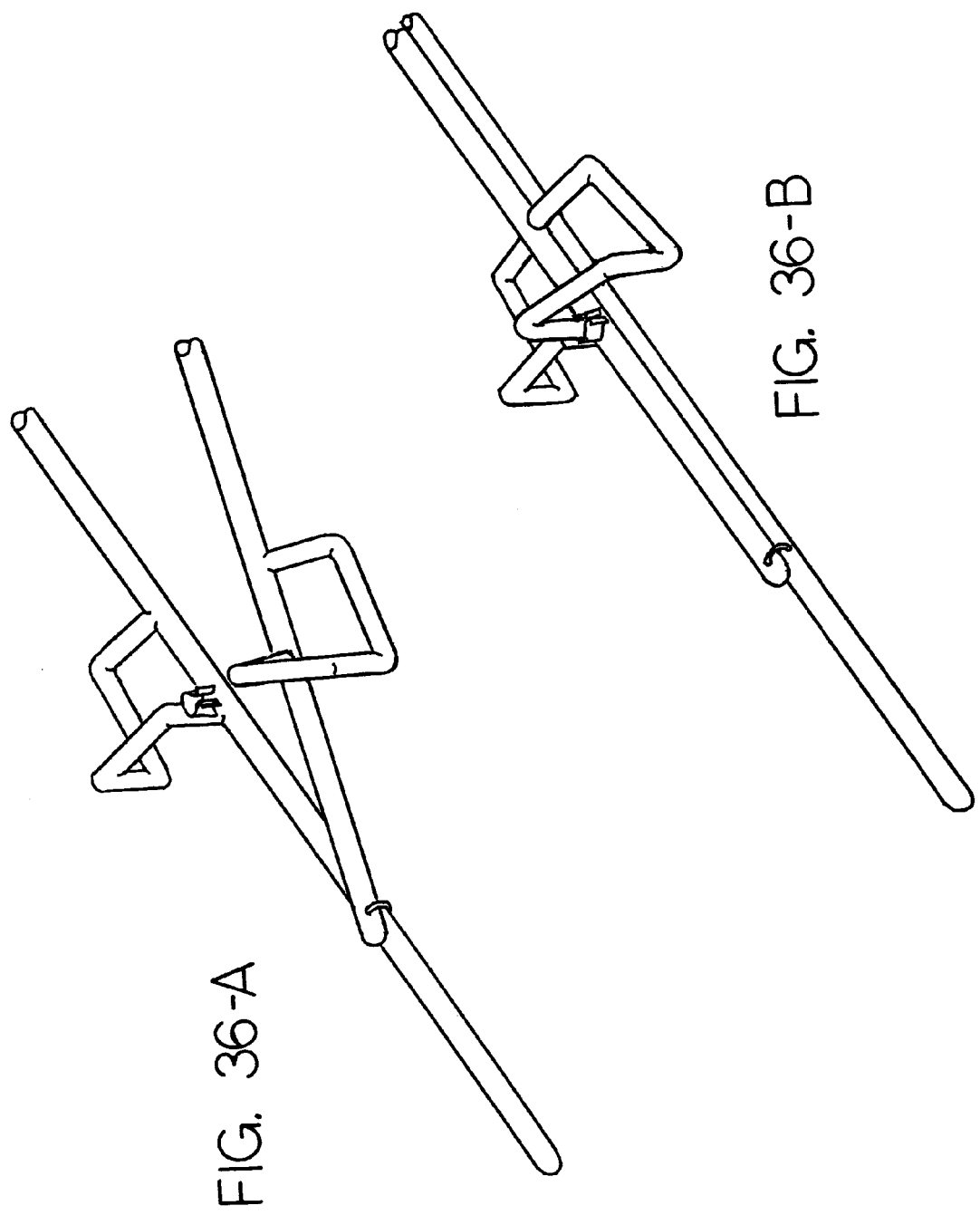

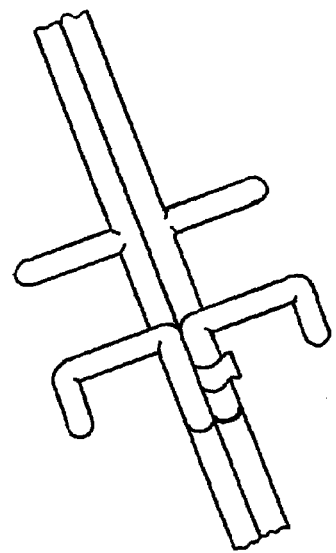
FIG. 37-A
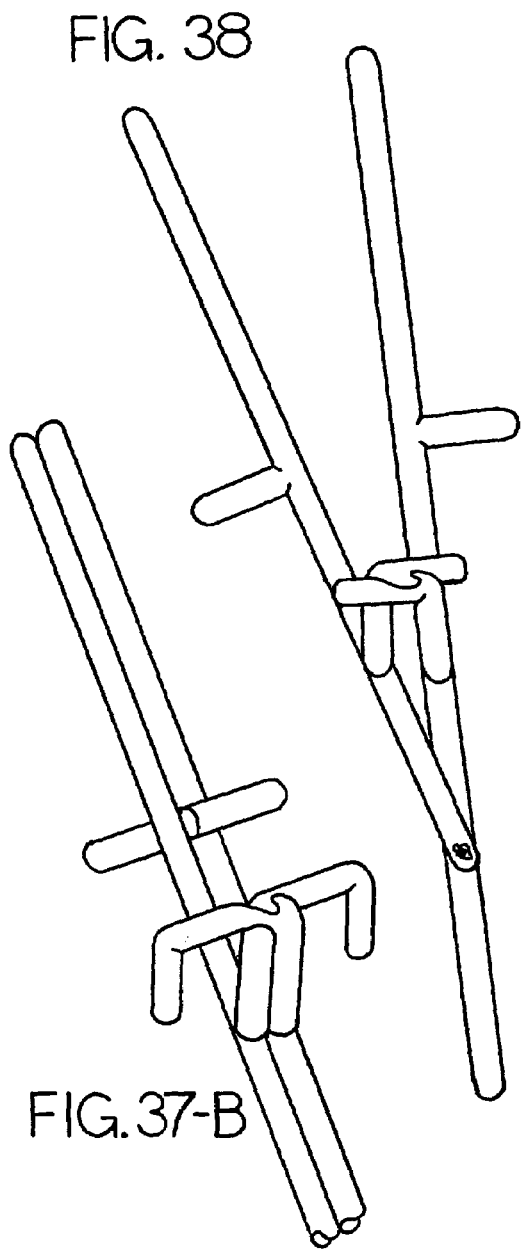
FIG. 38
FIG. 37-B

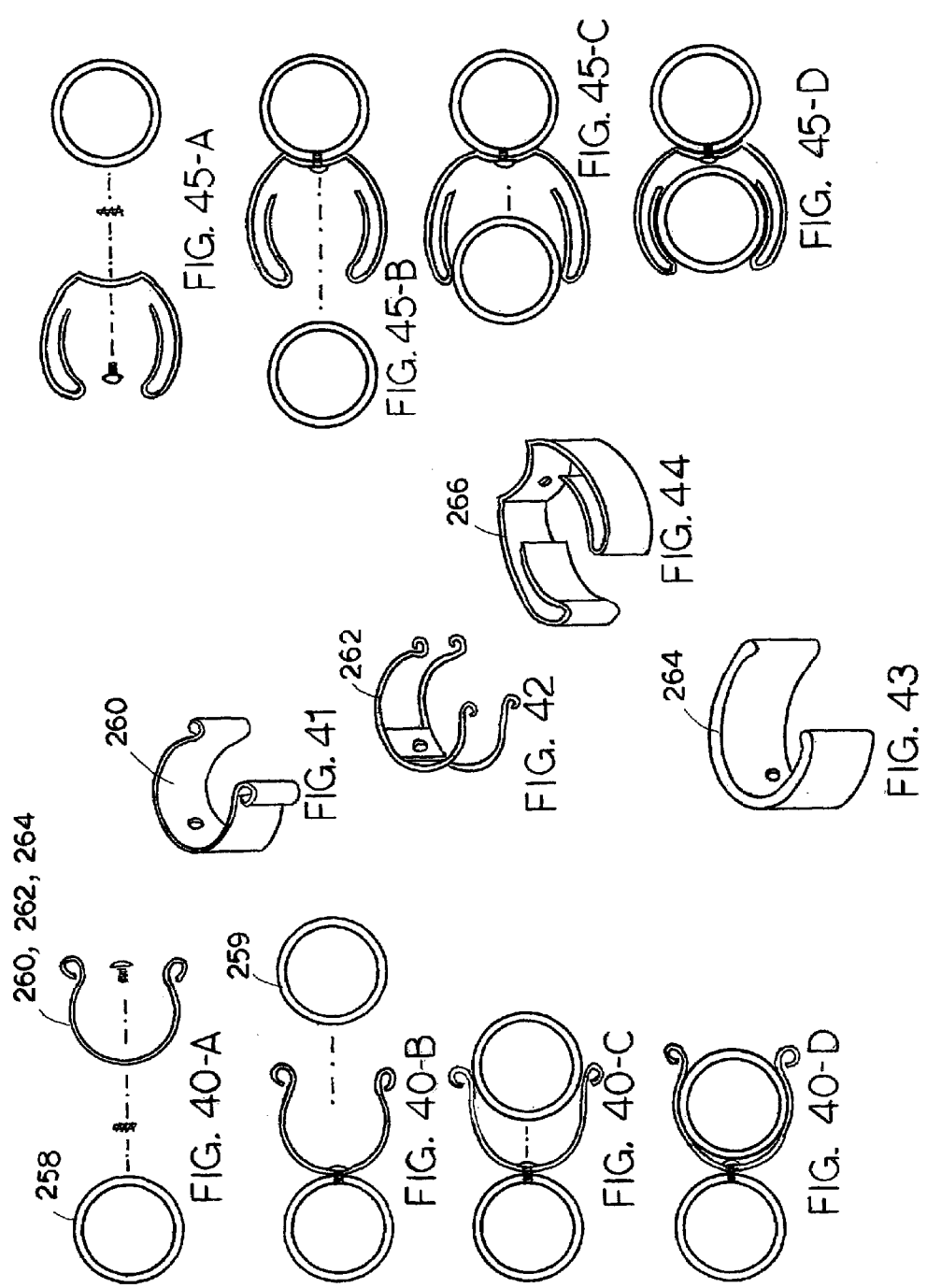

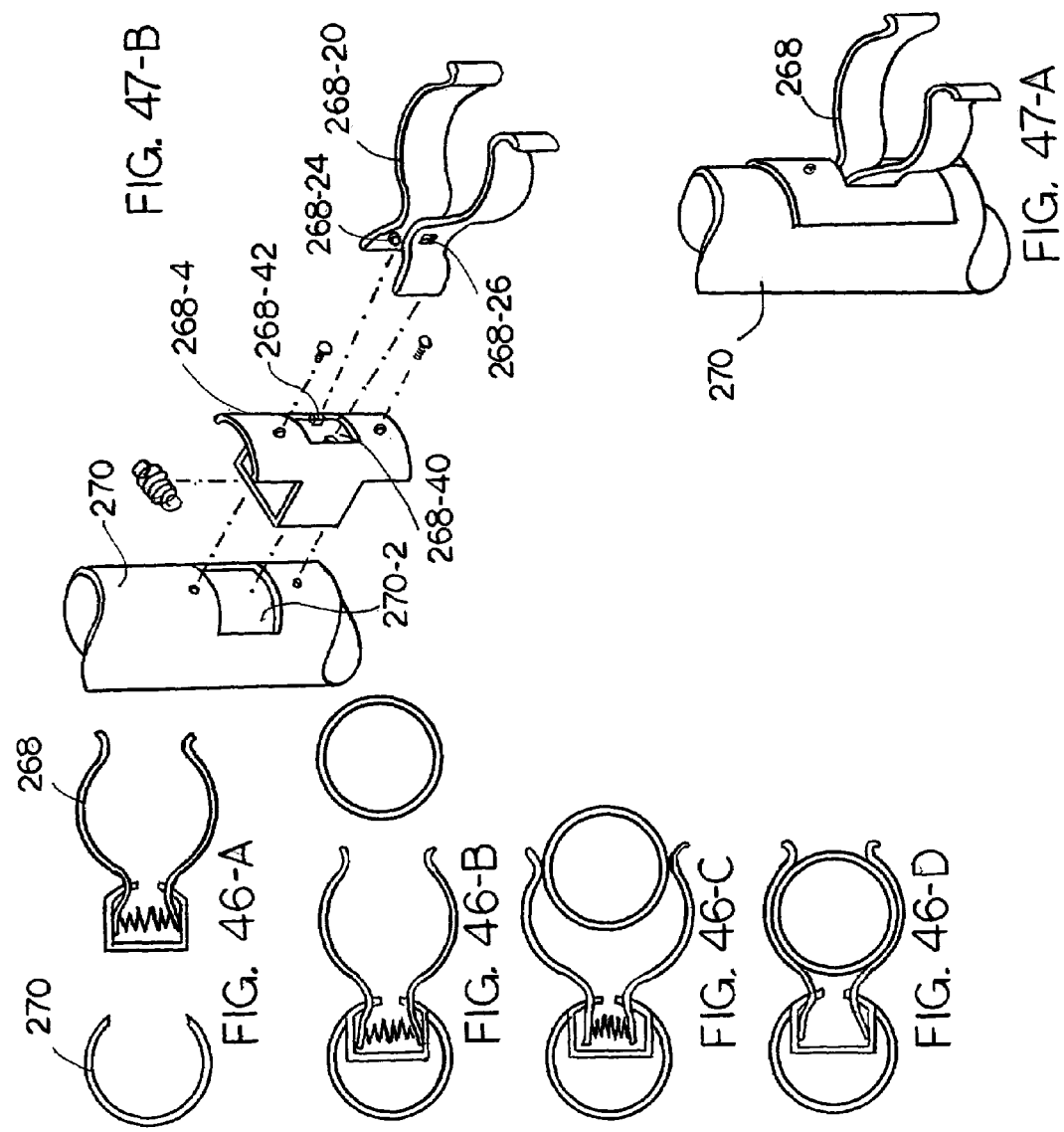

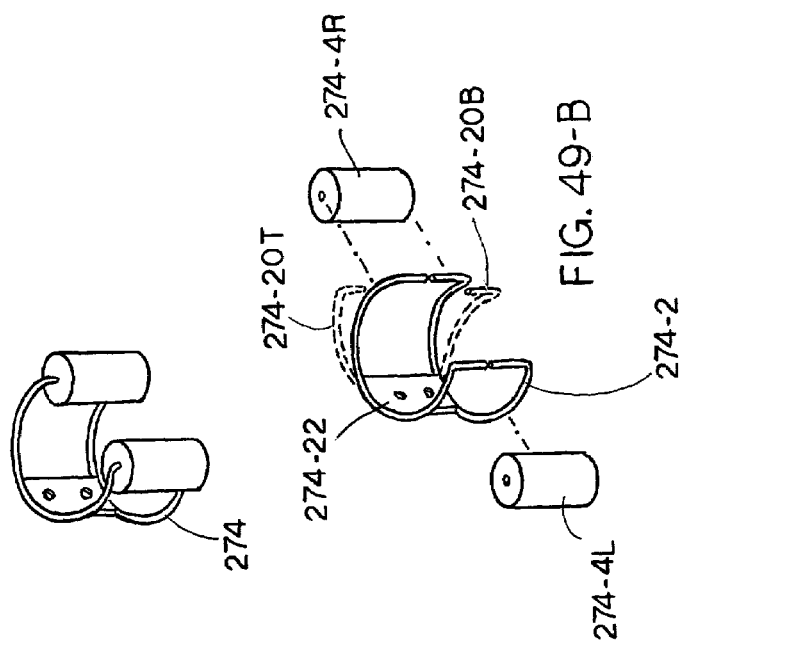

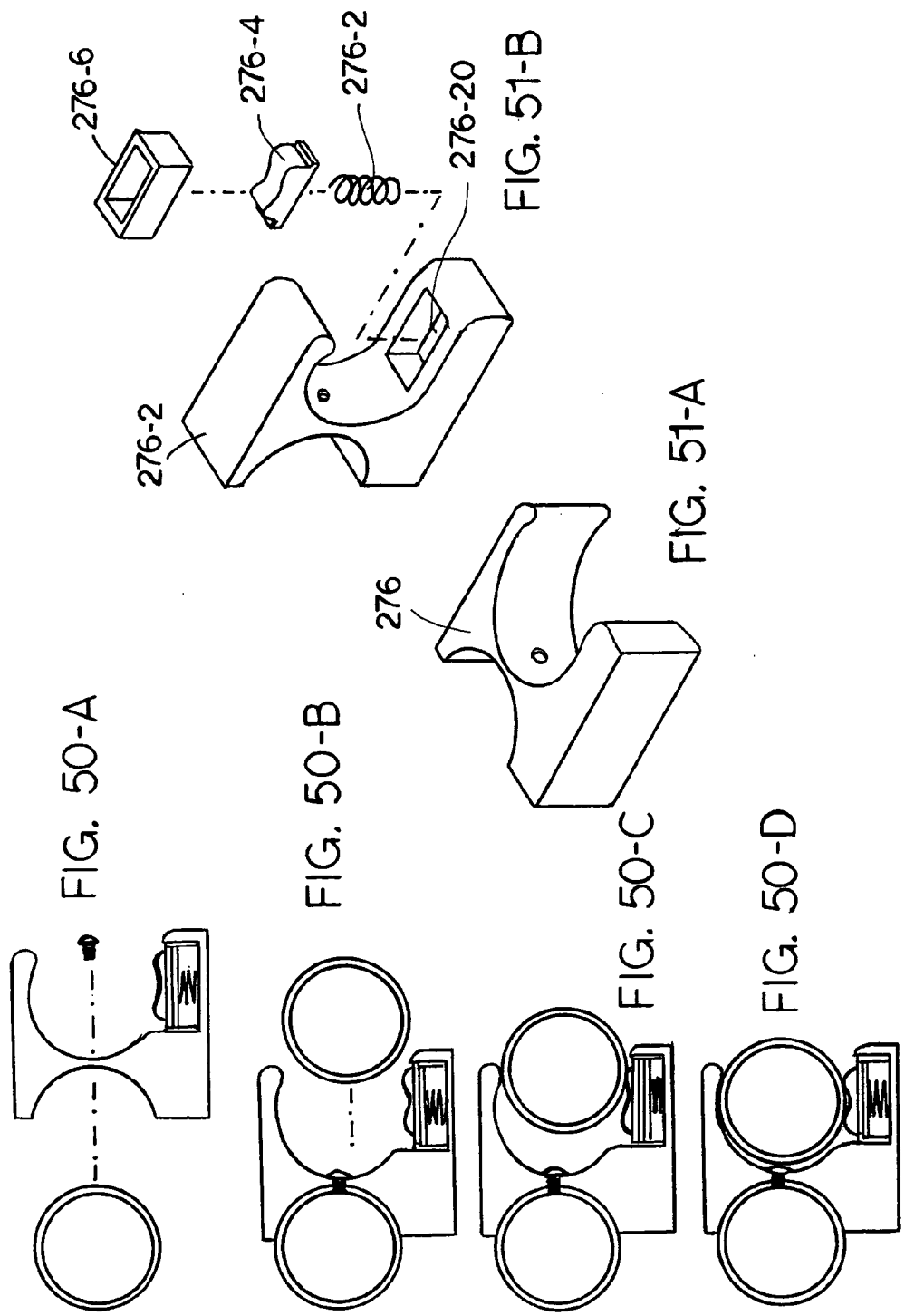

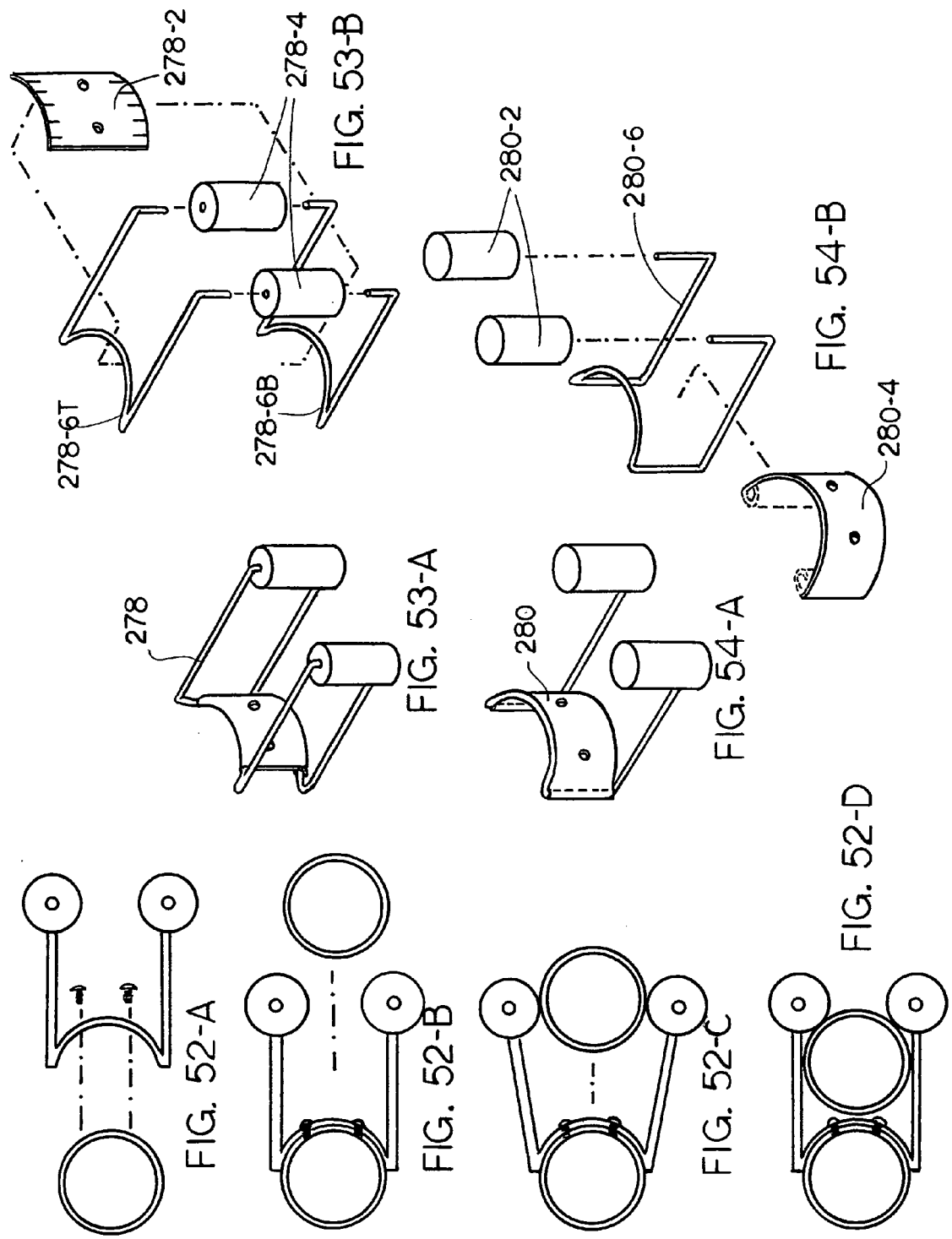

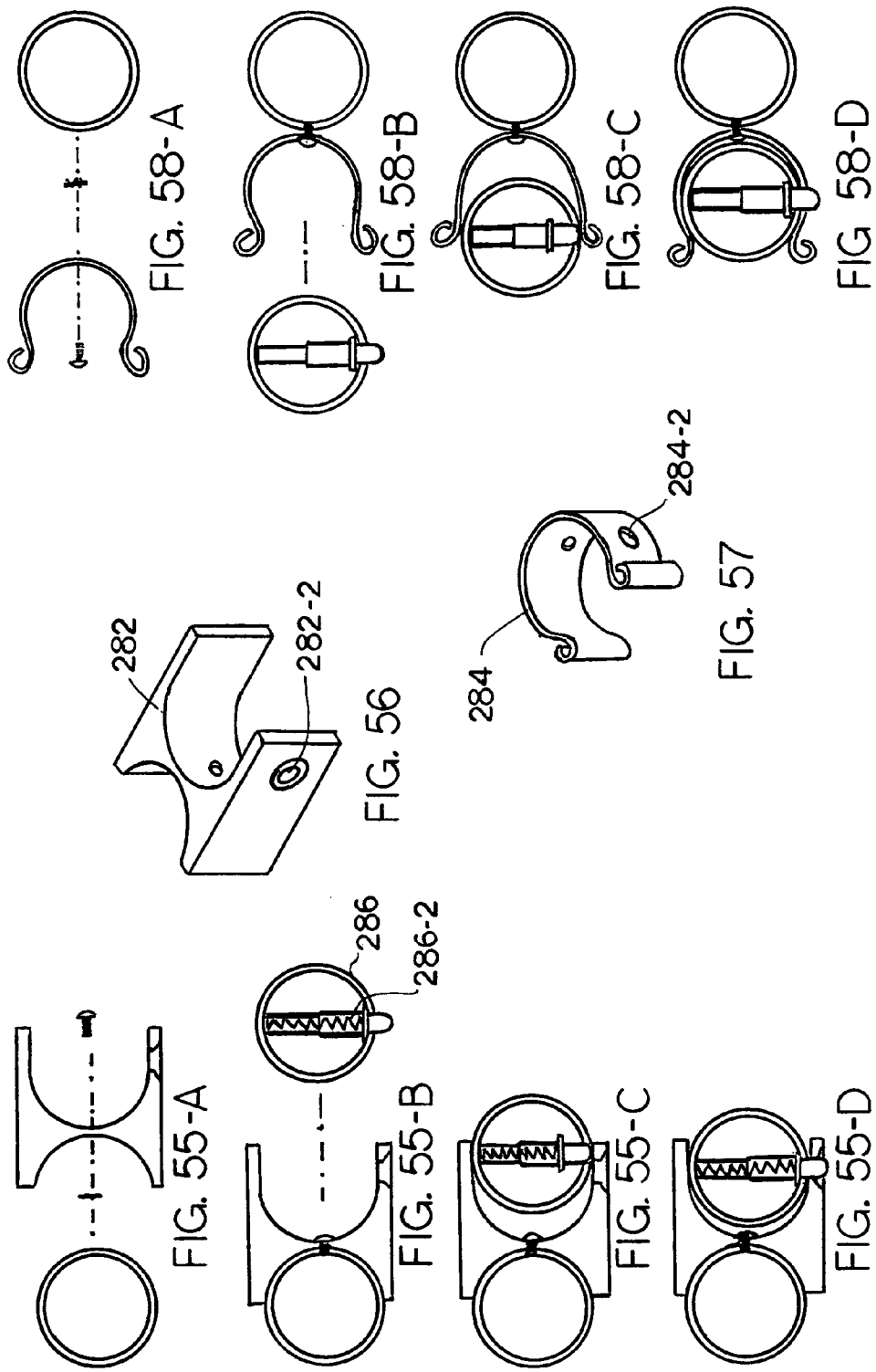

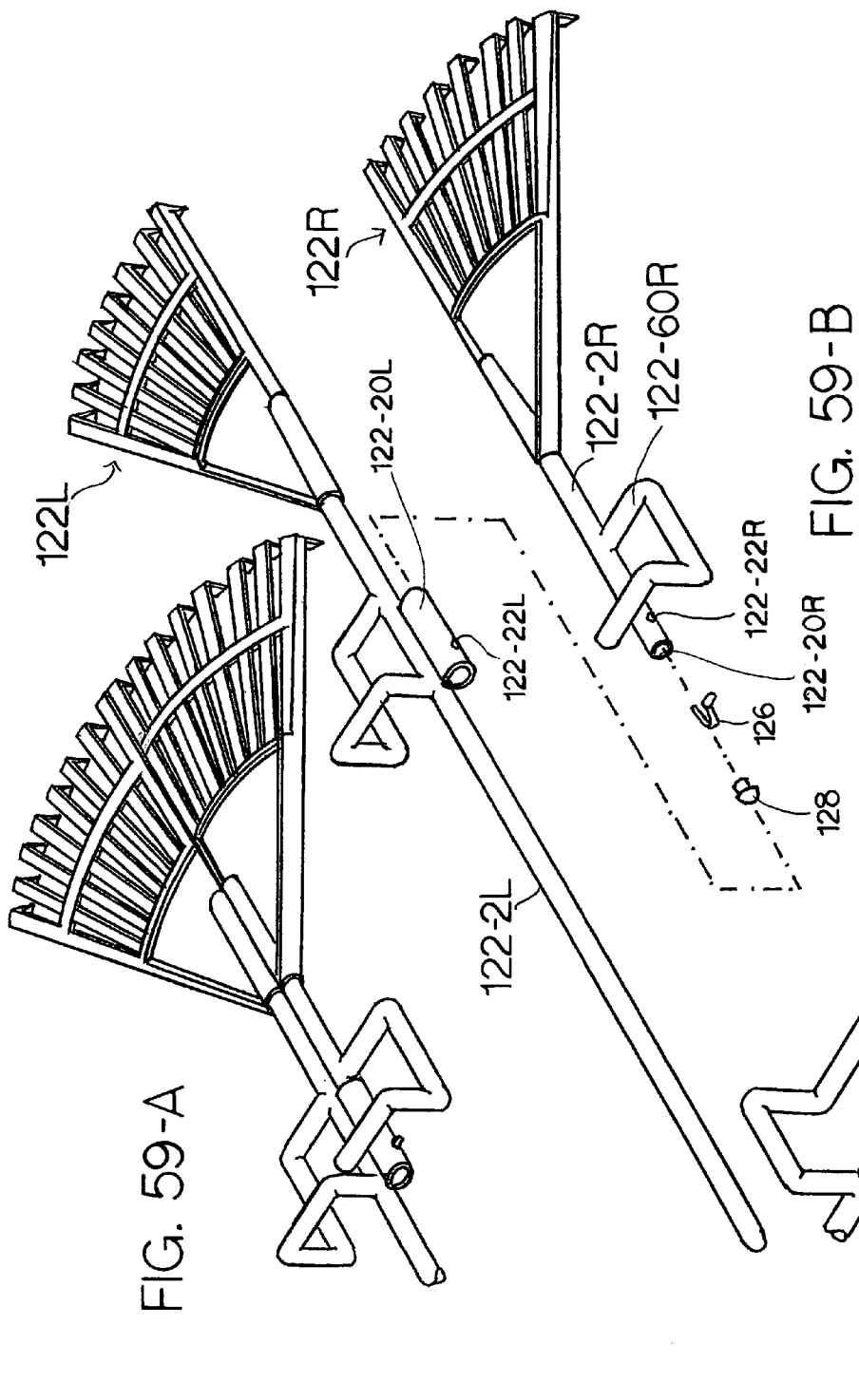

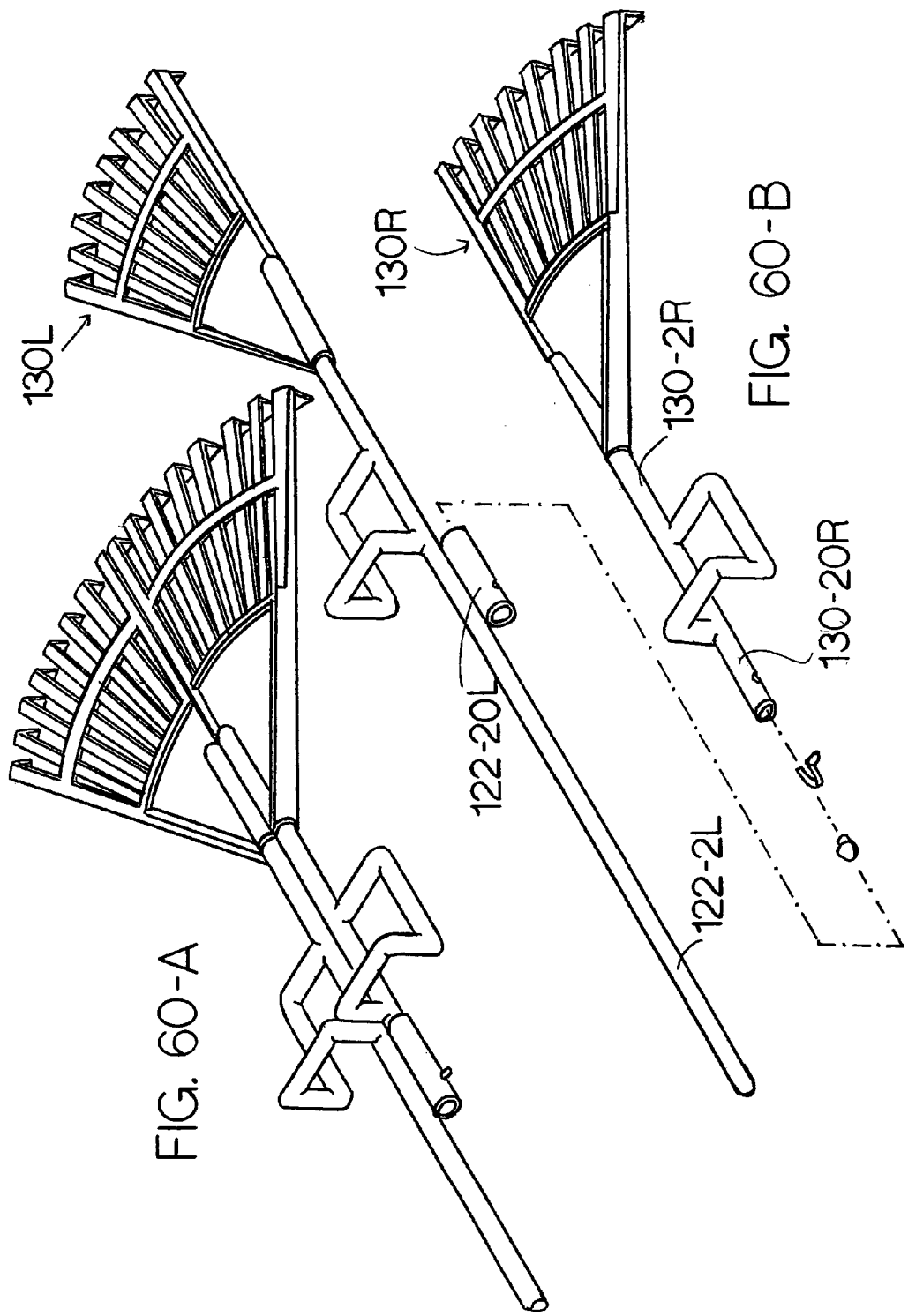

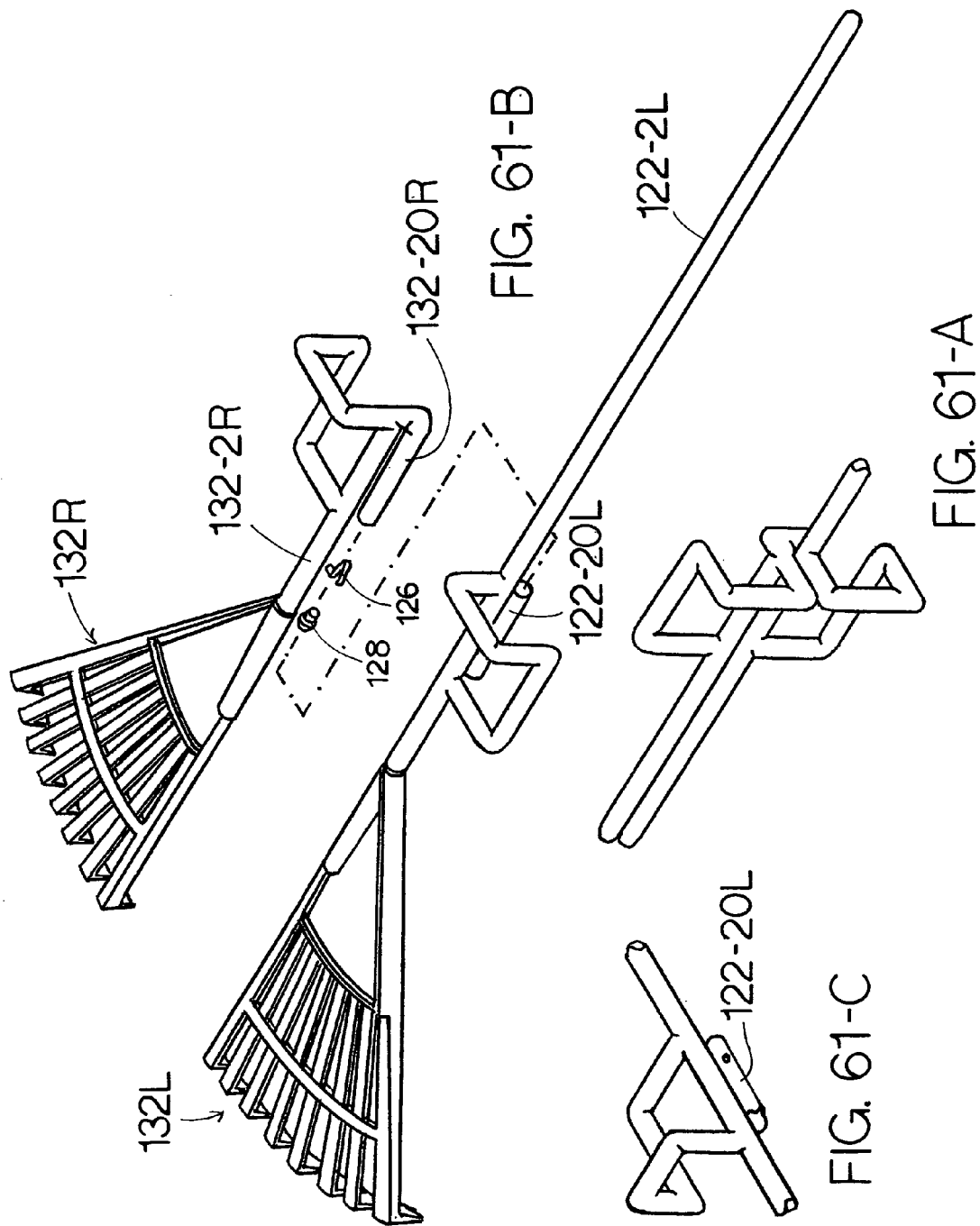

PICKING RAKE WITH DUAL RAKE HEADS AND DUAL RAKE HANDLES AND METHOD OF USE

CROSS REFERENCING TO RELATED APPLICATIONS

This is a continuation-in-part of application Ser. No. 10/002,763, now parent U.S. Pat. No. 7,131,255 filed Nov. 27, 2001. This CIP is also entitled to the benefit of Provisional Patent Application Ser. No. 60/253,552 filed Nov. 28, 2000.

BACKGROUND

1. Field of Invention

This invention relates to tools particularly to a tool for collecting and disposing of yard debris and other similar material.

2. Discussion of Prior Art

There are numerous ways of collecting yard debris. The more sophisticated ones involve a gadget that blows all the leaves and other light debris into a pile after which the same gadget sucks the gathered debris into a special sack. However, raking is still the most common means of collecting garden debris for the average consumer. It does not consume electricity or gasoline and provide safe good old-fashioned fun and exercise for the family. Rake heads come in many different shapes, sizes and quality each laying claim to a more efficient and better way of gathering wet leaves, gathering more leaves per stroke, "feels like bamboo", etc. They all accomplish just one thing, that is, gather the debris into a pile.

There are several types of rakes commercially available mainly through specialty catalogues that can pick up the gathered debris and deposit them into a collection bag.

One type of picking rake consists of two rakes, their rake heads facing each other and their handles joined scissors style at a point somewhere along their handles. The resulting combination picks up debris like giant tongs with each of the user's hands grasping the end of each rake handle. This is a very awkward way of picking up leaves. The fulcrum or pivoting point interferes with the line of sight of the user when used for picking up leaves. The unit is positioned vertically over the debris when picking and is subsequently lifted at another point closer to the rake head to enable the unit to clear the top of the collection basket before the handles are parted and the debris is released. It is not effective for picking if used even slightly inclined because the weight of the debris and the torque derived from the long moment arm is too much for the user to overcome. Furthermore, this combination provides the same span as a single rake head and for twice the weight.

Another type comprises a rake head and shovel combination but was shown in prior art to be heavy and complicated to operate. A shovelful is also not a large volume thereby requiring more effort and time to get the job done.

A third type consists of two half-rake heads that can fold toward each other via an intricate string trail spread on the face of each half-rake head. The user pulls the end of the string to effect the folding. The string movement is hampered when the string trail gets clogged by debris adhering to the nooks and crannies of the rake head. Furthermore, the volume of debris picked per fold is not much thereby requiring again more time and effort.

Still another type consists of a dome-shaped rake head with tines arranged radially on its perimeter when in the raking mode. When the user pulls a slider along the handle, the tines collapse inwardly to envelope a ball of debris like what a person's five fingers would do to pick up something the size of about a handful. This type of rake head is laborious to fabricate and can be limited to the use of metal wires. Consequently, the pick-up volume is not much unless the circular rake head is considerably extended. Doing so with metal tines poses a safety hazard to users and other creatures nearby. Collapsing a larger head also requires more effort. The dome-shaped rake head is not as efficient in the raking mode as an ordinary planar-shaped one.

Still another prior art item as presented in U.S. Pat. No. 5,901,540 is a combination of basically two rake heads facing each other. One hand ends at a pivot connection between the two rake handles. This shorter handle rests on the longer handle in the raking mode. The rake head attached to the longer handle has tines extending in two opposite directions, one for picking and one for raking. Picking debris is accomplished by turning the combination over and allowing the rake heads to separate by virtue of the weight of the rake with the shorter handle. The debris is then sandwiched between the two rake heads and delivered to a collection basket by lifting both handles of the rake. While the pick-up volume is good, the method is awkward and cumbersome. This combination provides the span of a single rake head and for about twice the weight.

Another type consists of a regular rake head and handle that has an optional detachable scooper anchored onto the top face of and completely overlapping the rake head. To pick up debris, the user has to bring up the rake head and manipulate the fasteners which is not an easy and quick process at all. The rake and the scooper are used together to pick up debris but the user still has to stoop and bend to do so.

In general, prior art picking rakes have low pick-up volumes and at best the same raking efficiency for about twice the weight of a regular rake. Some pick-up methods need some "getting used to". They generally do not conform to the natural tendency exhibited by a person when attempting to lift something bulky which simply consist of extending one's arms outward sideways, moving your arms toward each other and enveloping the bulky something. Again, prior art methods for picking up debris are awkward, cumbersome, and thus require more physical and mental effort.

SUMMARY OF THE INVENTION

In accordance with the present invention, a picking rake comprises of two rake head and rake handle units with differing handle lengths joined permanently or semi-permanently at a pivoting joint that allows the faces of the rake heads of the two connected units to substantially face each other by separately turning and subsequently swing inward and outward in opposite directions. The raking handle is outfitted with members that extend from the handle for use as a hand grip or an arm grip. The length of the rake handle, the location of the grips, and the location of the pivoting joint can also be adjusted to the user's size. Another embodiment allows the rake units to be detachable from each other for use during the picking operation.

OBJECTS AND ADVANTAGES

Accordingly, the present invention has several objects and advantages.

The picking rake is able to utilize the combined span of the dual rake heads for both raking and picking tasks making it a more efficient rake. The added efficiency may be more than enough to compensate for the extra weight of the additional members. Even if the rake heads overlap, the extra weight of the overlapping faces is compensated because of the added stability and the increased pick-up capacity derived.

The picking rake is operated in a manner that closely approximates the natural tendency exhibited by the arms of a person when confronted with the task of picking up something bulky minus the associated bending and stooping. Consequently, the user of this picking rake can pick up voluminous quantities of debris with less physical and mental effort or concentration than with other types of picking rakes.

The picking rake can easily be maintained and repaired and can adjust to the user's size and whether he of she is left-handed or right-handed.

In the raking mode, the rake heads of the picking rake may be designed to closely resemble the looks of any ordinary rake head with or without an overlapping section. The rake heads do not necessarily have to overlap just so they can be used for picking. They do not have to be dome-shaped, have dual-facing tines, or look like a shovel. The ordinary consumer can readily adapt to the picking rake.

The picking rake can be made easy to fabricate and assemble. The hand and arm grips may be an integral part of the rake head itself. They may be pre-molded separately and fastened onto the rake handles or rake heads. There is no complicated pivoting joint hardware to tool. The pivot joint may just be a knotted cord or rings or an easily snapped on article having the desired joint. The article that is snapped on allows for easy detachability for whatever purpose. There are no sliding controllers. Some of the grippers are easy to fabricate to the right specifications.

DESCRIPTION OF DRAWINGS

FIG. 1-A is a perspective view of the picking rake with non-overlapping rake heads and non-extendible handle in the raking mode using only one gripper.

FIG. 1-A' is a perspective view of the picking rake in FIG. 1-A using two grippers.

FIG. 1-B is a perspective view of the picking rake in FIG. 1-A with its two rake units detached from each other.

FIG. 1-C is an exploded view of the assembly of components of the picking rake in FIG. 1-A.

FIG. 1-D1 is a perspective view of the picking rake in FIG. 1-A showing its use as a rake.

FIG. 1-D2 is a perspective view of the picking rake in FIG. 1-A in the process of picking debris.

FIG. 1-D3 is a perspective view of the picking rake in FIG. 1 in the pick-up mode.

FIG. 2-A is a perspective view of the picking rake in FIG. 1-A having D-type rings as a pivoting joint.

FIG. 2-B is a perspective view of the rake in FIG. 2-A in the pick-up mode.

FIG. 2-C is an exploded view of the assembly of components of the rake in FIG. 2-A.

FIGS. 3-A, 3-B, and 3-C are partial perspective views of the assembly of components, the assembled unit in the raking mode, and the assembled unit in the pick-up mode for a pivoting joint comprising of a ring and aperture for the right rake handle and a ring freely turning about the longitudinal axis of the handle and retained by two fixed rings for the left rake handle.

FIGS. 4-A, 4-B, and 4-C are partial perspective views of the assembly of components, the assembled unit in the raking mode, and the assembled unit in the pick-up mode for a pivoting joint comprising of a pair of screw eyes joined by a ring.

FIGS. 5-A, 5-B, and 5-C are partial views of the assembly of components, the assembled unit in the raking mode, and the assembled unit in the pick-up mode for a pivoting joint comprising of one large ring joining two apertures.

FIGS. 5-B' and 5-C' are magnified cross-sectional views showing the relationship between the rake handle and large ring joint in the raking and picking modes respectively.

FIGS. 6-A and 6-B are partial perspective views of the assembly of components of a variation of the pivotal connection of FIG. 3-A through 3-C wherein the two rings used to retain the freely turning middle ring are joined together. An inset shows a middle ring having a secondary ring at a different orientation.

FIGS. 6-C and 6-D are one of the partial perspective views of the assembled pivotal connection in FIGS. 6-A and 6-B in the picking mode and raking mode respectively.

FIGS. 6-E and 6-F are one of the partial perspective views of the assembled pivotal connection in FIGS. 6-A and 6-B in the picking mode and raking mode respectively.

FIG. 6-A' is a partial perspective view of one type of pivotal connection wherein the ring attached to the shorter rake handle pivots about the longitudinal axis of the handle.

FIGS. 6-B' and 6-C' are partial perspective views of the assembled pivotal connection on FIG. 6-A' in the picking mode and raking mode respectively.

FIG. 6-D' is a partial perspective view of another type of pivotal connection with a pivoting ring for the shorter rake handle.

FIGS. 6-E' and 6-F' are partial perspective vies of the assembled pivotal connection in FIG. 6-D' in the picking mode and raking mode respectively.

FIG. 7-A is a perspective view of a variation of the handle of the picking rake wherein the handle grip is fixed onto one of the tubes of a rake handle that is adjustable using means comprising a snap button in an inner tube that engages into one of a plurality of apertures in an outer tube.

FIG. 7-B is an exploded perspective view of the assembly of components of the handle of the picking rake in FIG. 7-A.

FIG. 8-A is a view of a unit similar to that in FIG. 7-A except that the rake handle is adjustable using means comprising a snap button mounted externally onto an outer tube that engages into one of a plurality of apertures in an inner tube.

FIG. 8-B is an exploded perspective view of the assembly of components of the handle of the picking rake in FIG. 8-A.

FIG. 9-A is a view of a unit similar to that in FIG. 7-A except that the rake handle is adjustable using means comprising a friction generator mounted onto an outer tube.

FIG. 9-B is an exploded perspective view of the assembly of components of the handle of the picking rake in FIG. 9-A.

FIG. 10-A is a perspective view of a unit similar to that in FIG. 7-A except that the rake handle is adjustable using means comprising a clamping tube mounted on the end of an outer tube wherein the clamping tube and the handle grip come together.

FIG. 10-B is an exploded perspective view of the assembly of components of the handle of the picking rake in FIG. 10-A.

FIG. 11-A is a perspective view of a unit similar to that in FIG. 7-A except that the rake handle is adjustable using means comprising a twist lock plug mounted on an inner tube.

FIG. 11-B is an exploded perspective view of the assembly of components of the handle of the picking rake in FIG. 11-A.

FIG. 12-A is a perspective view of a variation of the handle of the picking rake wherein the hand grip is adjustable along the length of a non-adjustable rake handle using means comprising a snap button mounted outside a tube of the hand grip that engages into one of a plurality of apertures along the rake handle.

FIG. 12-B is an exploded perspective view of the assembly of components of the handle of the picking rake in FIG. 12-A.

FIG. 13-A is a perspective view of a unit similar to that in FIG. 12-A except that the hand grip is adjustable using means comprising a friction generator mounted outside a tube of the hand grip.

FIG. 13-B is an exploded perspective view of the assembly of components of the handle of the picking rake in FIG. 13-A.

FIG. 14-A is a perspective view of a unit similar to that in FIG. 12-A except that the hand grip is adjustable using means comprising a tubular clamp that come together with the hand grip itself.

FIG. 14-B is an exploded perspective view of the assembly of components of the handle of the picking rake in FIG. 14-A.

FIG. 15-A is a perspective view of a unit similar to that in FIG. 12-A except that the hand grip is adjustable using means comprising a thumb screw.

FIG. 15-B is an exploded perspective view of the assembly of components of the handle of the picking rake in FIG. 15-A.

FIG. 16 is an exploded perspective view of the assembly of components of an externally mounted snap button.

FIG. 17 is an exploded perspective view of the assembly of components of a friction generator.

FIG. 18-A is a perspective view of a clamping tube.

FIGS. 18-B and 18-B' are top views of the clamping tube in the tight and loose positions respectively.

FIG. 18-C is an exploded perspective view of the assembly of components of the clamping tube in FIG. 18-A.

FIG. 19-A is a perspective view of a variation of the handle of the picking rake wherein both the hand grip and the rake handle are adjustable. The rake handle is adjusted using an internal snap button and aperture combination while the hand grip is adjusted using an external snap button.

FIG. 19-B is an exploded perspective view of the assembly of components of the handle of the picking rake in FIG. 19-A.

FIG. 20-A is a perspective view of a unit similar to that in FIG. 19-A except that the hand grip is adjusted using a friction generator.

FIG. 20-B is an exploded perspective view of the assembly of components of the handle of the picking rake of FIG. 20-A.

FIG. 21-A is a perspective view of a unit similar to that in FIG. 19-A except that the hand grip is adjusted using a tubular clamp.

FIG. 21-B is an exploded perspective view of the assembly of components of the handle of the picking rake in FIG. 21-A.

FIG. 22-A is a perspective view of a unit similar to that in FIG. 19-A except that the hand grip is adjusted using a thumb screw.

FIG. 22-B is an exploded perspective view of the assembly of components of the handle of the picking rake in FIG. 22-A.

FIG. 26 is a perspective view of a handle of the picking rake wherein the location of the pivoting joint and the right hand grip are both adjustable.

FIG. 27 is an exploded perspective view of the assembly of components of a variation of the picking rake wherein the rake handles adjustably telescope inside lengthened rake handle sockets using means comprising an internal snap button and aperture combination.

FIG. 28-A is an exploded perspective view of the assembly of components of the handle of the picking rake wherein the section of the rake handle beyond the pivoting joint can be retracted into the rest of the handle.

FIGS. 28-B and 28-C are perspective views of the assembled handle of the picking rake in FIG. 28-A with retracted and extended handle sections respectively.

FIG. 29-A is an exploded perspective view of the assembly of components of a method of telescoping tubes using top and bottom retaining caps augmented with rubber rings.

FIG. 29-B is a perspective view of the tubes telescoped using means in FIG. 29-A.

FIG. 29-C is an internal view taken along the longitudinal midsection of the telescoping tubes in FIG. 29-B.

FIG. 30-A is an exploded perspective view of the assembly of components of a method of telescoping tubes using cross bars and string.

FIGS. 30-B1, 30-B2, and 30-B3 are perspective internal views of tubes telescoped using means in FIG. 30-A from a retracted to an extended position.

FIGS. 31-A, 31-A', 31-B, 31-B', and 31-C are views taken along the longitudinal midsection of a set of telescoping tubes with a quasi-permanent extended height using means comprising retaining rods and apertures disposed towards the upper end of the tubes.

FIGS. 32-A, 32-B, 32-B', and 32-C are views taken along the longitudinal midsection of a set of telescoping tubes with a quasi-permanent extended height using means comprising retaining rods and apertures disposed towards the lower end of the tubes.

FIGS. 33-A through 33-E are views showing the components and assembly of a pivotal connection with a component that doubles as a top retaining cap for an inner tube of an extendible rake handle.

FIGS. 34-A and 34-B, 34-A' and 34-B', and 35-A and 35-B are partial perspective views of hand grips modified into arm grips for use with the picking rake.

FIGS. 36-A and 36-B are illustrations of other variations of a picking rake wherein the handles are overlapped instead of being held side by side.

FIG. 37-A shows two parallel rake handles and a first and second transverse branch leveraging combination.

FIG. 37-B illustrate how the simple hand grip of the picking rake can be modified to be used as an anchoring means by switching the two rake handle positions and interlocking their hand grips.

FIG. 38 is a perspective top view of a variation of the picking rake wherein the handles are joined at an angle instead of side by side.

FIGS. 40-A through 58-D are various views of some of the different possible types of grippers that can be used for the picking rake.

FIG. 59-A is a partial perspective back view of a detachable picking rake with arm grips having a short tube and snap button anchoring means wherein the short tube is adjacent beside the arm grip.

FIG. 59-B is an exploded perspective back view of the assembly of components of the picking rake of FIG. 59-A.

FIG. 59-C is a partial perspective front view of the short tube relative to the arm grip of the picking rake in FIG. 59-A.

FIG. 60-A is a partial perspective back view of a detachable picking rake having a short tube and snap button anchoring means wherein the short tube is behind the arm grip.

FIG. 60-B is an exploded perspective back view of the assembly of components of the picking rake of FIG. 60-A.

FIG. 61-A is a partial perspective back and bottom view of a detachable picking rake having a short tube and snap button anchoring means wherein the short tube is adjacent below the arm grip.

FIG. 61-B is an exploded perspective back view of the assembly of components of the picking rake of FIG. 61-A.

FIG. 61-C is a partial perspective back view of the short tube relative to the arm grip of the picking rake of FIG. 61-A.

DESCRIPTION OF THE INVENTION

Figure 1:
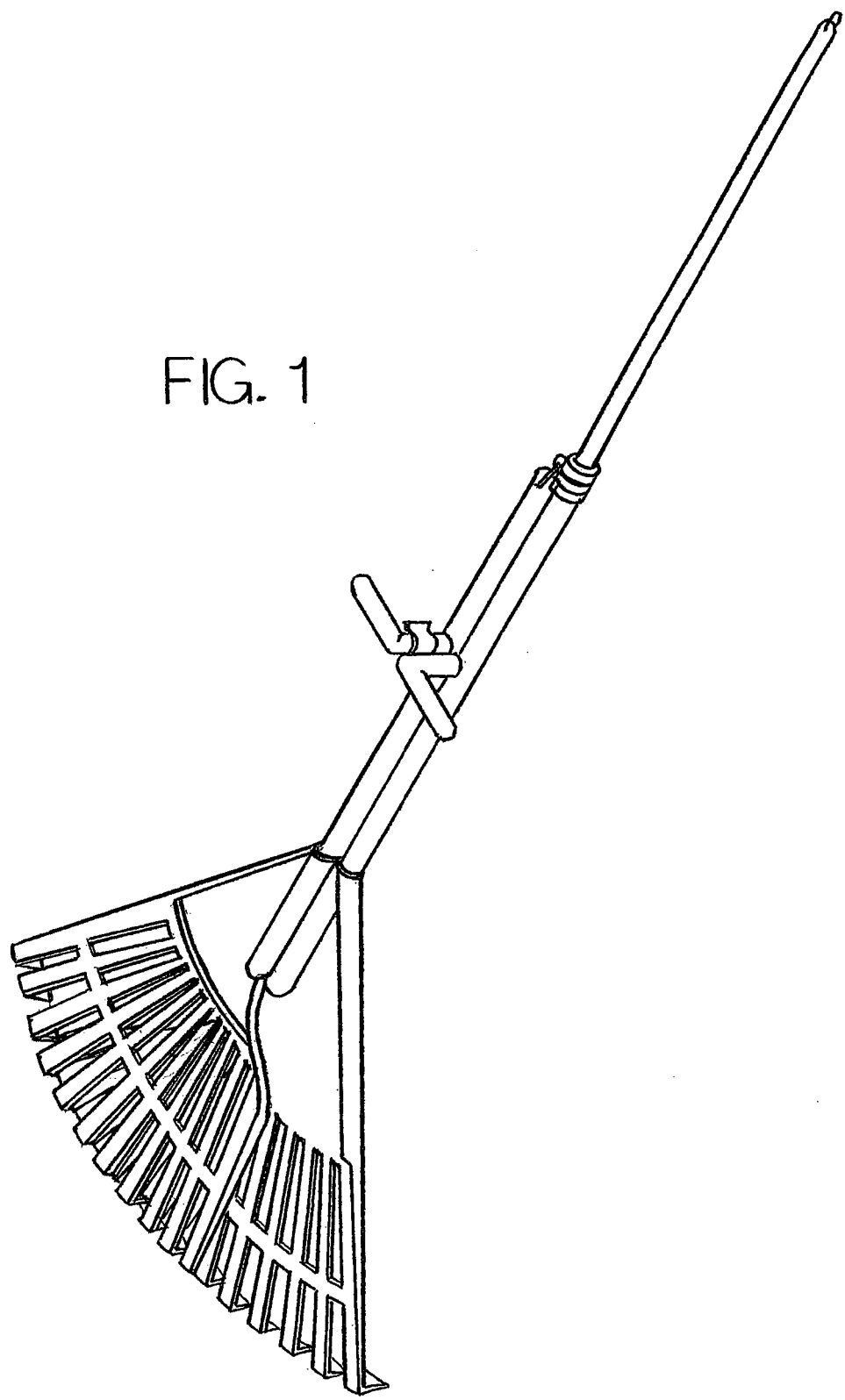
FIG. 1 is a perspective view of the picking rake having overlapping rake heads, an extendible handle, and pivotal and gripping connections in the raking mode.

Firstly, the terms "pivotal connection" or "pivoting joint" or "joint" or "means of joining" will be encountered throughout this disclosure. This connection or joint is one that joins the two rake units of the present invention at all times during use and is referred to in the claims as a "multi-axial pivotal connection. Examples of multi-axial pivotal connections disclosed are shown in FIGS. 1, 1-B, 2-ABC, 3-ABC, 4-ABB'CC', 6-ABCDEF, 6-A'B'C'D'E'F', and 33-ABCDE. The Description of Drawings section describes each of these figures. In these figures, some pivotal connections are shown as part of the completely assembled picking rake while some "zooms" in into just the connection. The workings of each of these multi-axial pivotal connections are amply described individually and in conjunction with the workings of the present invention. It is suggested that the reader read the disclosure in its entirety to completely understand the essence of the present invention.

Referring to FIG. 1-B, the picking rake basically comprises of a rake 100L and rake 100R joined together towards the upper ends of their handles by a pivotal connection having pivotal means that easily allows both rakes to turn outward about a quarter turn after which they can be swung outwardly and inwardly in opposite directions. One of the rakes turns clockwise about the rake handles' own longitudinal axis. The other rake turns counterclockwise about the rake handles' own longitudinal axis.

Additionally referring to FIG. 1-C, rake 100L comprise of the following:

a. Rake head 100-4L is an article with a face that terminates at its distal end or bottom edge with prongs 100-42L that extend out in a fan-like fashion generally towards the left, It terminates on the opposite end or the top with a handle socket 100-40L.

b. Rake handle 100-2L comprises an elongated member and all the handling members extending from it. The elongated member is a cylindrical tube or rod of standard length for commercial rake handles having a distal or lower end that is snugly receivable into socket 100-40L of rake head 100-4L. It is also capable of receiving attachment hardware at point 100-8L for joining with a right rake handle comprising but not limited to apertures, screw eyes, rings, cord, or the like.

c. Hand grip 100-6L is a handling member that comprises of two sections. One section, 100-62L, serves as a holding portion while another section, 100-60L, serves as the attachment point for a gripper 106. The angle between the two branches is preferably about 90 degrees because less force is required from the user to open and close the gripper if the force is centerly directed towards the gripper opening. It is assumed that the gripper opening is aligned along the direction of the handle bar. The terminal end of section 100-60L is the attachment point to rake handle 100-2L.

d. Attachment hardware comprising of at least one gripper comprising but not limited to the selections shown in FIGS. 41 through 57. The gripper is a resilient member that has an opening through which the other rake handle snaps on.

Rake 100R comprises of the following:

a. Rake head 100-4R also has a face and terminates at its distal end with prongs 100-42R that extend out in a fan-like fashion generally towards the right and terminates on the opposite end with a handle socket 100-40R, b. Rake handle 100-2R comprises an elongated member and all the handling members extending from it. The elongated member is a cylindrical tube or rod of length largely determined by the most convenient pivoting point of the two rakes based on a person's height. This is about one and a half to two feet shorter than the standard left rake handle 100-2L. Although a shorter right rake handle 100-2R may mean less weight, a pivoting joint that is much lower could interfere with the line of sight of the user when the picking rake is in the pick-up mode. Also, since the distance between the gripper 104 on the hand grip 100-6L and the pivoting joint is reduced, more pressure is imposed on the twine joint or hardware 112 to counterbalance the weight of the rest of rake 100L on the distal side of the gripper. If twine were used for the joint, a second gripper 104 may be needed as shown in FIG. 1-A'. However, if a rigid connection like that shown in FIGS. 4-A and 5-A were used, the second gripper is not needed. The distal end of handle 100-2R is snugly receivable into socket 100-40R of rake head 100-4R. It is also capable of receiving attachment hardware at points 100-8R for joining with a left rake handle comprising but not limited to apertures on the handle, screw eyes, rings, cord, twine or the like.

c. Hand grip 100-6R is a member of basically the same size and shape as handle 100-6L discussed previously. One section, 100-62R, serves as a holding portion while another section, 100-60R is dimensionally snugly receivable inside the gripper that is mounted on a corresponding branch on hand grip 100-6L. A section 100-60R' of 100-60R that is held by the gripper may be recessed to stabilize the pick-up handle bar while in it and consequently the whole assembly. The terminal of branch 100-60R is the attachment point to rake handle 100-2R.

d. Joint hardware other than cord, twine, or rope 112 comprising but not limited to those shown on FIG. 2-A, through FIG. 6-F'. That shown in FIGS. 2-A, 2-B, and 2-C consist of a D-type ring in each of two apertures. That shown in FIGS. 3-A, 3-B, and 3-C consists of a ring 117 for the right rake handle and a ring 116 freely turning about the longitudinal axis of the handle and retained by two fixed or non-slipping rings for the left rake handle. Ring 116 has a secondary ring 116-2 that is linked to ring 117. That shown in FIGS. 4-A, 4-B, and 4-C consists of a pair of screw eyes, one for each handle, and a ring joining them both. That shown in FIGS. 5-A, 5-B, and 5-C consist of one large ring 108, joining two apertures. The joint hardware is such that will allow at least one of the rake handles to be turned and moved away from each other until their undersides are about facing each other after which the handles can be swung in opposite directions. Cross-sectional views of the joint using ring 108 are shown in FIGS. 5-B' and 5-C'.

FIG. 6-A shows the two fixed or non-slipping rings of FIG. 3-A optionally joined together by bars 132. For illustration purposes, these bars are disposed at points that limit rotation of ring 134 to about 90 degrees as it changes the orientation of the longer rake handle from raking to picking positions. Limiting the rotation of ring 134 can help stabilize the pivotal connection in the raking and picking positions. The distance between the bars may vary according to the preferences of the user since some users may prefer different turning limitations for each rake head. Some of the pivotal connections for the shorter rake handle also require some rotational assistance from ring 134 for its own shift from raking to picking positions. It is possible to find a compromise between the stability added by the bars and the flexibility desired by the user. FIGS. 6-A to 6-F' all show the use of bars 132 effecting a turn of about 90 degrees simply to help show the change in position of the longer rake handle. The use of bars 132 or its equivalent is optional. Furthermore, the two non-slipping rings may be made of metal, plastic, rubber, or other similar material.

Non-extendible rake handles are shown in FIGS. 6-A through 6-F'. An extendible rake handle version is discussed in a later section and shown in FIGS. 33-A through 33-E.

FIGS. 6-A' and 6-D' show the assembly of parts of two different means for pivoting or turning rings 137-1 and 138-1 attached to the shorter rake handle. The pivoting ring holder 137 of FIG. 6-A' has a resilient bottom with notches that allow irreversible entry through the top of retainer 136. The pivoting ring holder 138 of FIG. 6-D' is inserted through the bottom of retainer 136 and its ring 138-1 disposed out the top of retainer 136. The shorter rake handle 135 and the pivoting ring retainer 136 may be joined by a strong adhesive, by screws, or other state of the art means.

Referring back to FIG. 1-C assembly of the basic picking rake is as follows:

1. An aperture 100-8R is made through the proximal or upper end of rake handle 100-2R.
2. The exposed terminal of branch 100-60R of hand grip 100-6R is welded normally onto right metal rake handle 100-2R with the transverse section 100-62R also normal to said rake handle. The point of attachment on the rake handle is a distance of about an arm's length from the user when the picking rake is in the slanted raking mode as shown in FIG. 1-D1. If the rake handle and hand grip are both made of wood, a nut and bolt or screw connection may be used instead.
3. The distal or lower end of rake handle 100-2R is inserted into handle socket 100-40R of rake prong head 100-4R and screwed in place.
4. An aperture 100-8L is made through the rake handle 100-2L aligned with aperture 100-8R on handle 100-2R in step 1.
5. A gripper 104 such as that shown in FIGS. 41 through 57 is attached upright to section 100-60L of hand grip 100-6L by weld or with a bolt, screw or rivet. A serrated locking washer may be used in conjunction with the bolt or screw to prevent said gripper from rotating. If the surface on the hand grip 100-6L where the gripper is attached is also recessed, there is no need for a locking serrated washer to prevent it from rotating. If the surface is not recessed, rotation can be eliminated if the gripper is welded or if it is screwed, riveted or bolted on two points instead of just one.
6. The exposed terminal of upright section 100-60L of hand grip 100-6L is welded normally to the left rake handle 100-2L as was done with hand grip 100-6R in step 2.
7. If the right rake handle 100-2R is only about one and a half to two feet shorter than the left rake handle 100-2L, there is ample distance between the hand grip and the proximal end of rake handle 100-2R such that there would be no need to install another gripper between the hand grip 100-6R and the proximal end of rake handle 100-2R to augment the joint and gripper 104 connections.
8. A twine, rope, cord or the like is knotted on one end, its other free end threaded through aperture 100-8L of left rake handle 100-2L and aperture 100-8R of right rake handle 100-2R after which it is knotted. The tightness or looseness of the twine or any other hardware connection is hinged on the ability of the two rake handles to be swung outwardly and inwardly when in the pick-up position and to pivot about a quarter turn when in the rake position.

Operation of the Picking Rake

As shown in FIG. 1-D1, the picking rake is in the rake position. Both rake handles are snugly held together by the gripper on the hand grip 100-6L and by the twine joint. The adjacent sides of the rake handles are referred to as their inner sides. The rake heads lay side by side to form the complete fan of any ordinary commercial rake. To use as a rake, the person's hand is made to grip the transverse sections 100-62R and 100-62L of hand grip 100-6R and 100-6L respectively. The person's other hand is made to support the upper end of rake handle 100-2L just as he would an ordinary rake handle. To rake, the user's hand that is on the hand grip is made to pull, lift, and drop the hand grip as the prongs gather the leaves.

To convert to a pick-up mode, the sections 100-62R of right hand grip 100-6R and 100-62L of left hand grip 100-6L are grasped by the right and left hands respectively and pulled apart. The force induces the gripper 104 on hand grip 100-6L to open up and release the hand grip 100-6R. The two rake heads and handles separate and are now joined only by the twine joint. The separated hand grips are each rotated about 90° clockwise for the right rake and about 90° counter-clockwise for the left rake until the underside of the rake heads substantially now face each other and ready to scoop a pile of leaves as shown in FIG. 1-D2. Leaves are picked and released into an open trash bag by the inward and outward motions of the two rakes as they swing opposite each other. This entire picking-up operation is a translation to a rake's handle bar of what a person would instinctively have his arms do when made to pick up a large pile of leaves.

The picking rake can be made available with both left and right handles having the same length. One of the handles is cut depending on the user's preference. A left-handed person will probably prefer the left rake handle to be shorter than the right one while a right-handed person will prefer otherwise. This is to position the rake handle to be pried off the gripper for the more dexterous and stronger hand.

Rake Head Variation

As shown in FIGS. 1 and 1-D3 the rake heads can be overlapped in the raking position. Each rake head 120R and 120L is allowed to extend inwardly. One rake head has a right inner extension while another rake head has a left inner extension. This increases the picking-up capacity of the pair because of the increased span of the prongs. When at the raking position, the added extension may not have increased the raking span of the combined heads but the overlap has strengthened the middle section of the resulting rake head. If the right rake head is over the left rake head, the overlapping portion of the left rake head provides support to the entire right rake handle as well Adjustable Handle Length and Hand-grip Variations for the Picking Rake The handle length and consequently the location of the hand grip may be adjustable to better conform to the user's height and arm reach. A child or very short person for instance may not reach the hand grip rendering it useless. Furthermore, the joint that permanently holds both rakes together may be as high as or even beyond the user's shoulders such that swinging the two rakes in the opposite direction in the pick-up mode becomes a big chore.

A. The first type of variation is where the handle length is adjustable but the distance between the hand grip and joint remains fixed. This variation is effected in so many ways, some of which are:

I. Internally Mounted Snap Button

Referring to FIG. 7-B, each rake handle becomes a pair of telescoping tubes—an inner tube 140 and an outer tube 142 for the right rake and another inner tube 140 and outer tube 146 for the left rake.

Assembly is as follows:
1. An aperture 140-0 is disposed close to the proximal end of small tube 140.
2. A snap button 144 is inserted into each of two tubes 140 with its head disposed out of aperture 140-0.
3. A plurality of holes 146-0 and 142-0 is disposed on outer tubes 146 and 142 respectively.
4. The proximal end of inner tube 140 with snap button 144 is inserted into the distal end of large tube 142. The button head lodges into the first hole 142-0, thus, temporarily securing the connection in place.
5. The proximal end of another small tube 140 with snap button 144 is inserted into the distal end of outer tube 146. The button head engages into the first hole 146-0 also temporarily securing the connection in place.
6. The distal ends of the two inner tubes 140 are inserted into their respective rake head sockets.
7. Outer tubes 142 and 146 are joined together at their respective joint points 145 and 147 with twine and secured with knots.

Operation

To adjust length of the handle, the button head of button 144 that is engaged in aperture 142-0 is pressed inward while the outer tube 142 is moved relative to the small tube 140 until the desired length is reached. Meanwhile, the button head will have engaged into the succession of holes and it will have to be disengaged each time. At the desired handle length, the button head is urged to engage into the nearest aperture 142-0 on the outer tube 142. This procedure is applied to the button head 144 that is engaged in aperture 146-0.

The shortened connection is shown in FIG. 7-A.

II. Externally Mounted Snap Button

Referring to FIG. 16, a flat-type spring or snap button 156, comprise of a button head 156-4, a push control member 156-2, and a mounting plate 156-8. It is fastened onto the outside of the outer tube with a rivet 156-6 that goes through a hole on said mounting plate without interfering with the small tube telescoping inside. A C-type external snap button may also be used instead.

Referring to FIG. 8-B, assembly is as follows:
1. An external snap button 156 is mounted with a very short bolt or screw or riveted near the distal end of the right outer tube 152 with its head disposed inwardly inside aperture 152-0.
2. Another snap button 156 is mounted near the distal end of left outer tube 154 with its head disposed inwardly inside aperture 154-0.
3. A plurality of holes 150-0 is disposed on each of two inner tubes 150 on the same side as their corresponding aperture 152-0 or 154-0.
4. Push control member 156-2 of snap button 156 on tube 152 is pressed inwardly thereby lifting button head 156-4 out of aperture 152-0. The snap button 156 is then rotated along the axis of its mounting screw or rivet to bring the button head out of the way. The proximal end of inner tube 150 is inserted into the distal end of outer tube 152. Button head 156-4 engages into the nearest hole 150-0.
5. Push control member 156-2 of snap button 156 on tube 154 is likewise pressed and rotated out of the way. The proximal end of another inner tube 150 is inserted into the distal end of outer tube 154. Button head 156-4 engages into the nearest hole 150-0.
6. The distal ends of each of the small tubes 150 are inserted into their respective rake head sockets.
7. Large tubes 152 and 154 are joined together at their respective joint points 145 and 147 with twine and secured with knots.

Operation

To adjust length, push control 156-2 of snap button 156 on tube 152 is pressed thus, dislodging the button head from aperture 152-0 on tube 152. The button is then rotated along the axis of mounting rivet 156-2 to keep the button head out of the way. The same is done for the button on tube 154. The inner tube 150 is moved relative to the outer tube 152 until the desired handle length is reached. At this point, the snap button 156 is rotated back to its original position. Button head 156-4 re-engages into aperture 152-0 and finally into the nearest aperture 150-0 of inner tube 150.

The above procedure is followed for the snap button 156 on tube 154.

The shortened connection is shown in FIG. 8.

III. Friction Generator

Referring to FIG. 9-B, a small window 164-0, is disposed on the exposed side near the distal end of each of outer tubes 162 and 164.

Referring to FIG. 17 a friction generator 166, consist of a knob housing 166-2 shaped to conform to the outer dimensions of the outer tube, and knob 166-0. Knob housing 166-2 is basically a holder of knob 166 with a window 166-20 to enable said knob to establish contact with the outer walls of the inner tube, thus, generating friction that will inhibit movement of the inner tube relative to the outer tube. Knob 166-0 is anchored to housing 166-2 via pin 166-24 that goes through the pin channels 166-26 of a pair of transverse extensions 166-22 and the pin hole 166-02 of said knob.

The surface 166-06 of knob head 166-04 is distanced from the axis pinhole 166-02 more than its top surface 166-08. When the knob handle 166-10 is positioned downward, surface 166-06 comes into contact with the inner tube 160 through windows 166-20 of knob housing 166-2 and window 162-0 of handle 162. When knob handle 166-10 is positioned outward, surface 166-08 replaces surface 166-06. This surface is not far out enough to generate any frictional contact with the inner tube.

Referring back to FIG. 9-B, neither the inner nor outer tubes need a plurality of holes along its length.

Assembly is as follows:
1. Friction generator 166 is mounted with very short screws/bolts or rivets on the exposed side of outer tube 162 with its window 166-20 right over window 162-0 of said tube.
2. Another generator 166 is mounted the same way on the exposed side of outer tube 164 with its window 166-20 right over window 164-0 of said tube.
3. With the generators in the off position, the proximal ends of inner tubes 160 are each inserted into each of outer tubes 162 and 164.
4. Knob handles 166-10 of each generator 166 is pulled downward until surface 166-06 establishes tight contact with the surface of inner tubes 160. The shortened connection is shown in FIG. 9-A.

IV. Tubular Clamp

Referring to FIGS. 18-B, 18-B', and 18-C, a tubular clamp 167 consist of a main clamping tube 200-20, a control knob 200-24, a tightening bolt 200-26 and a control rod 200-28

Clamping tube 200-20 has a pair of transverse extensions 200-202 that connects to a mechanism that can bring these extensions closer to each other, thereby reducing the diameter of clamping tube 200-20. The said mechanism consists of a tightening bolt 200-26 that as an aperture 200-260 towards its end, a control knob 200-24, and a threaded control rod 200-28. Knob 200-24 has two surfaces unevenly distanced from its axis of rotation just like knob 166-0 previously discussed. It has a threaded rod aperture 200-240, at its axis of rotation. Control rod 200-28 of length equal to the thickness of knob 200-24 is snugly receivable inside rod aperture 200-240 by a threaded connection and inside aperture 200-260 of bolt 200-26.

Assembly is as follows:
1. Tightening bolt 200-26 is inserted into bolt hole 200-205 of transverse extension 200-202 until its end is disposed inside rotational cavity 200-242 of knob with its aperture 200-260 right next to aperture 200-240.
2. Control rod 200-28 is screwed into aperture 200-240 of knob 200-24 all the way through aperture 200-260 of bolt 200-26 and all the way to the bottom of knob 200-24.

The completely assembled clamp is shown in FIG. 18-A.

Operation

Referring to FIG. 18-B' clamp 202 is in the loose position. There is no stress between the surfaces of knob 200-24 and surface 200-206 of extension 200-202. When the knob is turned such that its distanced surface is in contact with surface 200-206, the stress induces bolt 200-26 to be pulled outward to compensate for the extra distance between rod 200-28 and surface 200-206. This is accomplished by virtue of the axis control rod 200-28 going through the aperture 200-260 of bolt 200-26. Consequently, the two of extensions 200-202 are brought closer together as shown in FIG. 18-B.

Referring back to FIG. 10-B, the outer tube 168 has a slit about one to two inches long on its distal end. A tubular clamp 167 topped with a hand-grip is mounted with short screws on tube 168 with its narrow opening aligned with slit 168-2. The said slit is crimped close as the control knob of clamp 167 is placed in the "close" position, thus, allowing outer tube 168 to be clamped tight onto the inner tube 160.

V. Twist Lock Mechanism

Referring to FIG. 11-B a twist lock plug 170 that is already commercially available is installed between the inner and outer tubes. Telescoping tubing 172, 174, and 176 are adjusted to any length by simply twisting firmly. There is no need for any apertures, buttons, or windows on any tube. The user will have to do some fine twisting so that the hand grips on both handles are aligned in the final position.

The combination is shown in FIG. 11-A.

VI. Thumb Screw

Tubes 174 and 176 in FIG. 11-B can be equipped with a tiny internally threaded protrusion and aperture towards their distal ends that houses a thumb screw. Turning the screw clockwise urges the tip of the screw further forward towards the outer surface of inner tube 212, increasing friction as the screw is turned further.

VII. Nut and Bolt

Tubes 174 and 176 in FIG. 11-B can be equipped with two laterally disposed holes going through its longitudinal center. The inner tube will have a plurality of such lateral holes going through its longitudinal center as well. The holes of the hand grip and the inner tube are aligned at the desired location and a bolt is inserted through the holes. A nut keeps the bolt in place.

B. A second type of variation is where the handle has a fixed length but the hand grip is adjustable along said length. This is again effected in many different ways using mechanisms from the first variation, some of which are:

I. Externally Mounted Snap Button

Referring to FIG. 12-B, the movable hand grip 180 includes a short outer tube 180-2 with a hole and a snap button 156. This short outer tube can be anchored anywhere along the length of inner tubes 182 and 184 where a plurality of apertures 182-0 and 184-0 are.

The combination is shown in FIG. 12-A.

II. Friction Generator

Referring to FIG. 13-B, the movable hand grip 190 includes a short outer tube 190-2 with a window and a friction generator 166. Said outer tube can be anchored anywhere along the length of inner tubes 192 and 194.

The connection is shown in FIG. 13-A.

III. Clamping Mechanism

Referring to FIGS. 14-B and 18-C, the movable hand grip 200 includes a tubular clamp 200-2 that serves as a short outer tube. When knob 200-24 is in the closed position, clamp 200-2 tightens itself around tubes 202 or 204.

The assembled rake handles are shown in FIG. 14-A.

IV. Thumb Screw

Referring to FIG. 15-B, a thumb screw may be used to anchor a hand-grip 210. Hand grip 210 is equipped with a tiny internally threaded protrusion and aperture that houses a thumb screw.

The assembled rake handles are shown in FIG. 15-A.

V. Nut and Bolt

The tiny protrusion and aperture of hand grip 210 in FIG. 15-B is replaced with two laterally disposed holes going through its longitudinal center. The inner tube 212 will have a plurality of such lateral holes as well.

It is important to note that in FIGS. 7-A through 15-A and FIGS. 19-A through 25 the orientation of the rake handles can be reversed. The exposed end of the outer tube may be inserted into the rake head socket and the smaller tube made to telescope upward and out. An example is shown in FIGS. 28-A through 28-C.

C. A third type of variation as shown in FIG. 26 is where the right rake handle is adjustable so that the pivoting point can be adjusted to suit the user's needs. The right hand grip is also movable to keep it aligned with the left hand grip at the new position.

D. A fourth type of variation is where the hand grip and handle retracts and extends within the rake head itself for adjustment as shown in FIG. 27. Each rake head is lengthened to accommodate a reasonable length of handle socket within which the handle telescopes. The adjusted length may be fixed using any of the means presented earlier. The snap button and aperture method is applied in FIG. 27.

E. A fifth type of variation shown in FIGS. 28-A, 28-B, and 28-C is where the left rake handle comprise of at least two nesting tubes. The inner tube is the section of the rake handle beyond the pivoting joint and is retracted into an outer tube. The outer tube is the section of the rake handle below the pivoting joint. This keeps the excess handle out of the way when the rake is used for picking material.

Figure 25:
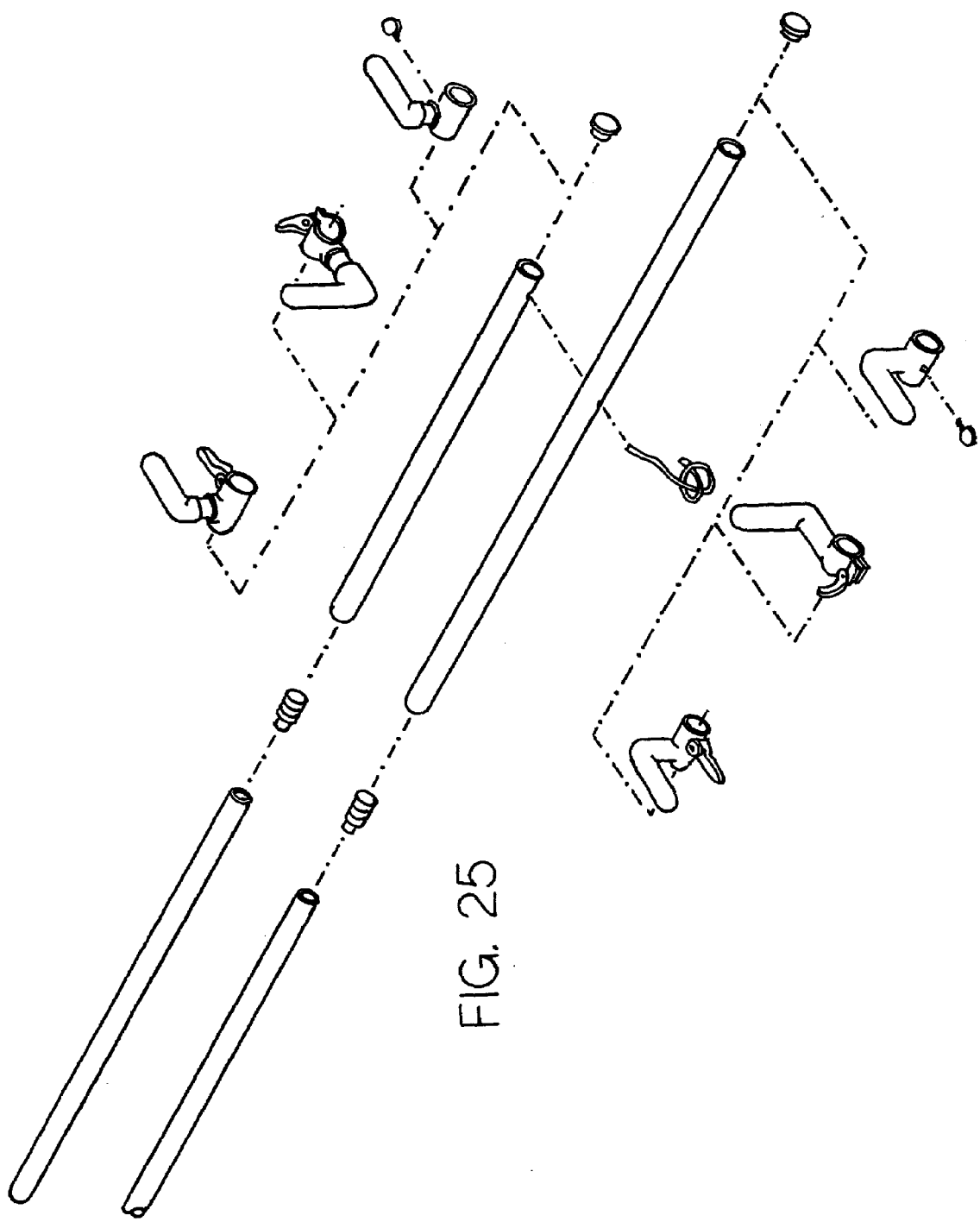
FIG. 25 is an exploded perspective view of the assembly of components of the handle of the picking rake wherein the rake handle is adjustable using a twist lock plug while the hand grip is adjustable using either a clamping tube, a friction generator, or a thumb screw.

The current state of the art and most popular means of extending tubes comprises the use of the commercially available twist-lock plug 170 shown in FIGS. 25 and 11-A. When inserted at one end of the inner tube, this plug produces a tight contact point with the inner walls of the outer tube when the inner and outer tubes are twisted in opposite directions. The twist-lock plug 170, enclosed in broken brackets, can be optionally added to the distal end of the inner tube 214 of FIG. 28-A.

Adjustable Handle Length and Movable Hand Grip

This combination is the most ideal because it can accommodate most potential users of a rake. It works this way:

1. The handle length of the right rake is first adjusted in accordance with the person's preferred location of the joint after taking into consideration the person's shoulder height.
2. The right hand grip is moved to match the arm reach of the user.
3. The left rake handle is also adjusted although not necessarily by as much as the right rake was.
4. The left hand grip is adjusted to align with the right hand-grip. Generally, the handles of the right and left rakes are adjusted to the same extent, thus their joint points stay aligned. All the illustrations are based on this assumption. In the rare event that the joint points cannot be aligned, the joint on the left rake is moved to align with that of the right rake. The twine joint is reattached at the new joint. New apertures may be drilled all the way through the outer tube of the left handle and including the inner tube that could be nesting inside it. Then the twine could be threaded through all these apertures and knotted just like before. However, including the nested inner tube in the twine joint fixes the handle length. Adjusting it would require undoing the twine joint all over again. An easier solution would be to attach a strong screw eye or the equivalent hardware that does not go beyond the inner walls of the outer tube on the desired point, yet away from the side adjacent to the right rake. The free end of the twine is then tied through said screw eye. It is better still if the "eyes" are permanently part of a tube or ring that is both easily movable along the outer tube and easily fastened onto said tube at any desired point.

There is still another option possible. Referring to FIGS. 12-A through 15-B, the rake handle may be made of wood, metal or similar strong and lightweight material. If the joint point is too high, the distal end of the rake handle is simply extruded from the rake head socket, cut off, and reinserted into said socket. An equal length of the left rake handle may also be cut off. This is equivalent to giving the handle a permanent length adjustment. Otherwise, a new joint aperture will have to be made on the left rake handle. The hand grip remains movable along the shortened handle.

The adjustment of the handle length and the location of the hand grip is effected by some of but not limited to the mechanisms already discussed earlier. Some of the combinations are shown briefly in FIGS. 7-A through 28-C. Numerous more permutations and modifications are possible without departing from the spirit of this invention. However, they cannot all be illustrated without appearing redundant.

As mentioned earlier, another way to adjust handle length comprises a left rake handle that is made up of at least two nesting tubes. The inner tube is retracted into the rest of the handle resulting in both rake units having the same handle length when used in the pick-up mode. More nesting tubes may be needed if the length of the outer tube is not long enough.

Figure 23:
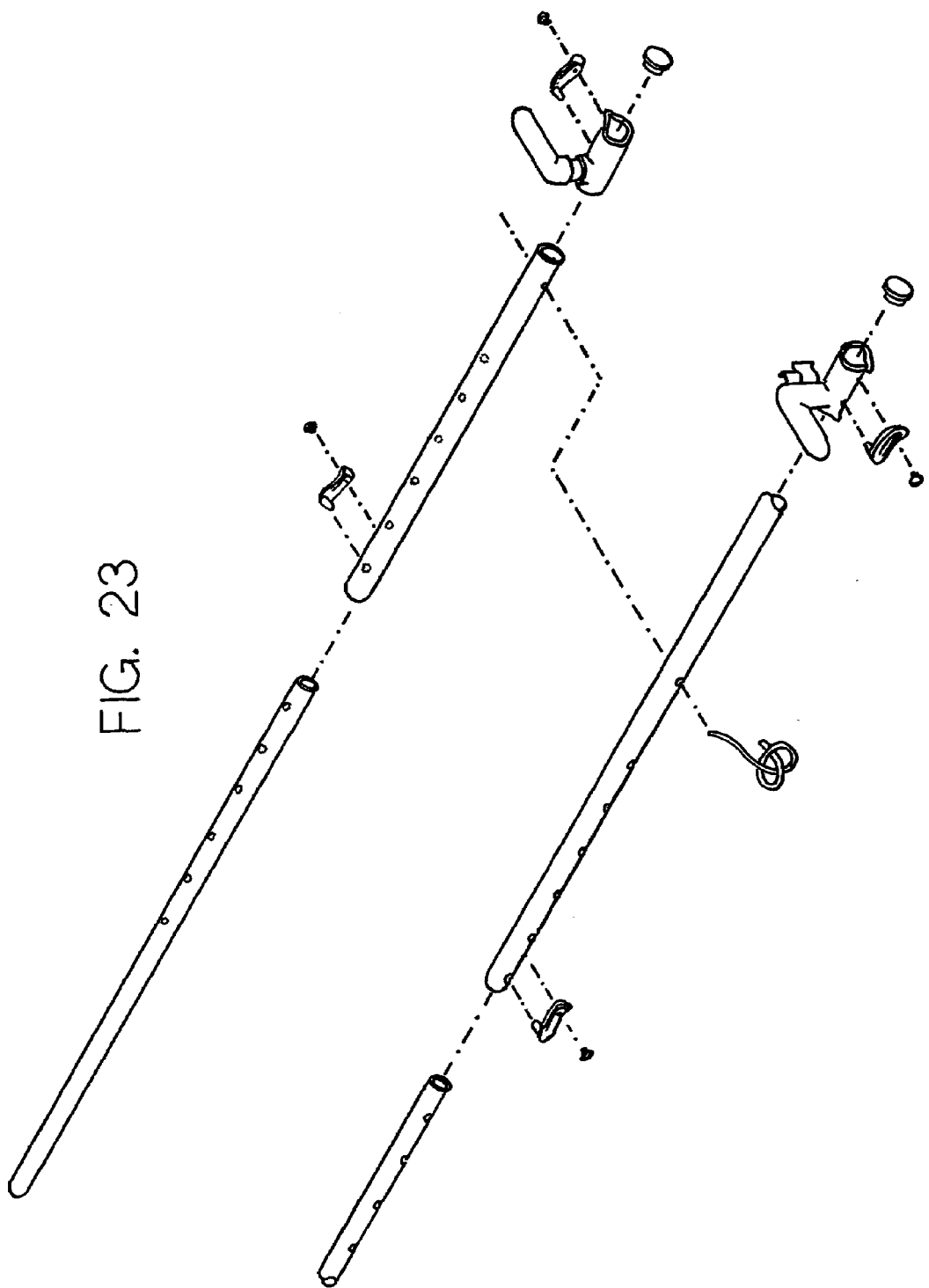
FIG. 23 is an exploded perspective view of the assembly of components of the handle of the picking rake wherein the hand grip and rake handle are both adjustable using two externally mounted snap buttons.
Figure 24:
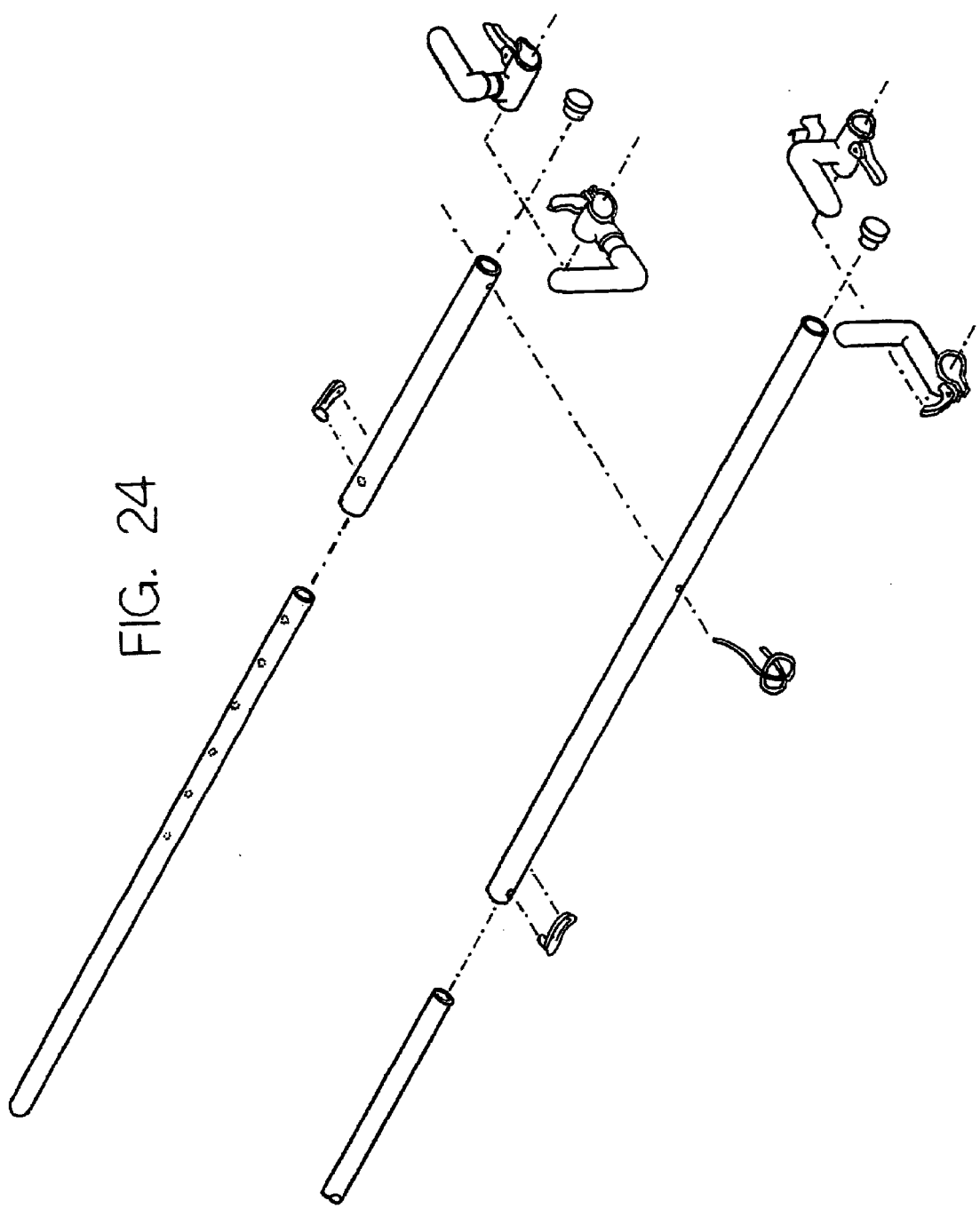
FIG. 24 is an exploded perspective view of the assembly of components of the handle of the picking rake wherein the rake handle is adjustable using an external snap button while the hand grip is adjustable using a clamping tube.

The handle may be retracted and extended by several cooperating retaining means comprising:

a) installing a top retaining cap at the top end of the outer tube and a bottom retaining cap at the lower end of the inner tube as shown in FIGS. 29-A through 29-C and FIGS. 33-A through 33-D, b) reducing the top end of the outer tube and expanding the lower end of the inner tube as shown in FIGS. 31-A through 32-C, c) tapering the inner and outer tubes, d) installing a string held by cross-bars inside the lower ends of the inner and outer tubes as shown in FIGS. 30-A, 30-B1, 30-B2 and 30-B3, e) installing a commercially available twist lock plug 170 into the inner tube as shown in FIGS. 25, 1'-B, and 28-A.

f) installing a snap button inside and inner tube and a plurality of apertures on the outer tube with or without back-up retaining caps, g) installing and externally mounted snap button and aperture as shown in, FIGS. 23 and 24, h) installing a friction generator onto the outer tube, i) installing a tiny internally threaded protrusion and aperture for a thumb screw, and j) installing a tubular clamp onto the outer tube as shown in FIG. 18-A.

Means (a) through (e) above allow fast and easy extension and retraction of the nesting tubes. The tubes stay extended as the user rakes. A rubber ring or similar non-slipping material or a coating of such material outside a section of the inner tube may be used to augment means (a) through (d) as was done in FIGS. 29-A, 29-B, and 29-C. Methods (f) through (j) may require more effort but provide more and longer retention capability.

The assembly and operation of all these variations will not be discussed in detail as the illustrations make them self-explanatory by now.

Still another way to adjust a handle length is such where the extended length of the telescoping tubes is quasi-permanently fixed. Tall users can have a long extended handle while the shorter users need not have to completely extend the handle before they can position their grasp around the tube that corresponds to their height.

A quasi-permanent 3-nesting tube system is shown one way in FIGS. 31-A, 31-A', 31-B, 31-B', and 31-C. Another way is shown in FIGS. 32-A, 32-B, 32-B', and 32-C.

The methods are shown using nesting tubes with crimped and reduced ends. They are nevertheless applicable to other tubes nested by other means.

Referring to FIG. 31-A small tube 424 is dimensionally receivable inside middle tube 422. Tube 422 is receivable inside the larger tube 420. Tubes 422 and 420 have reduced upper ends. Tubes 424 and 422 have crimped lower ends. Tubes 424, 422, and 420 have radial apertures 424-2, 422-2, and 420-2 toward their upper ends.

Assembly and operation comprise of the following:

a) Tube 424 is inserted into the lower end of tube 422.

b) Tube 422 is inserted into the lower end of tube 420.

c) Tube 424 is pushed out the upper end of tube 420 and capped.

At this juncture, the assembled unit shown in FIG. 31-A' befits a tall user. The length of the extended unit may be limited to suit a user of medium height. Apertures 424-2 and 422-2 are aligned and a bolt 426 of sufficient length needed to completely go through tube 422 is pushed through both nesting tubes and then secured in place with cap 426-2 or a nut. A cotter pin may replace the bolt and nut hardware.

The adjusted unit is shown in FIGS. 31-B and 31-B'. Upon extension, the small tube 424 remains inside tube 422. When retracted, tubes 422 and 424 go into tube 420 only so far as the protruding and exposed parts of the nut and bolt or cotter pin will allow.

The length of the extended unit may be further limited to suit a short user or child. Starting from an assembled unit shown in FIG. 31-A'. Apertures 424-2, 422-2, and 420-2 are aligned and a bolt 428 is pushed through all three nesting tubes and then secured in place with cap 428-2 or a nut. The adjusted unit is shown in FIG. 31-C. Neither tubes 424 nor 422 can be extended.

Referring to FIGS. 32-A, 32-B, 32-B', and 32-C assembly and adjustment is the same as that in FIG. 31-A. The difference lies on the location and number of apertures. The larger tube 430 now has two sets of apertures 430-2 and 430-4. The smallest tube 434 still has one set of apertures 434-2. All apertures are now toward the lower ends of the tubes. The lower set of apertures is used for medium height adjustment as shown in FIGS. 32-B and 32-B'. The other set is used for short height adjustment as shown in FIG. 32-C. Note that in FIG. 32-B' the smaller tube is extended out for the medium height adjustment. The middle tube remains inside the larger tube.

More Detailed Discussion of Some Means of Telescoping Tubes:

A. Top and Bottom Retaining Caps with Rubber Gasket or Ring

Referring to FIG. 29-A, three tubes 402, 404, and 406 are dimensionally receivable into each other and are to be formed into a telescoping handle.

Assembly is as follows:

a) Rubber rings 402-10 and 404-10 are disposed on a section of the bottom retaining caps 402-1 and 404-1 respectively.

b) Caps 402-1 and 404-1 are permanently adhered to the bottom of tubes 402 and 404 respectively.

c) Top retaining caps 404-2 and 406-2 are likewise adhered to the top of tubes 404 and 406 respectively.

d) Tube 402 is inserted through the bottom of tube 404.

e) Tube 404 with tube 402 inside is inserted through the bottom of tube 406.

f) Tube 402 is pulled through tube 406 and its top is capped with a retaining cap 402-2. A pulling hook 402-4 may be disposed on the top end of tube 402.

Perspective and front views of the assembled units are shown in FIGS. 29-B and 29-C respectively.

B. String held by Cross Bars Inside the Lower ends of the Inner and Outer Tubes

Three tubes 410, 412, and 414 dimensionally receivable into each other are to be formed into a telescoping handle.

Referring to FIG. 30-A, assembly is as follows:

a) Apertures just large enough to snugly receive cross bars are to be drilled laterally through the lower end of each of the three tubes.

b) Cross bars 414-1, 412-1, and 410-1 are urged into their respective apertures. Cross bars are tiny rods of length equal to the outside diameter of the tubes they are in.

c) A string 420 that is about as long as the largest tube is secured to cross bar 410-1 of the small tube 410. Its other end is inserted into the top of the middle tube 412 and secured to the cross bar 412-1 at the lower end. The length of the string used is such that the string is taut at a point when the lower end of tube 410 is securely nested into the upper end of tube 412. Any excess string is discarded.

d) One end of another string 420 is secured to cross bar 412-1. The other end is inserted into the top of the outer tube 414 and secured to the cross bar 414-1 at the lower end. The string should be taut when the lower end of tube 412 is securely nested into the upper end of tube 414. Any excess string is discarded.

e) The top end of small tube 410 is capped with cap 410-2 and provided with a hook 410-4.

Perspective skeletal views of the expanding assembled unit are shown in FIGS. 30-B1, 30-B2, and 30-B3.

Pivotal Connection and Extendible Handle Combination

FIGS. 33-A through 33-E are presented to show how the pivoting connection on the longer rake handle of FIG. 3-A can be incorporated with an extendible handle. FIG. 33-A shows the components and their assembly. A cut-up perspective view of a top retaining cap 440 is presented to show the inner walls. After assembly, the inner wall of cap 440 is flushed with the inner wall of outer tube 446. Top retaining cap 440 has a top inner flange 440-2 while a bottom retaining cap 450 has a bottom outer flange 450-2. During extension of the handle, that is when the inner tube 448 is pulled out of outer tube 446, flanges 440-2 and 450-2 collide to prevent tube 448 from leaving tube 446. As shown in FIG. 33-B, cap 440 also serves as a top retainer for the freely rotating ring 442. A bottom retainer 444 for ring 442, caps 440 and 450 are fixed onto the outer tube using short screws or adhesive, crimped, molded on as part of the outer tube, or by other state of the art means.

FIG. 33-C is a cut-up view of another kind of top retaining cap 460 that as an additional inner supporting flange 460-2 extending from a portion of the inner perimeter of the cap. The rest of the inner perimeter serves as a clearing section for the outer hanging flange 470-2 of a bottom retaining cap 470 shown in FIG. 33-D. These two caps can be used in place of those in FIG. 33-A. A twist of either the inner and outer tubes allow the flanges to clear each other and subsequently the hanging flange 470-2 can rest on the supporting flange 460-2. The hanging and supporting flanges allow the extended handle to remain extended until the tubes are twisted again before retraction of the handle.

FIG. 33-E shows an assembly of ring 442, retaining cap 460, and bottom retainer 444 joined by bars 480-2. The function of bars 480-2 is discussed with FIGS. 6-A.

Variations on Arm Grip

The simple hand grip of the picking rake may also be modified into an arm grip. Some outwardly extending arm grips are shown in FIGS. 34-A and 34-B, 34-A' and 34-B', and 35-A and 35-B. The grippers shown are disposed on the upright adjacent components but they may also be on the horizontal components or rake handle itself.

Variations on Holding the Rakes Together in the Raking Mode

As shown in FIGS. 36-A and 36-B, the rake handles may be held together one on top of the other instead of side by side. Bumper guides may be added for better alignment. The socket of the top rake handle is molded to be substantially above the face of its rake head while the socket for the bottom rake handle is made to be substantially below the face of its rake head. The overlapping faces of the rake heads are adjacent each other. The two arm grips may also be reshaped so that they can rest snugly against each other for a more stable and compact unit.

In FIGS. 36-A and 36-B, the adjacent upright portion of the left arm grip of the picking rake is receded towards the edge of the rake handle to accommodate the right rake handle on top.

In FIG. 37-B, two modified arm grips similar to those shown in FIG. 37-A suitable for the picking rake are modified and joined side by side but on switched positions. The arm grips are reshaped and repositioned to accommodate this new arrangement.

Another variation is shown in FIG. 38. The handles are joined at an angle. The arm grips are repositioned accordingly to meet and lock. The rake heads are equipped with a cavity and protrusion combination 520.

Figure 39:
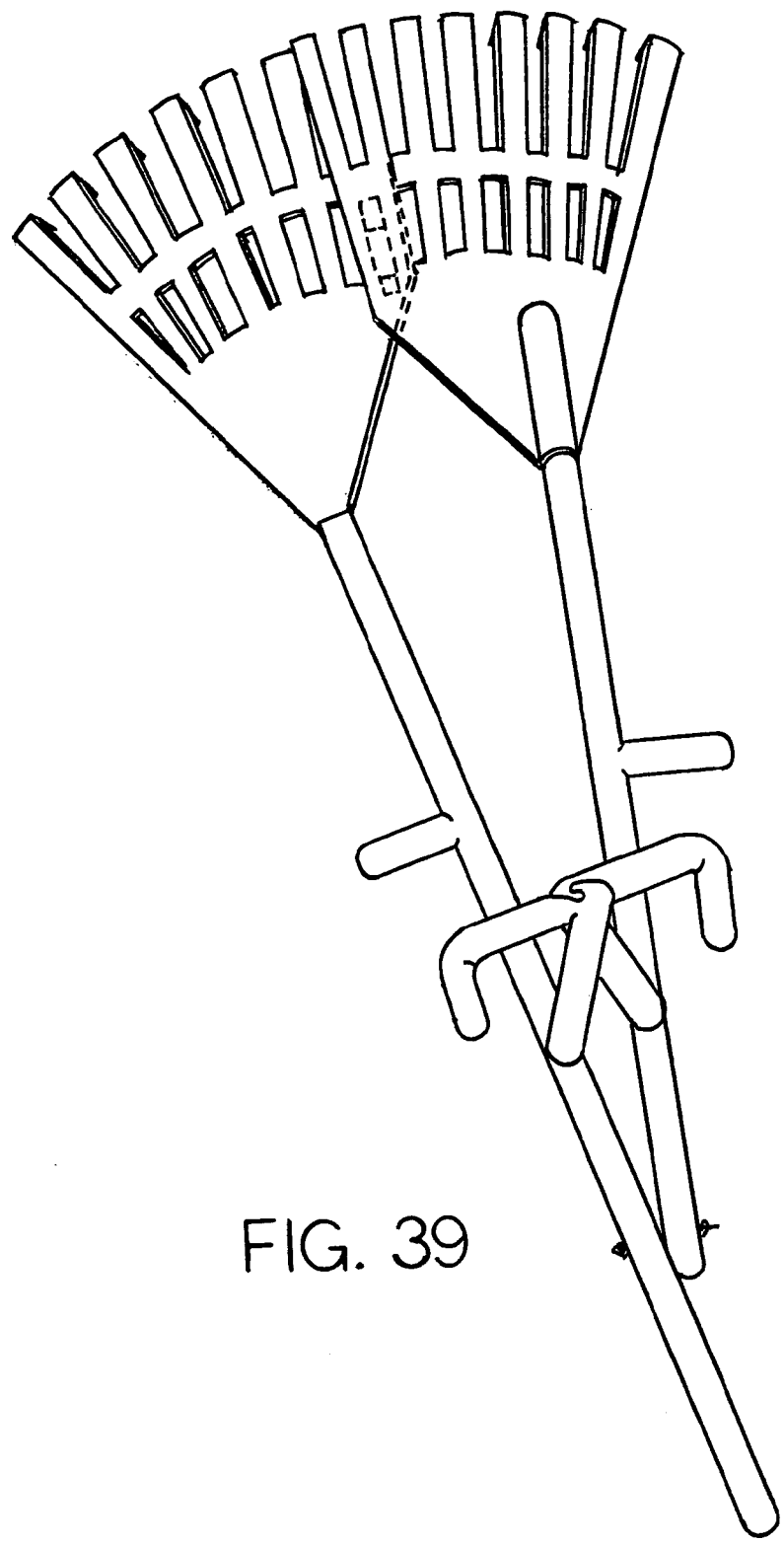
FIG. 39 is a perspective top view of the handle of the picking rake wherein the handles are crisscrossed.

Still another variation can be made where the handles criss-cross as shown in FIG. 39.

Gripper Connections

The numerous possibilities of gripper connections include but are not limited to the most common ones illustrated in FIGS. 40-A through 58-D. A brief description of each of these grippers are as follows:

FIGS. 40-A through 40-D—show how grippers 260, 262, or 264 work Gripper 260 is installed on the surface of tube 258 using a locking serrated washer and a short bolt/screw or rivet. The incoming tube 259 is pushed inside said gripper. The forceful contact between the outside surface of tube 259 and the inner surface of gripper 258 urges said gripper to open up to accept tube 259 and finally grasping it in place.

FIG. 41—shows a gripper 260, made of metal plate with the ends rolled in

FIG. 42—shows a gripper 262, made from two bent metal rods joined together with a plate FIG. 43—shows a gripper 264, made of plastic, thicker than metal of equivalent holding power FIG. 44—shows a metal gripper 266 with its ends folded in forming a double wall FIGS. 45-A through 45-D—show how gripper 266 works.

FIGS. 46-A through 46-D—show how gripper 268 works.

FIG. 47-A—shows a gripper 268 with a rigid main clamping body controlled by a helical compression spring.

FIG. 47-B—shows the assembly of gripper 268, which is as follows:
  a. Clamps 268-20 and 268-22 are inserted into window 268-40 of clamp and spring housing 268-4. Notches 268-26 of clamps 268-20 and 268-22 lodge into their respective protrusions 268-42 on housing 268-4.
  b. Helical spring 268-6 is positioned between the spring guides 268-24 of each of the clamps.
  c. Housing 268-4 is inserted into 270-2 of tube 270 and secured in place with short screws, bolts or rivets.

FIGS. 48-A through 48-D—show how gripper 274 works. The roller tips supposedly facilitate the entry and exit of tube 259 by turning inward and outward respectively.

FIG. 49-A—shows a double rod gripper 274 with roller tips.

FIG. 49-B—shows the assembly of gripper 274, which is as follows:
  a. Two metal rods 274-20T and 274-20B and plate 274-22 are bent and joined to form a frame 274-2 of configuration shown.
  b. The right tips of rod 274-20T and bottom rod 274-20B from step a are forced apart and inserted into the top and bottom apertures of roller 274-4R respectively.
  c. The left tips of top rod 274-20T and bottom rod 274-20B from step b are also forced apart and inserted the top and bottom apertures of roller 274-4L respectively.

FIGS. 50-A through 50-D—show how gripper 276 works.

FIG. 51-A—shows a rigid plastic or metal gripper 276 with a helical spring controlled gripping surface.

FIG. 51-B—shows the assembly of gripper 276, which is as follows:
  a. A gripper frame 276-2 is molded out of a light metal, plastic, or similar material with a cavity 276-20.
  b. The outer sides of casing 276-6 are coated with adhesive that is compatible with the material the casing and the frame is made of. If the fit is sufficiently tight, no adhesive is necessary.
  c. Spring 276-2 is disposed inside cavity 276-20 immediately followed by gripping head 276-4 and casing 276-6.

FIGS. 52-A through 52-D—show how the grippers 278 and 280 work.

FIG. 53-A—shows gripper 278, which is similar to gripper 274 in FIG. 49-A except for the absence of a curvature on its top and bottom rods. It is straight instead of arching outward to approximate the shape of the incoming tube. This is because the side that attaches to tube 258 is wider and curved to approximate the shape of the tube 258 it is mounted on.

FIG. 53-B—shows the assembly of gripper 278, which is different from that of gripper 274 in FIG. 49-B, although the method can be used interchangeably for both types.

Assembly is as follows:
  a. Rods 278-6T and 278-6B are bent to the shape shown.
  b. Plate 278-2 is a metal plate with tiny slits on its top and bottom edges. The top edge is folded over and crimped over rod 278-6T to keep it in place. Note that the slits facilitate the folding over the curved body of the rod.
  c. Each tip of rod 278-6T is inserted into a top aperture of a roller 278-4.
  d. Each tip of rod 278-6B is inserted into a bottom aperture of their respective roller 278-4.
  e. The bottom edge of plate 278-2 is folded down and crimped over rod 278-6B to keep it in place.

FIG. 54-A—shows a gripper 280, which is basically a gripper 278, with only one bent rod.

FIG. 54-B—shows the assembly of gripper 280, which is as follows:
  a. A single rod 280-2 is bent to the shape shown.
  b. Plate 280-4 is bent to approximate the dimensions of tube 258.
  c. The ends of plate 280-4 are folded around the upright sections 280-22 of rod 280-2.
  d. The tip of each terminal of rod 280-2 is urged into the bottom aperture of a roller 280-2.
  e. The terminals of the tips protruding beyond the top aperture of roller 280-2 are crimped to secure the roller in place.

FIGS. 55-A through 55-D—show how gripper 282 works. The head of a snap button 286-2 mounted inside the incoming tube 286 is engaged into said aperture when the incoming tube is brought inside said gripper. To release tube 286 the lodged button head is pressed inward by the user's finger. The rest of the user's left hand still need to hold on to the left rake to counter the force exerted by the right hand in its effort to separate the rakes from each other. The countersunk opening of aperture 282-2 facilitate this step. Note that gripper 264 in FIG. 43 may also have a counter-sunk aperture and be used in place of gripper 282, thus, providing more holding power because of its shape.

FIG. 56—shows a gripper 282 made if rigid, molded light metal, strong plastic or similar material. It's holding feature is an aperture 282-2 with a counter-sunk opening on the exposed side.

FIG. 57—shows a gripper 284, which is basically gripper 260 in FIG. 55 with an aperture.

FIGS. 58-A through 58-D—show how gripper 284 works. This is basically the same as that of gripper 282.

Another Version of a Picking Rake with Dual Rake Heads and Dual Rake Handles

The referenced parent patent application Ser. No. 10/002,763 claims a picking rake with dual rake heads and dual rake handles with hand grips and arm grips removably joined together by a gripping connection. The parent patent application also discloses a picking rake with dual rake heads and dual rake handles with hand grips and arm grips removably joined together by a tube and snap button connection. FIGS. 10-A through 12-C of the parent application are duplicated as FIGS. 59-A through 61-C in this CIP application.

FIGS. 59-A to 59-C

Referring to FIG. 59-B, another way of joining rakes 122L and 122R involves the elimination of an upright arm grip section to allow the new handle 122-2R to be receivable inside a tube 122-20L attached by weld or rivet to the right side of the left rake handle 122-2L. Tube 122-20L has an aperture 122-22L at its exposed side. The rake handle 122-2R also gets an aperture 122-22R on its inner side. A snap button 126 is inserted near the opening 122-20R of said handle with its button head disposed into aperture 122-2R. Opening 122-20R is then capped close with cap 128. Referring to FIG. 59-C, the front opening of tube 122-20L has a smoothly curved lip at the point where the snap button 122-22R hits its rim when handle 122-2R of rake 122R is inserted into it.

Operation of the Picking Rake in FIGS. 59-A to 59-C

To join both rakes, rakes 122R and 122L are held at their respective hand grips. The near end of handle 122-2R is inserted rearwardly into the front opening of tube 122-20L of rake 122L. The button head of snap button 126 is urged inward by virtue of notch 122-24L of said tube. Upon further rearward insertion of handle 122-2R into the tube, the snap button head lodges into aperture 122-22L thereby retaining handle 122-2R in the tube. The joined rakes that can now be used in the rake mode are shown in FIG. 59-A.

FIGS. 60-A to 60-C

Referring to FIG. 60-B, another way of joining rakes 130L and 130R involves lengthening the rake handle 130-2R to provide the portion 130-20R that goes into tube 122-20L. Tube 122-20L is welded or riveted to handle 122-2L a little further back to adjust to the new location of extension 130-20R of the handle 130-2R that is designed to go into it. Operation is the same as in FIGS. 59-A to 59-C. The joined rake 130R and 130L are shown in FIG. 60-A.

FIGS. 61-A and 61-C

Referring to FIG. 61-B, still another way of joining rakes 132R and 132L involves adding a branch 132-20R that goes down and immediately turns one tube diameter to the left and then immediately towards the front. It is as though the extension 130-20R of rake handle 130-2R previously discussed has been bend downward and turned back 180 degrees one tube diameter to the left. Tube 122-20L is welded or riveted underneath handle 122-2L at a position where its lipped opening is facing backward as shown in FIG. 12-C. Operation consists of bringing rake 132 back until the tip of branch 132-20R clears the rear end of tube 122-20L. The branch is thereafter inserted forwardly into the tube. The joined rake handles are shown in FIG. 61-A.

CONCLUSION, RAMIFICATIONS AND SCOPE OF INVENTION

Therefore, one can easily realize that many of the various picking rakes of the present invention provide a reliable, convenient, fast, and economical solution to the problem of gathering and picking up debris. The picking rake heads and handles are operated to approximate the natural tendency of a person's arms when picking up something bulky. The substantially side-by-side configuration in the raking mode of the dual rake heads allows for wider raking span. The freely swinging rake heads in the picking mode also allow for ample picking volume.

While I have tried to present and specify as many ramifications and variations as possible, they should not be construed as limitations on the scope of the invention but rather embodiments that may be preferred by most consumers depending on their needs and budget. Further variations not illustrated are possible.

The picking rake may be used not only for yard debris but also for other light materials that are first gathered before being picked up especially if they come in very large quantities. Some examples of such materials include styrofoam pellets, shredded paper, hay, popcorn, little toys, little balls, wood chips, bark nuggets and the like. The dual rake heads may be shaped to an infinite number of shapes. They may be redesigned accordingly for use in gathering and picking up more specific items. The two rake head and handle units may be joined side-by-side, overlapping, switched in position, or even crisscrossed at an angle. The means by which they are temporarily joined may include other means not discussed including non-circular short tubes, protrusion and cavity combinations on the rake handles themselves, interlocking protrusions and interlocking arm grips among others. The pivoting joint for the picking rake may be made quasi-permanent and easily movable by just snapping onto the rake handles the joint hardware needed. The pivoting joint may also be effected by other state of the art means. The underside of the rake heads need not be the side facing each other when in the pick-up mode. Topside facing underside or topside facing topside may also be used considering that some pivoting joints allow unlimited rotation of at least one of the handles. The right handle can be used for the left hand and the left handle can be used for the right hand. The rake handles may not be straight for the entire length of the handle especially if there are no telescoping tubes involved. For instance, the section of the arm grip that is also basically a part of the elongated member may be eliminated. The arm grip may come in many different ergonomic designs. The telescoping of the tubes may be accomplished by other means not discussed. The rake head and handle may be made of any appropriate state of the art material other than plastic, wood, and metal. The handle may be solid wood or hollow tube with a non-circular cross-section. There is also numerous other possible permutations involving adjustable arm grips, telescoping tubes, and orientation of the rake handles. Arrangements that are shown in illustrations for one version of picking rake may be adapted to the other version and its variations as well. The terms "right" and "left" are used simply to differentiate between the two rake units and should not be construed to mean only the right side and left side components.

Accordingly, the scope of the invention should be determined by the appended claims and their legal equivalents.

I claim:

1. A method for performing pre-picking, picking, and pre-raking operations comprising:
   a) providing a picking rake made up of a first rake unit and a second rake unit,
      wherein the first rake unit has a first rake head and a first rake handle,
      wherein the second rake unit has a second rake head and a second rake handle,
      wherein the first rake handle is an elongated member having a longitudinal axis, a lower end and an upper end,
      wherein the second rake handle is an elongated member having a longitudinal axis, a lower end and an upper end,
      wherein each of the first and second rake heads has a face having a bottom edge and a top,
      wherein the lower end of the first rake handle is attached to the top of the first rake head,
      wherein the lower end of the second rake handle is attached to the top of the second rake head,
      wherein the first and second rake units are connected proximal to each other at a section along the length of the first and second rake handles, and
      wherein the bottom edge of the first rake head is aligned with and adjacent to the bottom edge of the second rake head effecting one combined raking span,
         wherein the connected section along the length of the first and second rake handles comprises a multi-axial pivotal connection having multi-axial pivotal means for allowing the first and second rake handles to flex independently of each other substantially about their respective longitudinal axes and for allowing one of the first and second rake heads to swing away and towards the other of the first and second rake heads when the face of the first rake head is substantially facing the face of the second rake head, and
   b) performing a pre-picking operation taken from the viewpoint of a user facing the picking rake comprising at least one of the following:
      i. flexing the first rake handle independently of the second rake handle in a counterclockwise direction substantially about the longitudinal axis of said first rake handle until the face of the first rake head is at least substantially facing the face of the second rake head, and wherein the rake handles remain connected together at the section along the length of the first and second rake handles, and
      ii. flexing the second rake handle independently of the first rake handle in a clockwise direction substantially about the longitudinal axis of said second rake handle until the face of the second rake head is at least substantially facing the face of the first rake head, and wherein the rake handles remain connected together at the section along the length of the first and second rake handles,
   c) performing a picking operation comprising,
      swinging at least one of the first and second rake heads outwardly away from the other rake head, grasping a material between the faces of the rake heads by swinging at least one of the first and second rake heads inwardly towards the other rake head, and
      swinging at least one of the first and second rake heads outwardly away from the other rake head to release the grasped material,
      wherein the rake handles remain connected together at the section along the length of the first and second rake handles, the connected section abutting and leveraging the rake units against each other during the picking operation,
   d) performing a pre-raking operation comprising at least one of the following:
      i. flexing the first rake handle independently of the second rake handle in a clockwise direction substantially about the longitudinal axis of said first rake handle until the bottom edge of the first rake head is aligned and adjacent with the bottom edge of the second rake head effecting one combined raking span, and wherein the rake handles remain connected together at the section along the length of the first and second rake handles, and ii. flexing the second rake handle independently of the first rake handle in a counterclockwise direction substantially about the longitudinal axis of said second rake handle until the bottom edge of the second rake head is aligned and adjacent with the bottom edge of the first rake head effecting one combined raking span, and wherein the rake handles remain connected together at the section along the length of the first and second rake handles.

2. The method of claim 1 wherein the flexing of the first rake handle independently of the second rake handle in the counterclockwise direction during the pre-picking operation is performed using the left hand of the user;

wherein the flexing of the second rake handle independently of the first rake handle in the clockwise direction during the pre-picking operation is performed using the right hand of the user;

wherein the flexing of the first rake handle independently of the second rake handle in the clockwise direction during the pre-raking operation is performed using the left hand of the user; and wherein the flexing of the second rake handle independently of the first rake handle in the counterclockwise direction during the pre-raking operation is performed using the right hand of the user.

3. The method of claim 1 wherein said multi-axial pivotal connection is disposed towards the upper end of one of the rake handles.

4. The method of claim 1 wherein the first and second rake handles are substantially parallel and adjacent to each other when the bottom edge of the first rake head is aligned and adjacent to the bottom edge of the second rake head effecting one combined raking span.

5. The method of claim 1 wherein the first and second rake handles are substantially parallel and adjacent to each other when the bottom edge of the first rake head is aligned and adjacent to the bottom edge of the second rake head effecting one combined raking span, wherein the connected section along the length of the first and second rake handles further comprises a gripping connection having a first attachment point on the first rake handle and a second attachment point on the second rake handle, wherein the first and second attachment points are apart from said pivotal connection, wherein said gripping connection comprises a gripper disposed on one of the first and second attachment points, said gripper having an opening for receiving the other of the first and second attachment points, wherein the pre-raking operation further comprises snapping or urging the other of the first and second attachment points into said opening of said, gripper, and wherein the pre-picking operation further comprises snapping or urging the other of the first and second attachment points out of said opening of said gripper.

6. The method of claim 5 further including:

a) a first aperture on said gripper, b) a second aperture disposed on a predetermined section of the other of the first and second attachment points, c) a snap button disposed inside the predetermined section of the other of the first and second attachment points, said snap button having a positioning head, said positioning head outwardly engaged in the second aperture, d) wherein the gripper snaps on and holds the other of the first and second attachment points, the positioning head further engaging outwardly into the first aperture when the two rake heads are aligned and adjacent, and e) wherein the pre-picking operation further comprises depressing inwardly the snap button to disengage the snap button from said first aperture prior to snapping the other of the first and second attachment points out of the opening of the gripper.

7. The method of claim 1 wherein the first rake handle has a first hand grip and the second rake handle has a second hand grip, wherein the first hand grip comprises a branch extending substantially transversely intermediate the upper and lower ends of the elongated member of the first rake handle, wherein the second hand grip comprises a branch extending substantially transversely intermediate the upper and lower ends of the elongated member of the second rake handle, and wherein the method further includes the user holding the rake handles by their respective hand grips while doing any portion of the pre-picking, picking, and pre-raking operations.

8. The method of claim 7 wherein the branch comprising the first hand grip is extending substantially transversely leftwardly and wherein the branch comprising the second hand grip is extending substantially transversely rightwardly.

9. The method of claim 7 further including a method of performing a raking operation prior to performing a pre-picking operation comprising the user holding the rake handles by at least one of the first and second hand grips to move the picking rake to gather the material that is subsequently grasped in the picking operation.

10. The method of claim 7 wherein the connected section along the length of the first and second rake handles further comprises a gripping connection having a first attachment point on or proximal the first hand grip and a second attachment point on or proximal the second hand grip, wherein the first and second attachment points are apart from said pivotal connection, wherein said gripping connection comprises a gripper disposed on one of the first and second attachment points, said gripper having an opening, wherein the other of the first and second attachment points is received into said opening, and wherein the pre-raking operation further comprises snapping or urging the other of the first and second attachment points into said opening of said gripper, and wherein the pre-picking operation further comprises snapping or urging the other of the first and second attachment points out of said opening of said gripper.

11. The method of claim 10 wherein the other of the first and second attachment points has a recessed section of predetermined size and wherein said recessed section is received into the opening of the gripper, whereby stability is enhanced in the connected rake units by confining the gripper within said recessed section.

12. The method of claim 1 wherein the flexing of the first rake handle counterclockwise and the flexing of the second rake handle clockwise in the pre-picking operation are both performed and are performed substantially simultaneously.

13. The method of claim 1 wherein the flexing of the first rake handle clockwise and the flexing of the second rake handle counterclockwise in the pre-raking operation are both performed and are performed substantially simultaneously.

14. The method of claim 1 wherein one of the first and second rake handles comprises at least two tubes, an inner tube receivable inside an outer tube, and cooperating retaining means for keeping the inner tube connected to the outer tube when the inner tube is extended from or retracted into the outer tube, and wherein the pre-raking operation further comprises extending the inner tube from the outer tube, and wherein the pre-picking operation further comprises retracting the inner tube into the outer tube.

15. The method of claim 1 wherein the first rake head has a right inner extension and the second rake head has a left inner extension, and wherein the aligned and adjacent rake heads have an overlapping section;

wherein the overlapping section comprises one of the right and left inner extensions extending over the other of the right and left inner extensions, and whereby the overlapping right and left inner extensions are providing additional abutment to the aligned and adjacent picking rake heads, and whereby the inner extensions are providing additional pick-up capacity during the picking operation.

16. The method of claim 1 wherein said multi-axial pivotal connection further includes a snapping means for detaching said multi-axial pivotal connection hardware from the connected section thereby providing a quasi-permanent pivotal connection.

17. The method of claim 1 wherein the first rake handle has a first hand grip and the second rake handle has a second hand grip, wherein the first hand grip comprises a branch extending substantially transversely intermediate the upper and lower ends of the elongated member of the first rake handle, wherein the second hand grip comprises a branch extending substantially transversely intermediate the upper and lower ends of the elongated member of the second rake handle, wherein the connected section along the length of the first and second rake handles further comprises an interlocking connection comprising providing a predetermined shape to the first and second hand grips in order to effect an interlocking connection between the first and second hand grips when the bottom edge of the first rake head is aligned with and adjacent to the bottom edge of the second rake head effecting one combined raking span.

* * * * *